United States Patent [19]

Ahmad et al.

[11] Patent Number: 4,644,528
[45] Date of Patent: Feb. 17, 1987

[54] TERMINATING PORT DETERMINATION IN A DISTRIBUTED CONTROL SWITCHING SYSTEM USING A DISTRIBUTED DATABASE

[75] Inventors: Mahmood Ahmad, Winfield; Wayne L. Schreiner, Oswego, both of Ill.

[73] Assignee: AT&T Bell Laboratories, Murray Hill, N.J.

[21] Appl. No.: 699,420

[22] Filed: Feb. 7, 1985

[51] Int. Cl.$^4$ .......................................... H04Q 11/04
[52] U.S. Cl. ...................................................... 370/58
[58] Field of Search ........................... 370/58, 54, 63; 179/18 ES

[56] References Cited

U.S. PATENT DOCUMENTS

| | | | |
|---|---|---|---|
| 3,643,032 | 2/1972 | Ulrich et al. | 179/18 |
| 3,860,761 | 1/1975 | O'Neill, Jr. | 179/18 |
| 4,259,549 | 3/1981 | Stehman | 179/18 |
| 4,317,962 | 3/1982 | Cox et al. | 179/18 |
| 4,322,843 | 3/1982 | Beuscher et al. | 370/63 |
| 4,340,776 | 7/1982 | Ganz et al. | 178/3 |
| 4,421,955 | 12/1983 | Mori et al. | 179/18 |
| 4,442,321 | 4/1984 | Stehman | 179/18 |
| 4,567,589 | 1/1986 | LeComte et al. | 370/58 |

OTHER PUBLICATIONS

H. Takeda et al., "Time Division Switching Control System", vol. 27, No. 9-10, Sep.–Oct. 1979, pp. 773-782.

G. Becker et al., "Call Processing in a Distributed Control System", ICC '80 Conference Record, vol. 3 of 3, Jun. 8-12, 1980, pp. 46.4.1–46.4.7.

D. Jackson and K. Patfield, "Impacts of Multiprocessing on GTD-5 EAX Call Processing and Operating System", ISS'81 CIC Montreal Sep. 21-25, 1981, pp. 1-7.

M. Akiyama et al., "Time Division Distributed Switching System", *ISS'81 CIC Montreal*, Sep. 21-25, 1981, pp. 1-7.

U.S. patent application of M. M. Chodrow et al., "Switching System Having Remote Switching Capability", Ser. No. 493,683, filed May 11, 1983.

*Primary Examiner*—Douglas W. Olms
*Attorney, Agent, or Firm*—Ross T. Watland

[57] ABSTRACT

A distributed control switching system where the system control units cooperatively perform the terminating port determination function. The partial results obtained when a first control unit is unable to fully determine the terminating port are advantageously used by the second and subsequent control units such that time-consuming database access tasks are not unnecessarily repeated.

20 Claims, 59 Drawing Figures

ROUTING PROGRAM

RTREQ | PATHDES, RTGDATA, DIALDATA, GPI, TREAT, ···

LNTREQ | PATHDES, RTGDATA, FARPID, GPI, ···

TKTREQ | PATHDES, RTGDATA, FARPID, GPI, DIGDATA, ···

ANTREQ | PATHDES, RTGDATA, FARPID, GPI, ···

*FIG. 14*

RTREQ MESSAGE

RDBLK | HEADER, TEXT, ORIGTPI, RTGSTATE, RICOUNT, ···

CFBLK | FIXEDRI, SCRNING, DNTRAN, ROUTING, ···

GRPBLK | PORTGROUP, MHG, LNSTAT, GROUPPORT, TRKG, TKOWNER, TKQUE, TKSTAT, ···

GPI

TERMBLK | MODULE, PORT, GRPNUM, MEMBER, ···

*FIG. 15*

FIXEDRI | TREAT,RI,···

SCRNING | DI,SI,PI,RI,NOC,ROUTETYPE,···

DNTRAN | DN,TERMCLASS,GPI,···

ROUTING | RI,GRPNUM,SECRI,···

PORTGROUP | GPI,GRPNUM,MEMBER,···

GROUPPORT | GRPNUM,MEMBER,GPI,···

*FIG. 16*

MHG | GRPNUM,HTYPE···

LNSTAT | GRPNUM,GMFLAG···

*FIG.17*

TRKG | GRPNUM,HTYPE···

TKOWNER | GRPNUM,QKEY···

TKQUE | QKEY,GPI,NIM···

TKSTAT | GRPNUM,GMFLAG···

*FIG.18*

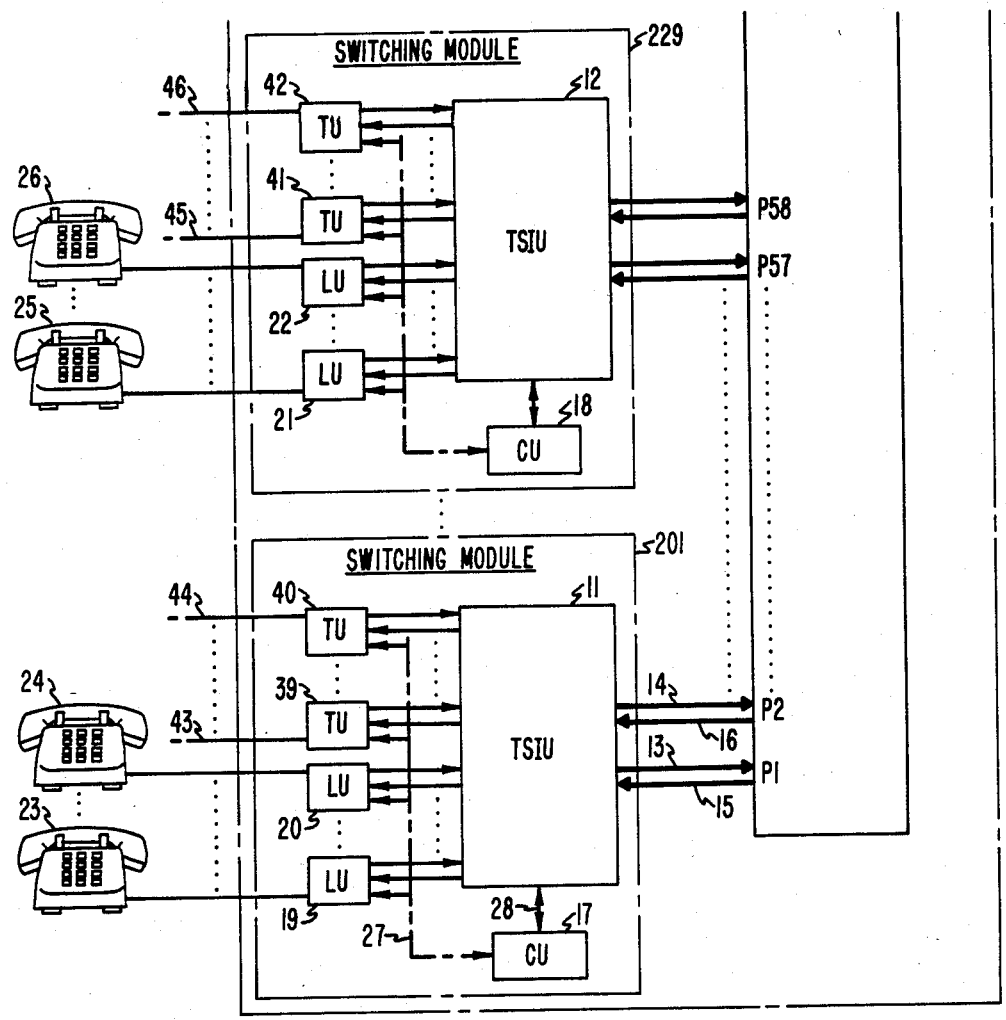
FIG. 19    SYSTEM II
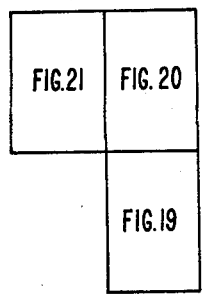
FIG. 22

ROUTING PROGRAM

| | |
|---|---|
| RTGEN | PATHDES,RTGDATA,FARPID,REQTERM,RTCONTDA,ORIGGPI,TERMGPI,··· |

| | |
|---|---|
| PR | PATHDES,RTGDATA,FARPID,ORIGGPI,TERMGPI,··· |

| | |
|---|---|
| RDBLK | HEADER,TEXT,ORIGGPI,RTGSTATE,RICOUNT,RTSEQ,SWREQ,··· |

| | |
|---|---|
| MHG | GRPNUM,HTYPE,MODULE,··· |

| | |
|---|---|
| TRKG | GRPNUM,HTYPE,MODULE,··· |

| | |
|---|---|
| PORTSTATUS | GPI,BUSY/IDLE,CF,SC,··· |

| | |
|---|---|
| MODTRAN | NOCD4D3,MODULE,··· |

*FIG. 32*

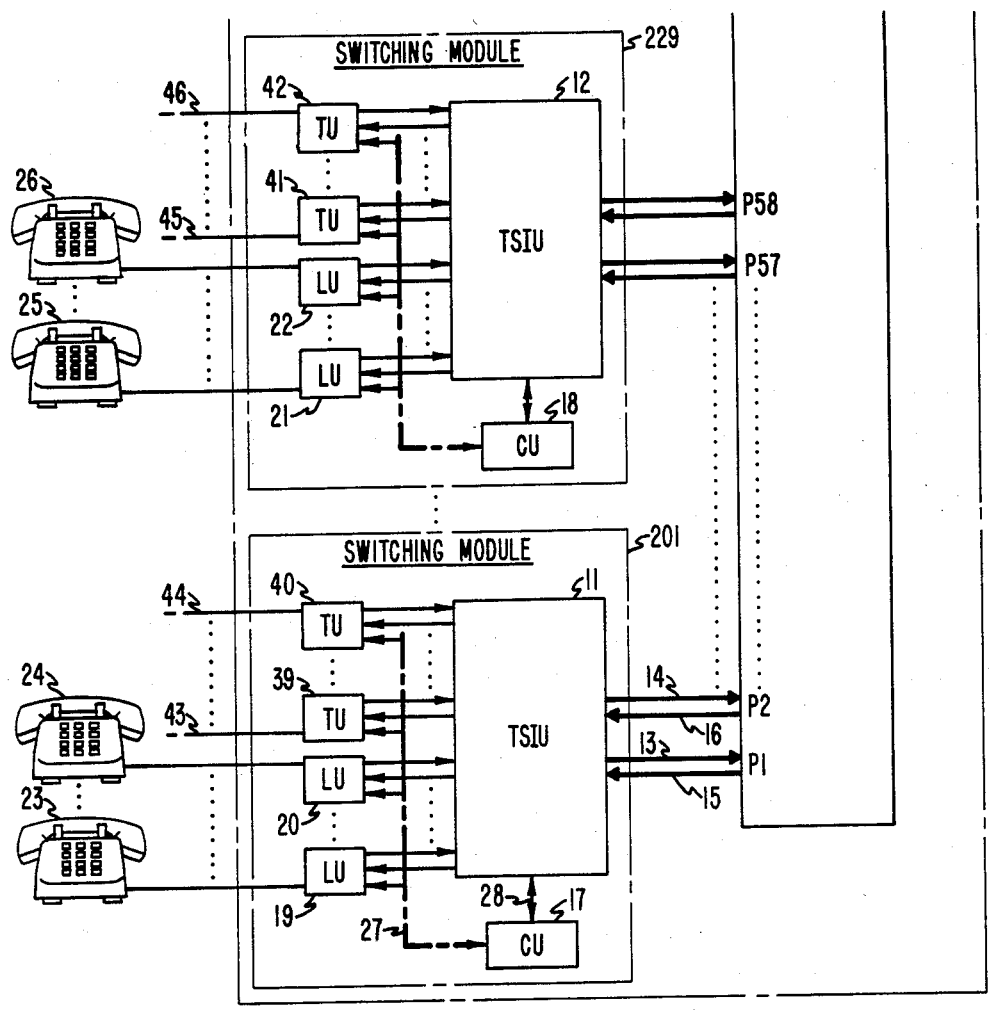
FIG. 33     SYSTEM III
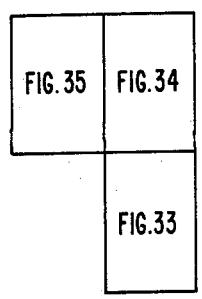
FIG. 36

SYSTEM IV

SYSTEM V

TERMINATING PORT DETERMINATION IN A DISTRIBUTED CONTROL SWITCHING SYSTEM USING A DISTRIBUTED DATABASE

CROSS-REFERENCE TO RELATED APPLICATIONS

This application is related to the application of M. Ahmad, A. J. Sawyer, W. L. Schreiner, G. H. Thomas, Ser. No. 699,464, filed Feb. 7, 1985, entitled, "Processing Sequence Calls in a Distributed Control Switching System", the application of S. Chang, R. T. Emery, S. J. Hakim, D. S. Sand, Ser. No. 699,462, filed Feb. 7, 1985 entitled, "Controlling Multi-Port Hunt Groups in a Distributed Control Switching System", the application of S. Chang, R. T. Emery, S. J. Hakim, Ser. No. 699,463 filed Feb. 7, 1985 entitled, "Directory Number Translation in a Distributed Control Switching System", and the application of S. Chang, Ser. No. 699,465 filed Feb. 7, 1985 entitled, "Path Hunting in a Distributed Control Switching System", which applications are assigned to the assignee of the present invention.

TECHNICAL FIELD

This invention relates to distributed control switching systems and, more particularly, to systems where the call setup function is distributed among the system control units.

BACKGROUND OF THE INVENTION

Stored program controlled switching systems have traditionally included a central computer that controlled switching functions in response to a program stored in memory. Although recent switching systems have distributed the call processing function among a number of system control units, many of the time-consuming tasks involved in call setup are still typically performed by a central control. For example, in one known digital switching system, the switching function is distributed among a plurality of switching modules. Each switching module has a plurality of ports and provides connections among the lines and trunks connected to the ports of that module. Calls involving lines or trunks connected to different modules are completed through a time-multiplexed switch that interconnects the modules. Each switching module includes a control unit that controls the switching function of that module. The system also includes a central control that controls the switching function of the time-multiplexed switch. Call handling in such systems requires the execution of a number of functions in addition to establishing connections. Although many of the real-time intensive tasks associated with calls, e.g., signal processing, are performed by the switching module control units, others, notably the determination of the identity of the terminating port of the switching system for each call, are performed by the system central control. The terminating port determination function includes such steps as call screening, determining whether a line or a trunk is required, translating dialed numbers into physical system addresses and hunting for idle members of trunk groups or multi-line hunt groups. These are time-consuming tasks which involve extensive database searching and data manipulation.

One of the important advantages of a modular system of this type is that its capacity can be closely matched to the requirements of specific applications. However, as the system becomes larger and the number of switching modules increases, the performance by the system central control of the per-call tasks associated with the terminating port determination function, imposes an upper limit on the overall system call processing capacity.

One known arrangement where the terminating port determination function is distributed involves a plurality of PBXs interconnected by tie trunks. A given PBX is capable of completing the terminating port determination function for calls to lines or trunks connected to that PBX. However, for calls to lines or trunks connected to the other PBXs, the data required to determine the terminating port is not present in the given PBX. The given PBX does store sufficient data to determine the destination PBX and the tie trunks that are connected therebetween. One of the interconnecting trunks is seized and the original dialed number is transmitted over that trunk. The destination PBX responds to the dialed number as a standard call, i.e., in the same manner as if the number had been dialed on a line connected to that PBX, and completes a connection to the terminating port.

Although the known arrangement is advantageous in that calls can be completed to lines or trunks connected to any of the interconnected systems without involving a central control, the overall call processing capacity is reduced due to the fact that the processing done by the first PBX involved in inter-PBX calls is not used to advantage by the second PBX in completing the call. Rather the second PBX processes the digits received over the interconnecting tie trunk in the same manner that calls originating on the second PBX are handled. Therefore the processing work done by the first PBX represents a net increase in the total processing requirements of the interconnected systems.

In view of the foregoing, a recognized problem in the art is the limitation on the call processing capacity of distributed control switching systems where the time-consuming tasks involved in determining the terminating port are performed by a system central control, or where the distribution of those tasks to distributed control units results in a substantial increase in the total processing load on the system.

SUMMARY OF THE INVENTION

The aforementioned problem is solved and a technical advance is achieved in accordance with the principles of the invention in a switching system where two or more system control units cooperatively perform the terminating port determination function in such manner that the partial results obtained when a first control unit is unable to fully determine the terminating port are advantageously used by the second and subsequent control units such that time-consuming database access tasks are not unnecessarily repeated.

A method in accordance with the invention is used in a switching system having a number of ports, which system is controlled by at least first and second control units. The first control unit stores a number of first database relations or tables and a first program that has a number of states and that defines the reading of the first database relations to determine terminating ports for calls. The second control unit similarly stores a number of second database relations and a second program that has program states corresponding to the program states of the first program and that defines the reading of the second database relations to determine terminating ports for calls. In accordance with the invention, the execution of the first program is initiated by the first control unit and ones of the first database relations are read as defined during the execution of the first program. The execution of the first program is terminated upon determining that the data necessary to continue the execution of the first program is not present in a given first database relation. A control message is then transmitted to the second control unit defining one of the program states of the first program before the defined reading of the given first database relation. The second control unit initiates the execution of the second program in the program state corresponding to the program state of the first program defined by the control message and ones of the second database relations are read as defined during the execution of the second program.

An exemplary control arrangement illustrating the invention is used in a switching system having a number of ports. The control arrangement includes a number of switching modules each associated with a corresponding subset of the ports. Each switching module includes a memory that stores a number of database relations and also stores a routing program defining the sequential access of the database relations to determine terminating ports. Each switching module also has a processor that responds to address signals received at the associated subset of ports by executing the routing program. When the data necessary to continue the execution of the routing program is not present in a given database relation, the switching module transmits a routing continuation request to one of the other switching modules. The routing continuation request defines a point in the routing program prior to the access of the given database relation and also defines data necessary to initiate execution of the routing program at the defined point. The other switching module responds to the routing continuation request by initiating execution of its routing program at the point defined by the request.

BRIEF DESCRIPTION OF THE DRAWING

A more complete understanding of the present invention may be obtained from a consideration of the following description when read in conjunction with the drawing in which:

FIGS. 14 through 18 define a number of messages, data structures and database relations used in System I;

FIGS. 19 through 21, when arranged in accordance with FIG. 22, present a diagram of a switching system referred to herein as System II, which builds on System I by integrating four individual, remote switching modules into the system;

FIG. 32 defines certain messages, data structures and database relations used in System II;

FIGS. 33 through 35, when arranged in accordance with FIG. 36, present a diagram of a switching system, referred to herein as System III, which also has four, remote switching modules in the system as does System II, but rather than being individual modules, the four remote modules in System III being interconnected in a grouping referred to herein as a cluster;

GENERAL DESCRIPTION

Figure 1:
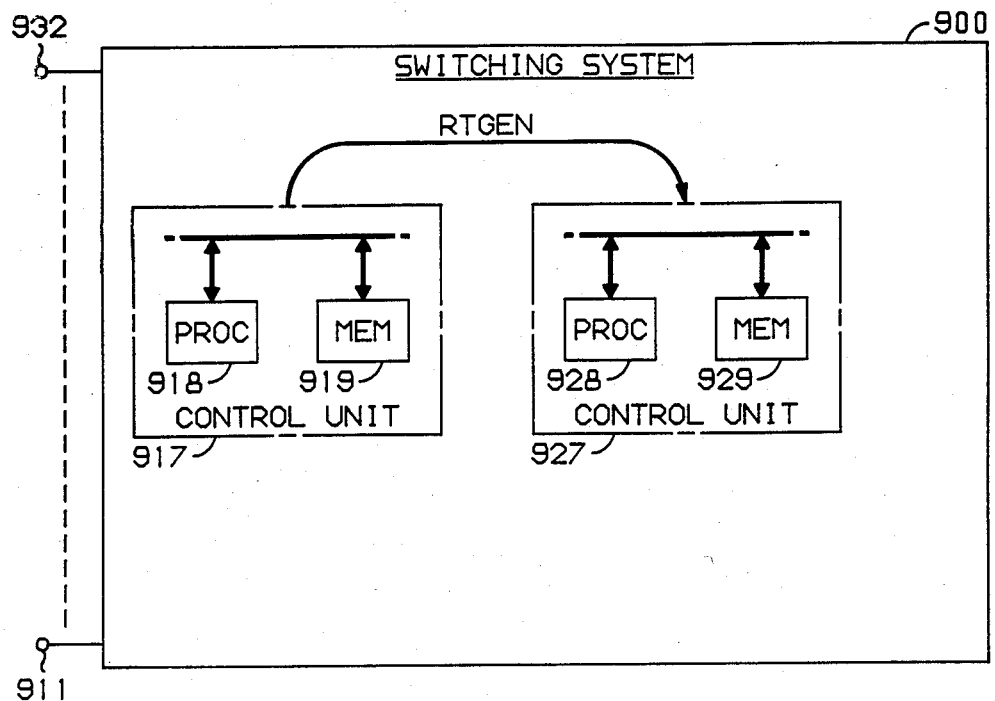
FIG. 1 is a generalized diagram of a distributed control switching system used to illustrate certain important principles of the present invention.
Figure 1A:
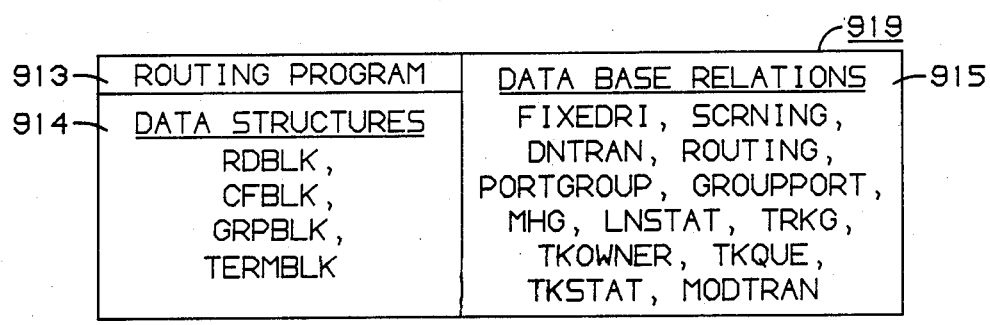
FIG. 1A is a memory layout of a memory included in the system of FIG. 1.

FIG. 1 is a generalized diagram of a distributed control switching system 900 used to illustrate certain important principles of the present invention. Switching system 900 is controlled by a plurality of control units and is used to selectively interconnect a plurality of ports, only control units 917 and 927 and ports 911 and 932 being shown in FIG. 1. The ports are connectible to analog or digital lines and trunks of any of a number of well-known types. Control unit 917 includes a processor 918 and a memory 919. A memory layout for memory 919 is shown in FIG. 1A. Processor 918 executes, among other programs, a routing program stored in a memory block 913 of memory 919 (FIG. 1A). Processor 918 writes pertinent data comprising initial values of program variables and results obtained during the execution of the routing program, in a set of data structures, e.g., RDBLK, CFBLK, GRPBLK and TERMBLK, stored in a memory block 914. The routing program of block 913 is used to implement a finite state machine comprising a number of program states and is used to perform the terminating port determination function for calls. The terminating port determination function includes such steps as call screening, determining whether a line or a trunk is required, translating dialed numbers into the physical system addresses of the system ports and hunting for idle members of trunk groups or multi-line hunt groups. In order to perform this function, the routing program defines the reading of a number of database relations, e.g., the FIXEDRI, SCRNING, DNTRAN, ROUTING, PORTGROUP, GROUPPORT, MHG, LNSTAT, TRKG, TKOWNER, TKQUE, TKSTAT and MODTRAN relations. Such database relations are stored in memory 919 in a memory block 915 (FIG. 1A).

Control unit 927 similarly includes a processor 928 and a memory 929. The routing program stored in memory 929 for use by processor 928 is substantially the same as the routing program stored in memory 919. Memory 929 also stores a set of data structures corresponding to the structures stored in block 914 of memory 919 and a set of database relations corresponding to the database relations stored in block 915 of memory 919, which data structures and database relations are used by processor 928 during the execution of its routing program in the same manner as the corresponding structures and relations are used by processor 918. It is important to note however, that the individual data elements or tuples stored in the corresponding database relations will, in general, differ. For example, the DNTRAN relation stored in memory 919 may include the directory number translation information for a particular set of directory numbers or for some subset of the system ports while the DNTRAN relation stored in memory 929 may have the directory number translation information for other sets of directory numbers or ports or may have the information required for all the system ports and their assigned directory numbers. Further, the database relations used to store the dynamic busy/idle data needed to hunt for idle members of multi-port hunt groups, i.e., the LNSTAT relation for multi-line hunt groups or the TKOWNER, TKQUE and TKSTAT relations for trunk groups, may have such data for a given hunt group stored in only one of the control units.

Assume as an example that a given address signal, e.g., a signal representing a dialed number such as a series of dial pulse or dual tone multifrequency sequences or a digital message, is received at port 911. In response to the received address signal, processor 918 of control unit 917 initiates the execution of its routing program. Such execution defines the reading of certain of the database relations stored in memory block 915. In accordance with the example, the SCRNING relation is read and the result of such reading is stored in the CFBLK data structure of memory 919. Assume that a line is defined as the termination rather than a trunk. The result obtained by reading the SCRNING relation is used as a key to access the DNTRAN relation. Assume however that the needed directory number translation information is not present in the DNTRAN relation of memory 919. When the attempted access of the DNTRAN relation fails, processor 918 terminates the execution of its routing program and control unit 917 effects the transmission of a routing continuation request, also referred to herein as a generalized routing request or RTGEN message, to control unit 927. The routing continuation request defines the program state of the routing program before the defined reading of the DNTRAN relation and the values of any variables needed to initiate program execution in that state. In control unit 927, processor 928 responds to the routing continuation request by initiating the execution of its routing program in the program state corresponding to the state defined by the request. In other words, processor 928 begins the execution of its routing program at the point that processor 918 left off. Rather than reaccessing the SCRNING relation, instead the routing program variables are initialized in processor 928 to the same values that had been obtained by processor 918, and the DNTRAN relation in memory 929 is then read. Assume for the present example that the DNTRAN relation in memory 929 contains the directory number translation information needed for the given address signal and that such information defines the global port identity of port 932. Processor 928 can therefore complete the determination of the terminating port for this call. The various control units of switching system 900 thereafter cooperate to establish a communication path between originating port 911 and terminating port 932.

As a second example, assume that another address signal is received at port 911 but that the necessary directory number translation information is stored in the DNTRAN relation of memory 919. Accordingly, the accesses of the SCRNING and the DNTRAN relations are successful during the execution by processor 918 of its routing program. The result obtained by reading the DNTRAN relation defines however, that the line associated with the particular received address signal is part of a multi-line hunt group rather than an individual line. The PORTGROUP relation is then accessed to obtain the number of the multi-line hunt group. That number is in turn used to read the MHG relation which defines that the hunt data for the particular group is stored in memory 929 of control unit 927. The LNSTAT relation in memory 919, which stores such hunt data for multi-line hunt groups, is accessed but the access fails. As in the previous example, control unit 917 effects the transmission of a routing continuation request to control unit 927. The routing continuation request defines a program state of the routing program before the defined reading of the LNSTAT relation and the values of any variables needed to begin program execution in that state. In control unit 927, processor 928 responds to the routing continuation request by initiating the execution of its routing program in the state corresponding to the state defined by the request. In the example being described, the routing continuation request defines a program state before the reading of the MHG relation. Processor 928 therefore initiates the execution of its routing program and successfully reads the MHG and LNSTAT relations. Processor 928 in accordance with its routing program then selects an idle member of the hunt group, based on the predetermined hunt algorithm defined for that hunt group, to complete the determination of the terminating port for the call.

Such distribution of the terminating port determination function among the control units of a distributed control switching system can be implemented in either a hierarchical or a non-hierarchical arrangement. The hierarchical arrangement includes a system central control and a number of distributed control units. Whenever one of the distributed control units is unsuccessful in accessing one of its database relations, a routing continuation request is transmitted up to the higher level of the central control. If the central control is also thereafter unsuccessful in accessing a database relation, the central control transmits a routing continuation request back down to one of the distributed control units.

In the non-hierarchical arrangement, all of the system control units operate at the same level. When any of the control units is unsuccessful in reading one of its database relations, a routing continuation request is transmitted to one of the other control units. In either the hierarchical or non-hierarchical arrangements, the determination of the next control unit to involve in determining the terminating port for a given call is defined in the database relations stored in each control unit. Of course, the next control unit to involve after an unsuccessful access by one of the distributed control units in the hierarchical arrangement is always the system central control.

In the detailed description which follows, four exemplary systems, referred to as Systems II through V, illustrate terminating port determination in a distributed control switching system in accordance with the present invention. Systems II and III are hierarchical arrangements involving a system central control. Although the terminating port determination function is distributed to only the remote switching modules included in those systems, it is clear that the function can be distributed in a similar manner to all of the switching modules of the system. Systems IV and V are non-hierarchical arrangements where the system central control is not involved in performing the terminating port determination function.

DETAILED DESCRIPTION

The following description relates to five time division switching systems, referred to herein as Systems I through V, which vary in the degree to which the call processing function is distributed throughout the system.

System I is a time division switching system where the switching function is distributed to a plurality of switching modules each connected to a number of lines and trunks. Each switching module provides connections among the lines and trunks connected to that module. Calls involving lines or trunks connected to different modules are completed through a time-multiplexed switch that interconnects the modules. Each switching module includes a control unit that controls the switching function of that module. The system also includes a central control that controls the switching function of the time-multiplexed switch. All calls within the system require the selection of what is referred to as a network time slot. For inter-module calls, the network time slot is used for transmission from one switching module, through the time-multiplexed switch, to another switching module. For intra-module calls, the network time slot is used within the switching module to connect one line or trunk to another line or trunk. (In the present embodiment, two network time slots are used for intra-module calls, one for each transmission direction.) Although the call processing function is distributed in System I in that the real-time intensive tasks associated with calls, e.g., signal processing, are performed by the switching module control units, the routing function, defined herein as the function of determining the terminating port, selecting the network time slot and setting up the time-multiplexed switch path if the call is an inter-module call, is centralized, being performed by the system central control. System I described herein is substantially the same as the time division switching system disclosed in U.S. Pat. No. 4,322,843, issued to H. J. Beuscher et al. on Mar. 30, 1982.

System II builds on System I by integrating four individual, remote switching modules into the system. However, in System II the routing function is performed in a distributed manner by the remote switching module control units and the system central control. The distribution is done in an efficient manner such that work done by one control entity, in particular time consuming database access tasks, need not be repeated by the next control entity.

System III also has four, remote switching modules in the system but rather than being individual modules, the four remote modules in System III are interconnected in a grouping referred to herein as a cluster. In System III, the routing function is again performed in a distributed manner. Systems II and III described herein are the same in many respects as the time division switching system including remote switching capability described in U.S. Pat. No. 4,550,404 issued to M. M. Chodrow et al. on Oct. 29, 1985. However, in the system of the Chodrow et al. U.S. Pat. No. 4,550,404, the routing function is not distributed but rather is performed centrally by the system central control.

System III illustrates an efficient method of processing sequence calls, i.e., forwarded calls or series-completion calls, in such a distributed-control switching system whereby sequence calls are always reduced to simple calls, i.e., calls involving only two ports.

System IV uses substantially the same hardware architecture as System I, but all of the call processing functions except selecting the network time slot and setting up the time-multiplexed switch path for inter-module calls are distributed to the switching modules rather than involving the system central control. In particular, the function of determining the terminating port can be done for all calls by the cooperative processing of only the switching modules.

In System IV, the directory number translation function is done in a manner allowing flexibility in assigning directory numbers to subscriber sets but minimizing the magnitude of the storage facilities required in each switching module. Multi-port hunt groups having members that span a number of switching modules are controlled in an efficient manner by assigning, for each multi-port group, one of the switching modules as the group controller for that multi-port group.

In System V, the remaining call processing functions of selecting the network time slot, also referred to herein as path hunting, and then setting up the time-multiplexed switch path accordingly for inter-module calls, are also distributed to the switching modules. In System V, the system central control is completely relieved of the call processing function, and performs only administrative and maintenance functions.

System I

Figure 2:
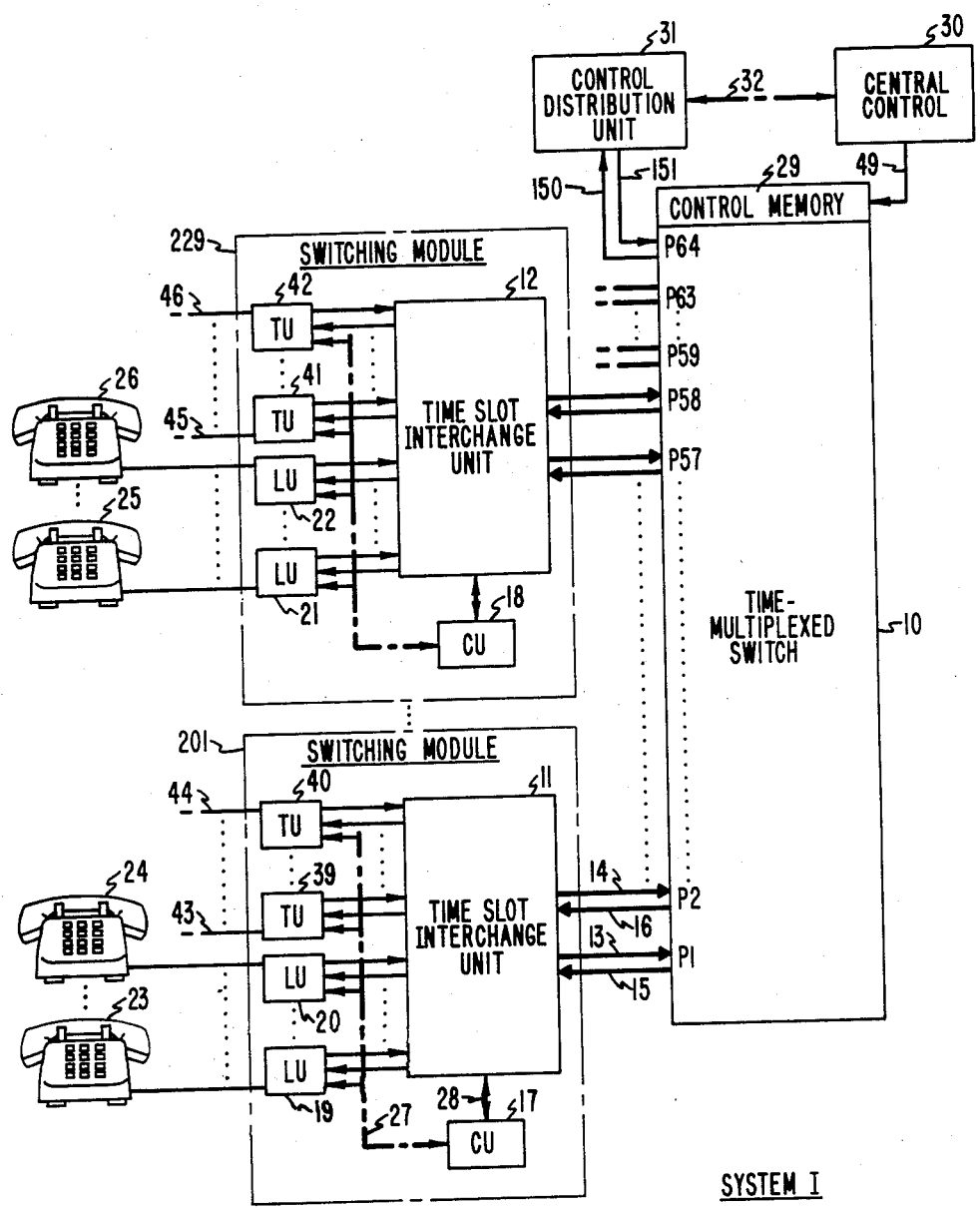
FIG. 2 is a diagram of a time division switching system that is referred to herein as System I and that is substantially the same as the system disclosed in U.S. Pat. No. 4,322,843, issued to H. J. Beuscher et al. on Mar. 30, 1982.

The time division switching system of FIG. 2, referred to herein as System I, is used to interconnect subscriber sets such as subscriber sets 23 through 26 and trunks such as trunks 43 through 46 and includes a time-multiplexed switch 10 comprising a time-shared space division switch having 64 input terminals and 64 output terminals. Also included are 29 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input terminals and two output terminals of time-multiplexed switch 10. In System I, time-slot interchange unit 11 is connected to two time-multiplexed switch input terminals via time-multiplexed lines 13 and 14 and to two output terminals, via time-multiplexed lines 15 and 16.

In the description which follows, the input and output terminals of time-multiplexed switch 10 are referred to as input/output terminal pairs. This term is used since the source for data words to an input terminal of a given input/output terminal pair is also the destination for data words from the output terminal of that pair. As shown in FIG. 2, input/output terminal pair P1 is associated with time-multiplexed lines 13 and 15. Each time-multiplexed line 13 through 16 conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected via individual time-multiplexed lines to a plurality of peripheral units of which line units 19 through 22 and trunk units 39 through 42 are shown in FIG. 2. A time-slot interchange unit and its associated control unit and peripheral units are collectively referred to herein as a switching module. Line units 19 and 20 and trunk units 39 and 40 are connected to time slot interchange unit 11 in switching module 201 and line units 21 and 22 and trunk units 41 and 42 are connected to time-slot interchange unit 12 in switching module 229. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The trunks units, e.g., 39 and 40, perform analogous functions for trunks such as detecting trunk seizures and controlling and detecting trunk signaling with other systems. The trunks can be either of the analog or digital type. One example of such a digital trunk is the T1 carrier system disclosed in the J. H. Green et. al., U.S. Pat. No. 4,059,731, on which 24 separate communication channels are multiplexed.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Furthermore, an analogous relationship exists between trunks, trunk units and time-slot interchange units. Line unit 19 scans the lines connected to each subscriber set to detect requests for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. Line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and the time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switch 10 under the control of control units 17 and 18.

Time multiplexed switch 10 operates in recurring frames of time slots where each 125-microsecond frame comprises 256 time slots. During each time slot, time-multiplexed switch 10 is capable of connecting data words received at any of its 64 input terminals to any of its 64 output terminals in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output terminal P64 while during the next time slot TS 2 the next channel (2) on time-multiplexed line 13 may be switched to an output terminal P57. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output terminal pair is predefined to be a control channel. Additionally, a given channel is used as a control channel for only one pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output terminal P64 and connects input terminal P64 to the output terminal associated with the above-mentioned control channel. The following is an example of the operation of System I when channel 1 is the control channel for time-multiplexed lines 13 and 15, and channel 2 is the control channel for time-multiplexed lines 14 and 16. During time slot TS 1 information from control memory 29 defines, among other connections, that the control word in channel 1 of time-multiplexed line 13 is connected to output terminal P64 and that the control word in channel 1 at input terminal P64 is connected to time-multiplexed line 15. Similarly, during time slot TS 2, information from control memory 29 defines that the control word in channel 2 of time-multiplexed line 14 is connected to output terminal P64 and that the control word in channel 2 at input terminal P64 is connected to time-multiplexed line 16. When operating in this manner, output terminal P64 receives from time-multiplexed switch 10 all control words in a channel having the same numerical designation in which they were transmitted to the time-multiplexed switch. Further, each control channel is connected to receive control words from input terminal P64 during the time slot having the same numerical designation as their associated control channel. Control words switched to output terminal P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input terminal P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input terminal P64 during the channel having the same numerical designation as the control channel associated with time-slot interchange unit 12. A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the time-slot interchange units by transmitting to the control distribution unit 31 a control message having a destination portion defining the particular time-slot interchange unit. This transmission is also accomplished utilizing communication link 32. The operation of a particular embodiment of control distribution unit 31 is described in detail in the above-cited Beuscher et al. U.S. Pat. No. 4,322,843.

Figure 3:
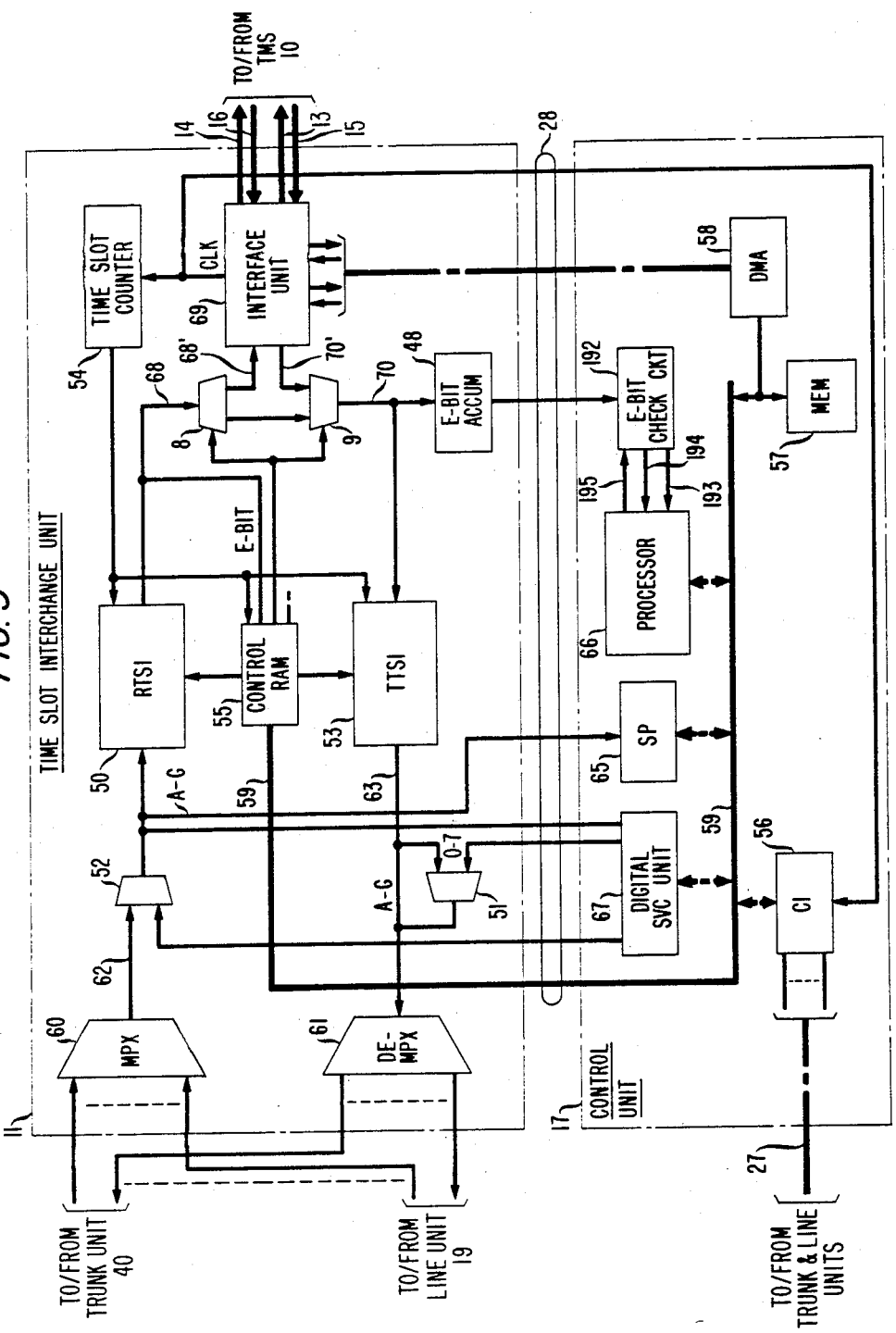
FIG. 3 is a more detailed diagram of a time-slot interchange unit and an associated control unit utilized in System I.
Figure 6:
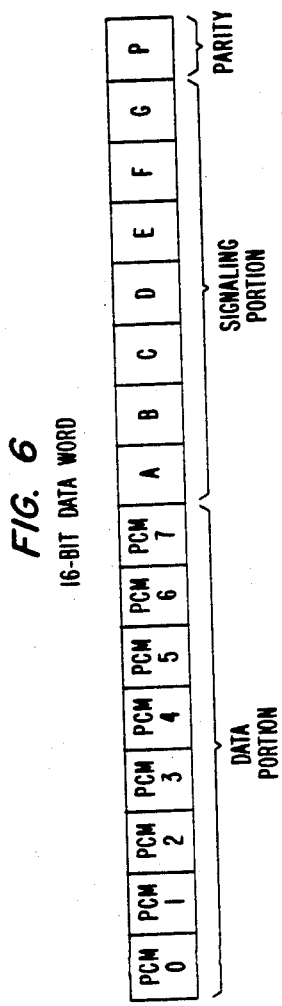
FIG. 6 is a diagram of a data word format utilized in System I.

Each of the control units, e.g., 17 and 18, includes a memory 57 (FIG. 3) which stores the program for the control of its associated control unit and data regarding the primary function of the control unit, its associated time-slot interchange unit and its associated subscribers. The main processing entity of control unit 17 is a processor 66 (FIG. 3) which operates in response to instructions stored in memory 57. Control unit 17 includes a control interface circuit 56 which receives instructions from processor 66 via a bus 59 and in response thereto, communicates with the peripheral units, e.g., line units 19 and 20 and trunk units 39 and 40, via communication path 27. Control unit 17 also includes a signal processor 65 and a digital service unit 67. Signal processor 65 reduces the real time load requirement of processor 66 by receiving and analyzing the signaling portion (bits A through G, FIG. 6) of each data word received by time-slot interchange unit 11. Digital service unit 67 receives the data portion (FIG. 6) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switch 10. The operation of control interface circuit 56, signal processor 65 and digital service unit 67 as well as line unit 19 is described in detail in the above-cited Beuscher et al. U.S. Pat. No. 4,322,843. An example of trunk unit 39 includes the digital facility interface described in the above-cited U.S. Pat. No. 4,550,404 for use with T1 carrier systems.

Each of the peripheral units transmits recurring frames each comprising 32 or 64 digital channels of 16 bits each. This information is transmitted to a multiplex unit 60 (FIG. 3) within time-slot interchange unit 11. Multiplex circuit 60 receives the output signals from the peripheral units which signals are reformatted and transmitted on an output time-multiplexed line 62 having 512 channels for each 125-microsecond frame. Similarly, a demultiplex circuit 61 receives 512 channels of 16 bits each on a time-multiplexed line 63 which channels are distributed in a predetermined arrangement to the peripheral units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed multiplexed line 68, a gate 8, a time-multiplexed line 68' and an interface unit 69. Data words from time-multiplexed switch 10 are received by time-slot interchange unit 11 by interface unit 69, and are conveyed via a time-multiplexed line 70', a gate 9 and a time-multiplexed line 70 to transmit time-slot interchanger 53. For calls among the peripheral units connected to time-slot interchange unit 11, control RAM 55 effects the operation of gates 8 and 9 such that data words transmitted by receive time-slot interchanger 50 on time-multiplexed line 68 are conveyed via gates 8 and 9 and time multiplexed line 70 to transmit time-slot interchanger 53. Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to a peripheral unit, e.g., line unit 19. It should be noted that control RAM 55 may be implemented as a number of control memories each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

The primary mode of control information exchange in System I presently being described comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via the time-multiplexed switch 10 utilizing the time slot assigned for that call. The E-bit position of the data word in the call time slot is used for the secondary mode communication. However, it can be seen that any or all of the signaling bits could be used in this secondary communication mode. The E-bit serves the dual purposes of communication path continuity check and signal acknowledgment. The operation of E-bit accumulator 48 and E-bit check circuit 192, which communicates with processor 66 via conductors 193, 194, and 195 in performing these dual purposes is described in detail in the above-cited Beuscher et al. U.S. Pat. No. 4,322,843.

Figure 4:
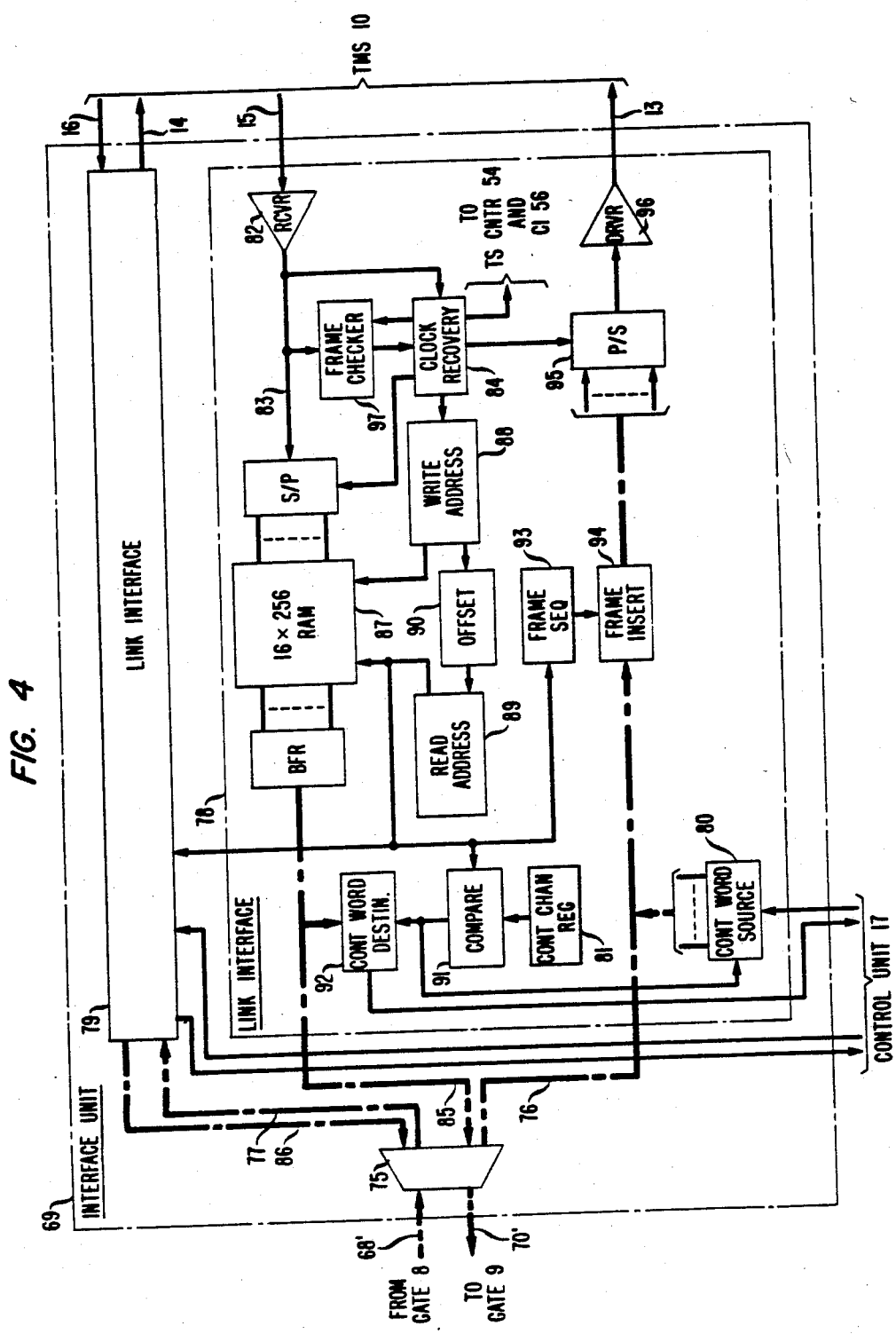
FIG. 4 is a diagram of an interface unit included within each time-slot interchange unit which is utilized for communication with a time-multiplexed switch of System I.

The following is a description of the primary mode of communication between the various control entities of the switching system. Processor 66, in response to a complete dialed number, performs translations with regard to that dialed number and formulates a control message for central control 30 (FIG. 2) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 4) in interface unit 69 for transmission on the time-multiplexed line to time-multiplexed switch 10. Similarly, control messages are received from other control units and central control 30 at a control word destination register 92 (FIG. 4) in interface unit 69 and transmitted by DMA unit 58 to the memory 57 where they are read by processor 66. Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchanger 50 via time-multiplexed line 68' and to transmit data words to transmit time-slot interchanger 53 via time-multiplexed line 70'. Recall that both time-multiplexed lines 68' and 70' convey data words at the rate of 512 channels per 125-microsecond frame. Multiplex/demultiplex circuit 75 splits the information received on time-multiplexed line 68' into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70'. This combination occurs by alternatingly transmitting the data words from time-multiplexed lines 85 and 86 such that the data words from time-multiplexed line 85 are transmitted in the odd-numbered channels of time-multiplexed line 70' while data words from time-multiplexed line 86 are transmitted in even-numbered channels. Time-multiplexed lines 76 and 85 are connected to link interface 78 and time-multiplexed lines 77 and 86 are connected to link interface 79. It should be noted that the time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68' are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70' immediately after the data word received by multiplex/demultiplex circuit 75 substantially simultaneously therewith. In the course of the following description, the time slot of a given data word refers to its time slot with respect to link interfaces 78 and 79 and the time-multiplexed switch 10. For example, data words from channels 1 and 2 of time-multiplexed line 68' are both associated with time slot 1 of the link interfaces 78 and 79 and the time-multiplexed switch 10. Each of the link interface units 78 and 79 is uniquely associated with one input/output port pair of time-multiplexed switch 10.

Link interface 78 (FIG. 4) includes the receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is approximately one-fourth of a frame (64 time slots) behind the addresses generated by the write address generator 88.

Link interfaces 78 and 79 of interface unit 69 operate in a master/slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to a control word destination register 92. Control word destination register 92, in response to the gating signal from comparator 91, stores the information on time-multiplexed line 85. During that particular channel, the information on time-multiplexed line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to a frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with the clock recovery circuit 84 in a manner well known in the art.

Figure 5:
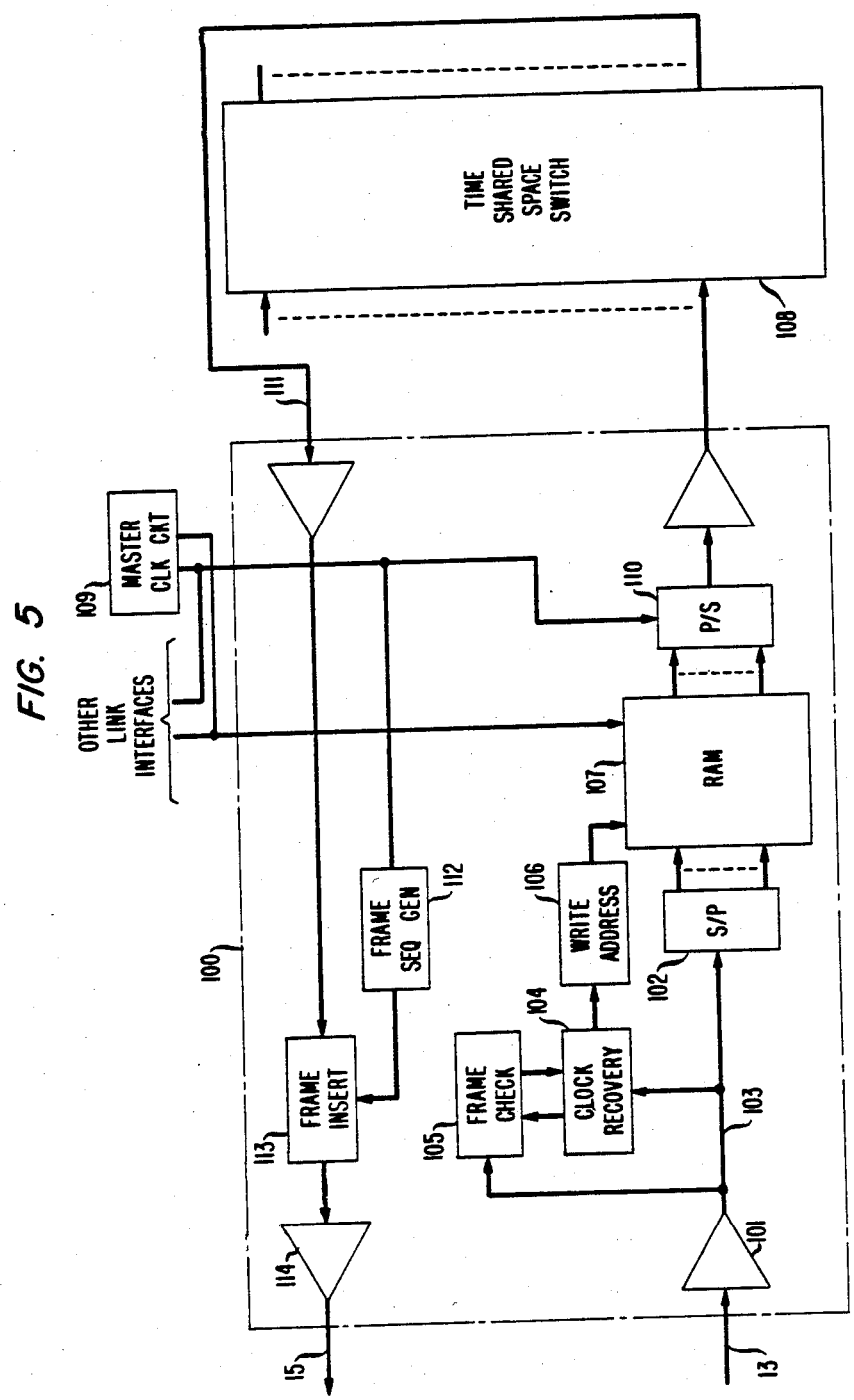
FIG. 5 is a diagram of an interface unit of a time-multiplexed switch which is utilized for communication with a time-slot interchange unit of System I.

The input and output terminals of time-multiplexed switch 10 can be considered in pairs for both terminals are connected to the same link interface. Further, each pair of input and output terminals of the time-multiplexed switch 10 is connected to a time-multiplexed switch link interface of a type similar to link interfaces 78 and 79. Link interface 78 is connected to a time-multiplexed switch link interface 100 (FIG. 5) including a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output terminals. Control information defining the switching path between the input and output terminals to be connected during each time slot is stored in control memory 29 (FIG. 2) which is read each time slot to establish those connections. Recall that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. The data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

Centralized Routing

In System I, the overall control function is cooperatively accomplished by central control 30 and the control units in the switching modules, e.g., control unit 17 in switching module 201. For the purposes of the discussion which follows, control functions performed by the switching module control units are described simply as being performed by the switching modules. The overall processing task of the system is broken down into a number of major tasks called program processes. A process comprises a collection of procedures, each performing some subtask of the process. Associated with a process is a block of memory called a process control block which stores data applicable to the entire process, and a block of memory called a stack which stores data useful to the individual procedures of the process. Processes communicate with each other via messages. The same type of message is used in communicating with another process in the same processor, or another process in a different processor.

In System I, processes are of two types: terminal processes and system processes. System processes remain in existence as long as the system is operational. Terminal processes on the other hand remain in existence only for the duration of individual calls or service events such as diagnostic tests or service evaluation. For each call, two terminal processes are created—an originating terminal process in the switching module connected to the originating line or trunk and a terminating terminal process in the switching module connected to the terminating line or trunk. As an example, consider that subscriber set 25 connected to switching module 229 has just gone off-hook. The off-hook state is detected by scanning within line unit 21. A call processing control system process 2001 (FIG. 7) within switching module 229 is informed of such off-hook detection and, in response, creates an originating terminal process 2002. Originating terminal process 2002 is responsible for controlling the transmission of dial tone to subscriber set 25 and the subsequent reception of digits dialed from subscriber set 25. Originating terminal process 2002 analyzes the dialed digits to obtain values of four variables: PI, DI, DIGCNT and TREAT. The variable PI is the prefix index defining whether a prefix was dialed and if so the prefix type, e.g., the 0+ prefix used for operator-assisted toll calls or the 1+ prefix used for direct-dialed toll calls. The variable DI is the destination index which defines one of a number of possible destination categories for the call, e.g., based on the first three digits (the nxx digits) of the seven-digit directory number, the destination index may define that the destination is a local line or is accessible via one of a plurality of groups of trunks connecting the present system to certain other switching systems. The variable DIGCNT simply defines the number of digits dialed. The variable TREAT defines whether the dialed digits can be processed to complete a call or, as in the case where the calling party only partially dials the intended number, an appropriate announcement is to be transmitted to subscriber set 25. In addition, originating terminal process 2002 determines the value of a screen index SI, based on the characteristics of the originating line, e.g., whether it is a typical residential line or it is connected to a private branch exchange (PBX) or key system. Originating terminal process 2002 then formulates a route request message RTREQ in a message buffer. As shown in FIG. 14, the RTREQ message includes five fields: PATHDES, RTGDATA, DIALDATA, GPI and TREAT. (As with other data structures, messages and relations referred to herein, the RTREQ message may include additional fields not important in understanding the present description.)

The PATHDES field stores a path descriptor used to specify the path through the switching system to be used for the call. Such a path is completely described by specifying the originating peripheral time slot, the network time slot and the terminating peripheral time slot. The originating peripheral time slot is the particular one of the 512 time slots in which information from the originating line or trunk is received by receive time-slot interchanger 50 (FIG. 3) and in which information from transmit time-slot interchanger 53 (FIG. 3) is transmitted to the originating line or trunk. Similarly, the terminating peripheral time slot is the one of the 512 time slots that is used for communication with the terminating line or trunk. The network time slot is the selected commonly available time slot of the 512 time slots transmitted by the receive time-slot interchanger 50 in the originating switching module and of the 512 time slots received by the transmit time-slot interchanger 53 in the destination switching module. To establish the complete path, information must be stored in the control RAM 55 (FIG. 3) in both the originating and terminating switching modules defining the mapping between peripheral time slot and network time slot to be accomplished by time-slot interchange. Intra-module calls are not transmitted through time-multiplexed switch 10. However, for inter-module calls, information is stored in control memory 29 defining that during the network time slot selected for a given call, time-multiplexed switch 10 must provide a path from the originating switching module to the terminating switching module. In the present example, originating terminal process 2002 only knows the originating peripheral time slot for the call at this time. The remainder of the PATHDES field is left blank.

The RTGDATA field is used to store a number of variables used to implement certain call processing features not important to the understanding of the present description and not further described herein. The RTGDATA field also stores a variable TERMTYP used subsequently to define the type of termination for the call, i.e., whether a line, trunk or announcement termination. The DIALDATA field is used to store the variables PI, DI, SI, and DIGCNT determined by originating terminal process 2002 as well as the received dialed digits. The GPI field is used to store the global port identity of the port connected to originating subscriber set 25. The point at which a given line or trunk is connected to the switching system of FIG. 2 is referred to herein as a port. (In the case of a multiple-channel digital facility, each channel is considered to be connected to a different port.) Each port of the system has a unique global port identity. A number of announcement circuits included in digital service unit 67 (FIG. 3) each also have unique global port identities. For ports connected to party lines, the GPI field also identifies the individual parties on those lines. In the RTREQ message, the GPI field defines the global port identity of the originating port. The TREAT field is used to store the TREAT variable determined by originating terminal process 2002.

Once the RTREQ message has been formulated, it is transmitted by originating terminal process 2002 to a routing system process 2003 (FIG. 7) in central control 30. Routing system process 2003 stores the RTREQ message in a data structure referred to as a routing data block (RDBLK) 2101. Routing system process 2003 uses the information in the RTREQ message to access a centralized database, in a manner described in detail herein, in order to determine the global port identity of the terminating port. Routing system process 2003 also selects an available network time slot to be used for the call and, if the terminating port is connected to a different switching module than the originating port, writes information defining the selected time slot into control memory 29. Routing system process 2003 then formulates depending on the value of the TERMTYP variable, a line termination request (LNTREQ) message, a trunk termination request (TKTREQ) message or an announcement termination request (ANTREQ) message in a message buffer. As shown in FIG. 14, the LNTREQ message includes four fields: PATHDES, RTGDATA, FARPID and GPI. The PATHDES and RTGDATA fields were previously described with respect to the RTREQ message. However the network time slot as determined by routing system process 2003 is added into the PATHDES field. The FARPID field is used to store a process identifier defining the originating terminal process, in the present example, originating terminal process 2002, as determined from the header of the RTREQ message. The GPI field store the global port identity of the terminating port as determined by routing system process 2003. When the terminating port is connected to a trunk or to an announcement circuit, a TKTREQ message or an ANTREQ message is formulated. As shown in FIG. 14, the TKTREQ message and the ANTREQ message include the same fields as the LNTREQ message and, in addition, the TKTREQ message includes a DIGDATA field used to store the digits to be transmitted over the trunk to another switching system. Assume for the present example that the terminating port determined by routing system process 2003 (FIG. 7) is connected to subscriber set 23. The LNTREQ message formulated in the message buffer is transmitted by routing system process 2003 to a termination system process 2004 in switching module 201. In response, process 2004 reads a busy/idle map (also referred to later herein as the PORTSTATUS relation) stored in switching module 201 to determine whether subscriber set 23 is presently busy or idle. If subscriber set 23 is idle, process 2004 creates a terminating terminal process 2005 and forwards the information received in the LNTREQ message to process 2005 via a line termination (LNTERM) message (or, in a trunk termination (TKTERM) message or an announcement termination (ANTERM) message, if a TKTREQ message or an ANTREQ message had been received). Terminating terminal process 2005 effects the transmission of ringing voltage to subscriber set 23, and the transmission of an E-bit continuity signal, described in the above-cited Beuscher et al. U.S. Pat. No. 4,322,843, and audible ringing tones to switching module 229. Terminating terminal process 2005 then transmits a setup complete (SETUPCOMP) control message to originating terminal process 2002 in switching module 229 including the now completed path descriptor PATHDES. In response, originating terminal process 2002 effects the transmission of the E-bit continuity signal to switching module 201. When switching module 201 receives the E-bit continuity signal from switching module 229, terminating terminal process 2005 determines the terminating peripheral time slot to be used to communicate with subscriber set 23 and writes information in the control RAM 55 of switching module 201 defining the mapping between the terminating peripheral time slot and the network time slot. Similarly, when switching module 229 receives the E-bit continuity signal from switching module 201, originating terminal process 2002 determines the originating peripheral time slot to be used to communicate with subscriber set 25 and writes information in the control RAM 55 of switching module 229 defining the mapping between the originating peripheral time slot and the network time slot. The communication path between subscriber sets 25 and 23 has now been set up.

Figure 7:
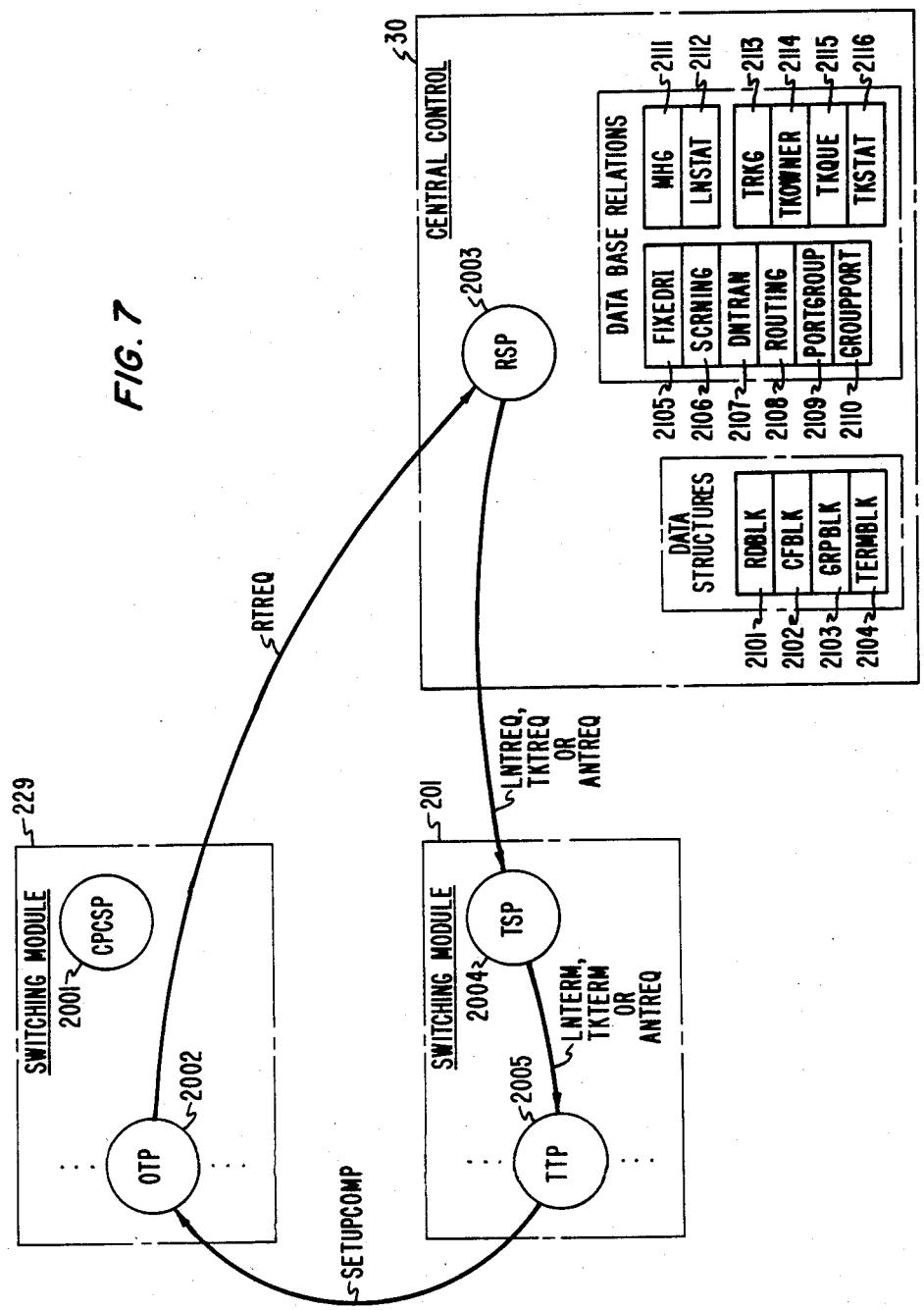
FIG. 7 is a functional diagram used to illustrate an exemplary call setup sequence in System I.
Figure 8:
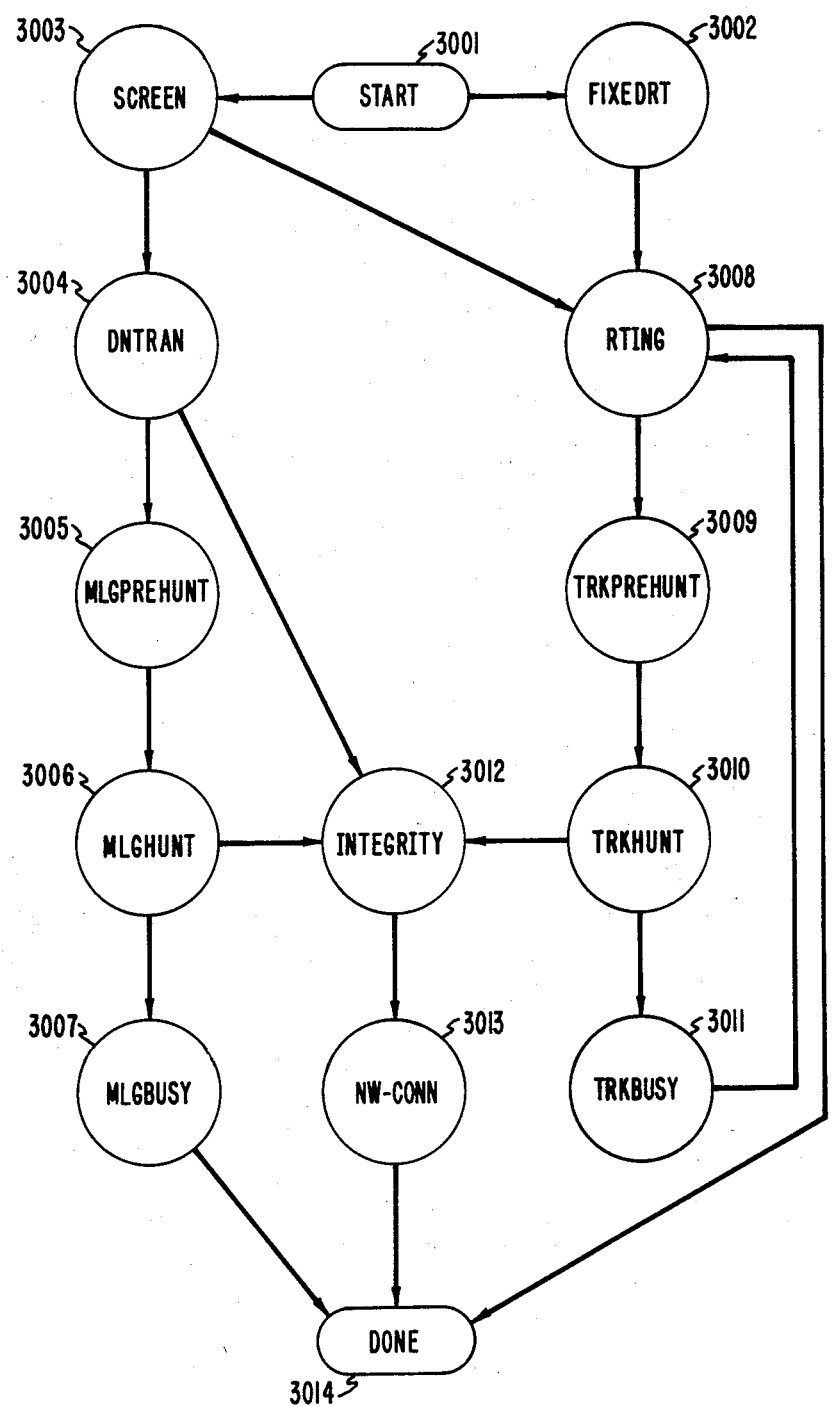
FIG. 8 is a state diagram for a routing program used in System I.
Figure 9:
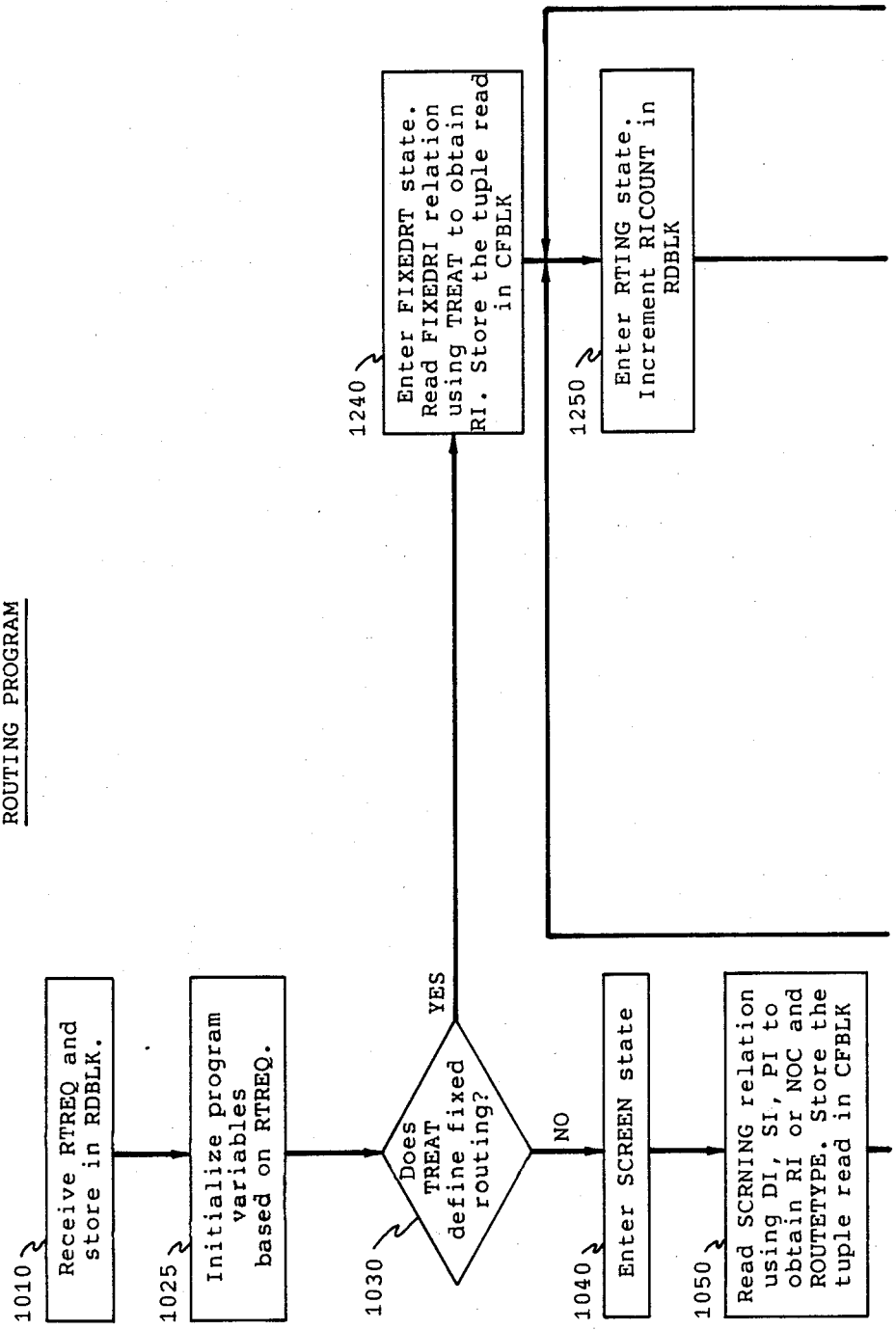
FIGS. 9 through 13, when arranged in accordance with FIG. 57, present a flow chart for the routing program used in System I.
Figure 10:
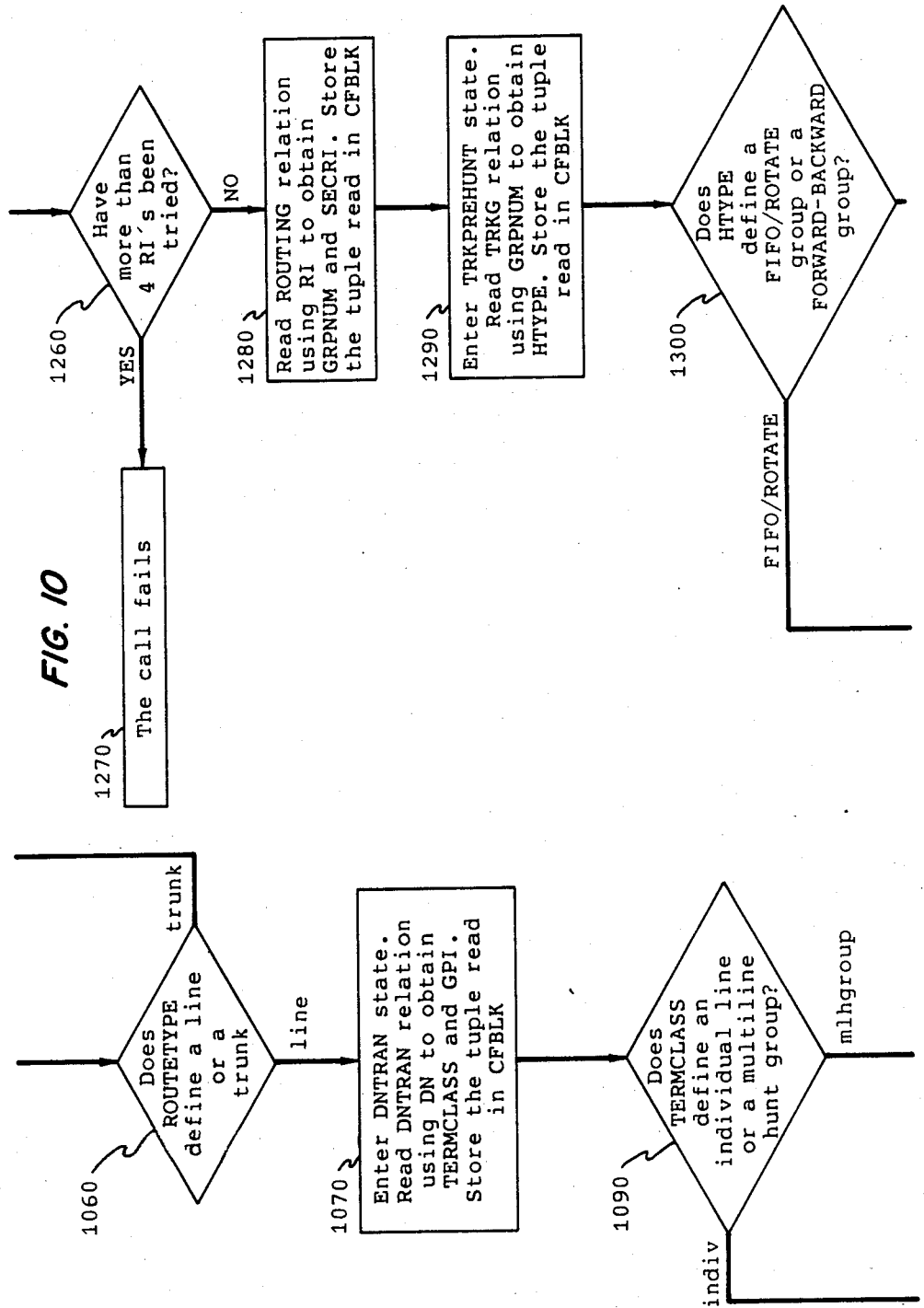
Figure 11:
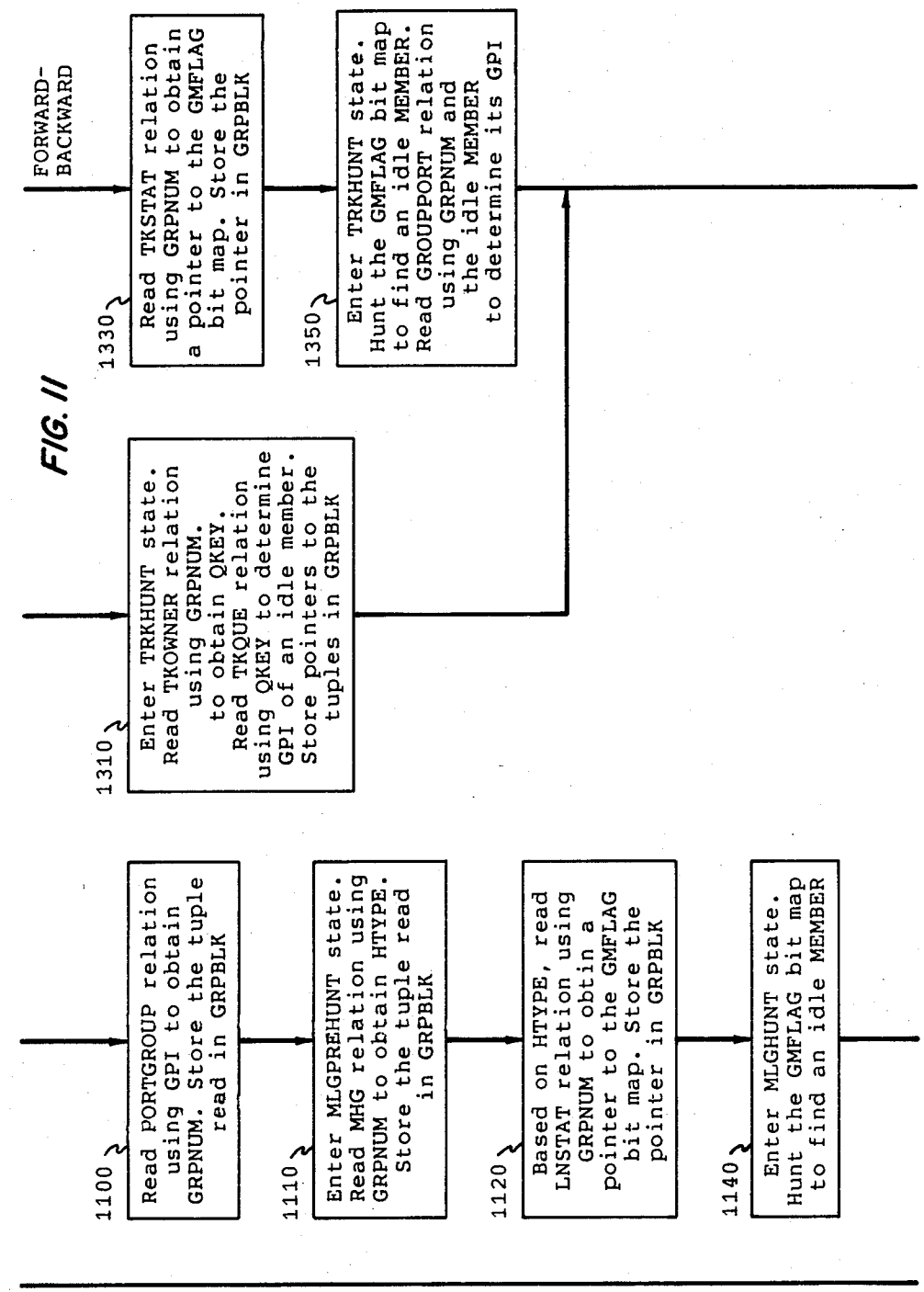
Figure 12:
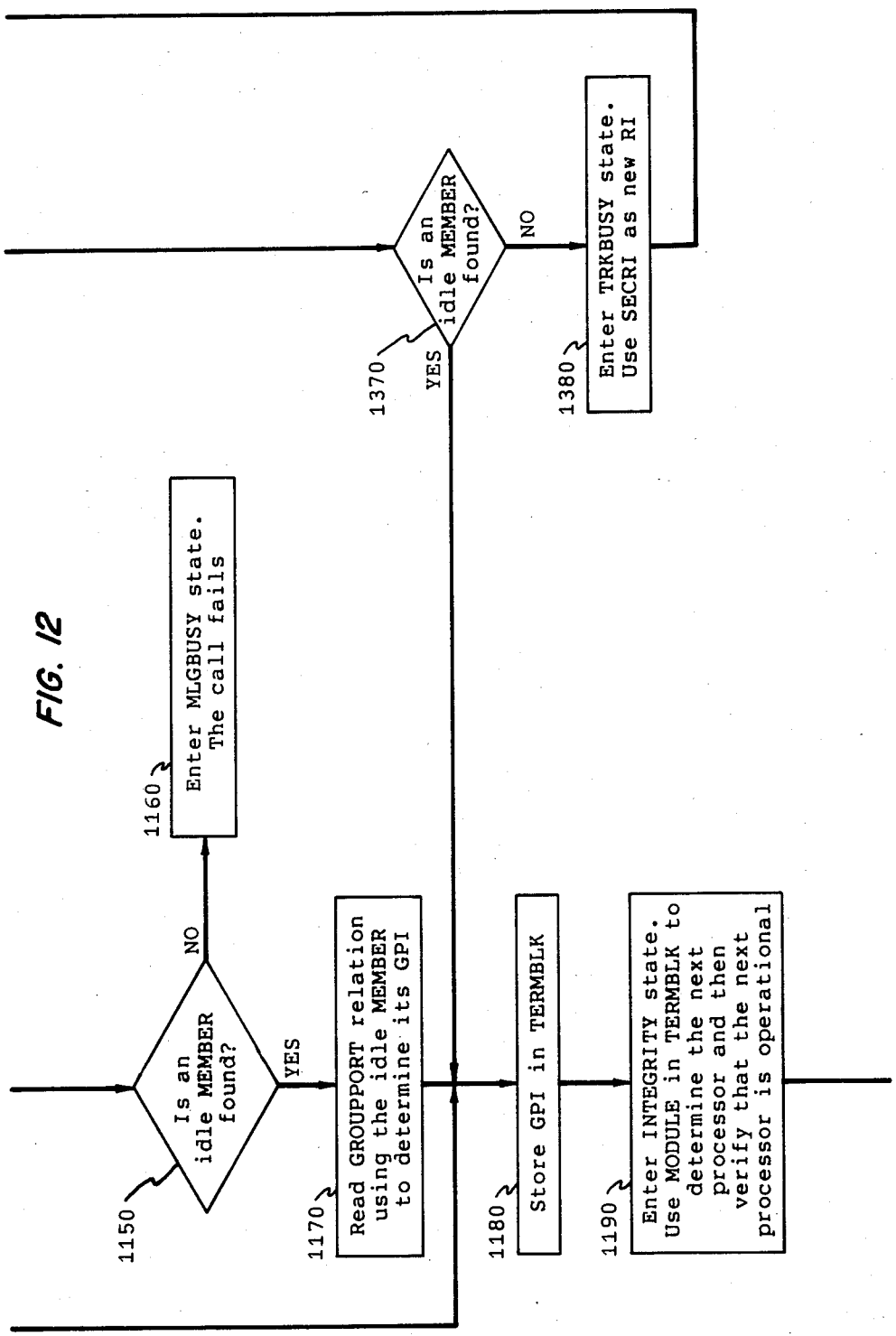
Figure 13:
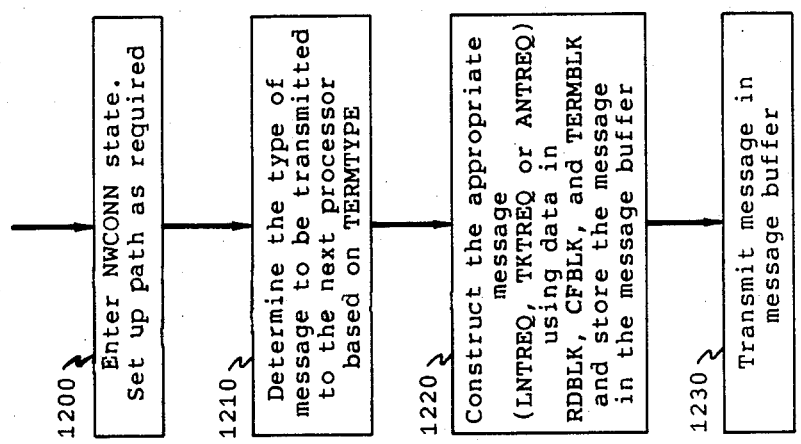

Recall that routing system process 2003 performed three basic functions in the described example--determining the terminating port and its global port identity, selecting an available network time slot and, for inter-module calls, setting up the path through time-multiplexed switch 10, i.e., writing information defining the selected time slot in control memory 29. A flow chart of the routing program executed by routing system process 2003 in performing these functions is shown in FIG. 9 through 13. A state diagram defining the operational states of routing system process 2003 is shown in FIG. 8. In System I presently being described, the single routing system process 2003 performs the functions of terminating port determination and network time slot selection for all calls within the system. Routing system process 2003 also performs the function of time-multiplexed switch 10 path setup for all inter-module calls. Routing system process 2003 processes one call at a time—i.e., it responds to each RTREQ message by executing the routing program to generate either a LNTREQ message, a TKTREQ message or an ANTREQ message. As shown in FIG. 7, routing system process 2003 uses four data structures during program execution—a routing data block (RDBLK) 2101, a call flow block (CFBLK) 2102, a group block (GRPBLK) 2103 and a termination block (TERMBLK) 2104. Routing system process 2003 also has access to a centralized database comprising 12 relations 2105 through 2116 described later herein.

Relational databases are considered to be a collection of relations, as described in C. J. Date, *An Introduction to Database Systems*, 3rd edition, Addison-Wesley, 1981. A relation can be considered as a rectangular table. Rows in the table are called tuples and columns are attributes having unique names. A named attribute in a specific tuple is referred to as an item. A key is a subset of attributes whose values are used to uniquely identify a tuple of the relation. A key is said to be composite if it consists of more than one attribute. Occasionally, a relation may have more than one candidate key. In that case, one of the candidates is designated as the primary key of the relation. Each attribute can take on a specific set of values, called the domain of the attribute. An illustrative relation named PART is shown in Table 1.

TABLE 1

| | The Relation PART | | | |
|---|---|---|---|---|
| P# | PNAME | COLOR | WEIGHT | CITY |
| P1 | Nut | Green | 13 | Amsterdam |
| P2 | Bolt | Red | 18 | Tel Aviv |
| P3 | Bolt | Blue | 18 | Rome |
| P4 | Screw | Blue | 15 | London |
| P5 | Cam | Yellow | 13 | Paris |

TABLE 1-continued

| | The Relation PART | | | |
|---|---|---|---|---|
| P# | PNAME | COLOR | WEIGHT | CITY |
| P6 | Cog | Black | 20 | Rome |

The attribute P# is the primary key of the relation since specifying its value serves to uniquely identify a tuple of the relation. For example, specifying P#=P4 identifies the tuple (P4, Screw, Blue, 15, London).

The execution of the routing program (FIG. 9 through 13) begins in the START state 3001 (FIG. 8) when a RTREQ message is received. During block 1010 (FIG. 9), the received RTREQ message is stored in the first two fields—the HEADER field and the TEXT field—of the routing data block RDBLK (FIG. 15). The message header is analyzed and the process identity of the originating terminal process is stored in the ORIGTPI field of RDBLK. The RTGSTATE field of the RDBLK defines the state in the state diagram of FIG. 8 that the routing program is presently in. The RTGSTATE field is updated to define the next state before each state transition occurs. The RICOUNT field is used in connection with trunk routing as described later herein.

Execution proceeds first to block 1025 (FIG. 9) during which a number of program variables are initialized based on the RTREQ message, and then to decision block 1030 during which it is determined whether the variable TREAT as received in the RTREQ message defines a request for fixed routing, for example, routing to an announcement informing the originating subscriber that the number was only partially dialed. If the variable TREAT defines fixed routing, execution proceeds to block 1240 during which the FIXEDRT state 3002 (FIG. 8) is entered. One of the variables initialized is TERMTYP which defines that the requested termination is an announcement circuit. The FIXEDRI relation (FIG. 16) is read using TREAT as the key to obtain a route index (RI) that will be subsequently used to find the global port identity of the appropriate announcement circuit. The tuple of the FIXEDRI relation defined by the key TREAT is stored in the call flow block CFBLK (FIG. 15).

However, if the variable TREAT does not define fixed routing, execution proceeds from block 1030 to block 1040 during which the SCREEN state 3003 (FIG. 8) is entered. During block 1050, the SCRNING relation (FIG. 16) is read using the variables DI, SI and PI as the composite key. The SCRNING relation includes the attributes RI, NOC and ROUTETYPE. The ROUTETYPE attribute defines whether the terminating port is connected to a line or a trunk. In the case of a line, the NOC attribute defines the normalized office code of the terminating port. The normalized office code represents an encoding of the first three digits (nxx) of a seven-digit directory number. For example, the nxx numbers 355, 357 and 420 of a typical central office might be encoded as the normalized office codes 1, 2 and 3. When the ROUTETYPE attribute defines a trunk, the RI attribute defines a route index into the ROUTING relation (FIG. 16) which is subsequently read to obtain the number of a particular trunk group. The tuple read from the SCRNING relation as defined by the composite key DI, SI and PI, is stored in the CFBLK (FIG. 15).

Execution proceeds to decision block 1060 during which the ROUTETYPE attribute is examined to determine whether the requested termination is a line or a trunk. If the ROUTETYPE attribute defines a line, execution proceeds to block 1070 and the DNTRAN state 3004 (FIG. 8) is entered. The TERMTYP variable is set to define that the requested termination is a line. Recall that the digits dialed by the originating subscriber set were transmitted as part of the RTREQ message and that the normalized office code (NOC) was obtained by reading the SCRNING relation. Directory numbers (DNs) stored by central control 30 for the purpose of directory number translation are not stored as seven-digit numbers but rather as five-digit numbers comprising the combination of the single-digit NOC with the last four dialed digits. The DN obtained by combining the NOC from the SCRNING relation with the last four dialed digits received in the RTREQ message is used as a key to read the DNTRAN relation (FIG. 16). The DNTRAN relation includes a TERMCLASS attribute which defines whether the line defined by the key is an individual line or is part of a multi-line hunt group, and the GPI attribute which defines the global port identity of the line. The tuple of the DNTRAN relation defined by the key DN is stored in the CFBLK (FIG. 15) and execution proceeds to decision block 1090.

During block 1090, a determination is made based on the TERMCLASS attribute, of whether the defined line is an individual line or is part of a multi-line hunt group. When an individual line is indicated, the function of determining the terminating port has been completed and execution proceeds to block 1180 during which the GPI of the terminating port is stored in the TERMBLK (FIG. 15). Note that the GPI comprises two fields—the MODULE field defining which of the switching modules includes the terminating port and the PORT field defining a particular one of the ports on that switching module.

Execution proceeds to block 1190 and the INTEGRITY state 3012 (FIG. 8) is entered. Central control 30 periodically communicates with the control units of each of the switching modules to verify their operational status and maintains such status information in a status table. During block 1190, the status table is read using the MODULE field stored in the TERMBLK, to verify that the processor in the defined switching module is operational. In block 1200, the NWCONN state 3013 (FIG. 8) is entered. During block 1200 an available network time slot is selected and, if the call is an intermodule call, the instructions defining the selected time slot are stored in control memory 29. In block 1210, the TERMTYP variable is used to determine whether a LNTREQ message, a TKTREQ message or an ANTREQ message is to be formulated in the message buffer. The appropriate message is then constructed during block 1220 using data in the RDBLK, CFBLK and TERMBLK data structures. Execution then proceeds to block 1230 during which the message stored in the message buffer is transmitted to the control unit in the terminating switching module and the DONE state 3014 (FIG. 8) is entered.

Returning to decision block 1090, if the TERMCLASS attribute, rather than defining an individual line, instead defines a multi-line hunt group, execution proceeds from block 1090 to block 1100. A multi-line hunt group is a group of lines which share the same directory number or set of directory numbers. In block 1100, the PORTGROUP relation (FIG. 16) is read using as a key the GPI obtained from the DNTRAN relation. The PORTGROUP relation includes the GRPNUM attribute which defines the number of a multi-line hunt group and the MEMBER attribute which defines the particular member of a given group. The tuple read from the PORTGROUP relation is stored in the GRPBLK (FIG. 15), execution proceeds to block 1110 and the MLGPREHUNT state 3005 (FIG. 8) is entered. During block 1110, the MHG relation (FIG. 17) is read using the GRPNUM attribute as a key. The MHG relation includes the HTYPE attribute which defines one of a number of relations that store the dynamic busy/idle data for multi-line hunt groups, only the LNSTAT relation (FIG. 17) being included in the present description for illustration. The tuple read from the MHG relation is stored in the GRPBLK (FIG. 15). Given that the HTYPE attribute defines the LNSTAT relation, execution proceeds to block 1120. During block 1120, the LNSTAT relation is read using the GRPNUM attribute as a key. The LNSTAT relation includes the GMFLAG bit map defining the busy/idle status of each member of the hunt group. Rather than storing the entire bit map, a pointer to that bit map is stored in the GRPBLK (FIG. 15), execution proceeds to block 1140 and the MLGHUNT state 3006 (FIG. 8) is entered. During block 1140, an idle member of the hunt group is selected. The GMFLAG. bit map accessible via the stored pointer is used to determine idle members. The selection is made in accordance with a predetermined hunt algorithm based on the HTYPE attribute. Execution proceeds to block 1150 during which it is determined whether the hunting done during block 1140 is successful in finding an idle hunt group MEMBER. If no such MEMBER is found, execution proceeds to block 1160, the MLGBUSY state 3007 (FIG. 8) is entered and the call fails. If, however, an idle MEMBER is found, execution proceeds to block 1170 and the GROUPPORT relation (FIG. 16) is read using the idle MEMBER and the GRPNUM attribute as keys to obtain the GPI of the terminating port. The function of determining the terminating port has now been completed and execution proceeds to block 1180 and proceeds through blocks 1190, 1200, 1210, 1220 and 1230 as described above.

Returning to decision block 1060, if the ROUTETYPE attribute, rather than defining a line, instead defines a trunk, execution proceeds from block 1060 to block 1250. The variable TERMTYPE is set to define that the requested termination is a trunk if block 1250 is reached from block 1060. Block 1250 is also reached from block 1240. In block 1250, the RTING state 3008 (FIG. 8) is entered, the RICOUNT variable in the RDBLK is incremented and execution proceeds to decision block 1260. During block 1260 it is determined whether more than a fixed number, e.g., four, route indices (RIs) have been tried to complete the call. If so, execution proceeds to block 1270 and the call fails. However, if four or less RIs have been tried, execution proceeds to block 1280 during which the ROUTING relation (FIG. 16) is read using RI as a key. The ROUTING relation includes the GRPNUM attribute which is the number of a particular trunk group, and the SECRI attribute which is a secondary route index to use in case the call cannot be completed to the defined trunk group. The tuple from the ROUTING relation is stored in the CFBLK (FIG. 15).

Execution proceeds to block 1290 and the TRKPREHUNT state 3009 (FIG. 8) is entered. The TRKG relation (FIG. 18) is read using GRPNUM as a key. The TRKG relation includes the HTYPE attribute which defines the type of hunting to be used for the group. The TRKG tuple read is stored in the GRPBLK (FIG. 15) and execution proceeds to decision block 1300 during which it is determined whether the HTYPE attribute defines a first-in-first-out (FIFO) group, a rotate group or a forward/backward group. In the present example, the hunt group is either a FIFO group in the case of one-way outgoing trunks, a rotate group in the case of announcement circuits, or a forward/backward group in the case of two-way trunks. In FIFO hunt groups, trunks are assigned in the order that they become idle. In rotate hunt groups, announcement circuits are assigned on a rotational basis so that their use is equally distributed. In forward/backward hunt groups, a given switching system always hunts for an idle group member starting at the beginning of the group list while the switching system connected at their other end of the trunks, hunts for an idle group member starting at the end of the group list to reduce the likelihood of glare. If HTYPE defines a FIFO group or a rotate group, execution proceeds to block 1310 and the TRKHUNT state 3010 (FIG. 8) is entered. The TKOWNER relation (FIG. 18) is first read to obtain the attribute QKEY which is then used as a key to read the TKQUE relation (FIG. 18). The TKQUE relation includes the GPI attribute which defines the global port identity of the idle group member to be used for the call. The TKQUE relation also includes the NIM attribute which defines the next idle member of the group to be used the next time the TKQUE relation is accessed. Pointers to the tuples from the TKOWNER relation and the TKQUE relation are stored in the GRPBLK (FIG. 15).

Returning to decision block 1300, if HTYPE defines a forward/backward group, execution proceeds to block 1330 during which the TKSTAT relation (FIG. 18) is read using GRPNUM as a key. The TKSTAT relation includes the GMFLAG bit map defining the busy/idle status of each member of the trunk group. Rather than storing the entire bit map, a pointer to that bit map is stored in the GRPBLK (FIG. 15), execution proceeds to block 1350 and the TRKHUNT state 3010 (FIG. 8) is entered. During block 1350, an idle member of the trunk group is selected in accordance with the predetermined forward or backward algorithm using the GMFLAG bit map accessible via the stored pointer. Using GRPNUM and the selected idle MEMBER as a composite key, the GROUPPORT relation (FIG. 16) is read to determine the GPI.

After the completion of either block 1350 or block 1310, execution proceeds to decision block 1370 during which it is determined whether the hunting done in blocks 1350 or 1310 was successful in finding an idle trunk group MEMBER. If no such MEMBER was found, execution proceeds to block 1380 and the TRKBUSY state 3011 (FIG. 8) is entered. The secondary route index (SECRI) read from the ROUTING relation is made the next route index (RI) and execution returns back to block 1250. However, if an idle MEMBER was found, the function of determining the terminating port has been completed and execution proceeds to block 1180 and proceeds through blocks 1190, 1200, 1210, 1220 and 1230 as described above.

System II

Figure 20:
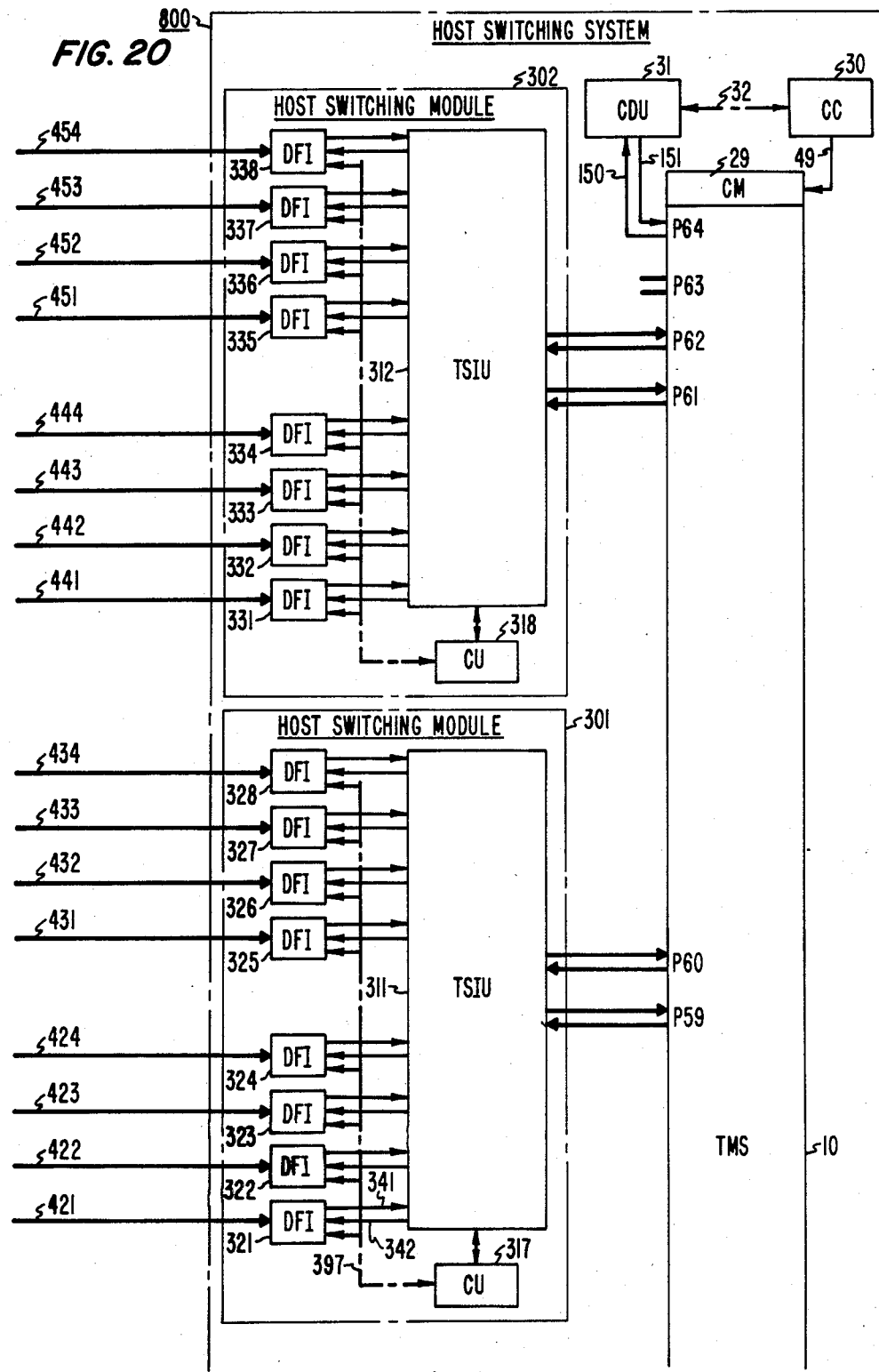
Figure 21:
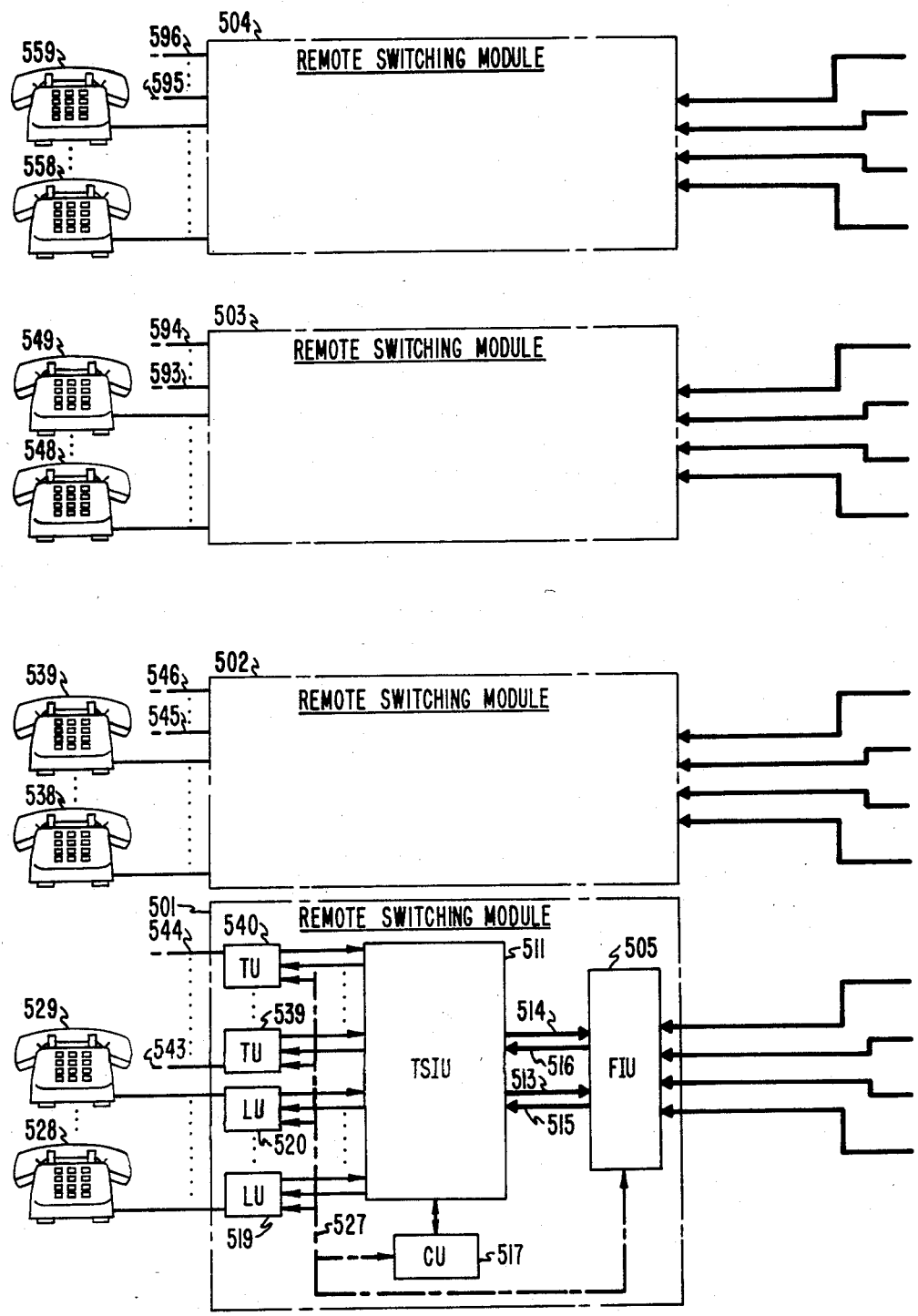

A time division switching system which includes a remote switching capability is shown in FIG. 19 through 21, when arranged in accordance with FIG. 22. The system, which is referred to herein as System II, includes a host switching system 800 (FIG. 19 and 20) and four, individual remote switching modules 501, 502, 503 and 504 (FIG. 21). Host switching system 800 comprises the time division switching system of FIG. 2, as described above, and two host switching modules 301 and 302, module 301 being connected to input/output terminal pairs P59 and P60 of time-multiplexed switch 10 and module 302 being connected to input/output terminal pairs P61 and P62. In this embodiment, each remote switching module is connected to a host switching module via four bidirectional, digital transmission facilities such as the T1 carrier system disclosed in the J. H. Green et al., U.S. Pat. No. 4,059,731. Specifically, host switching module 301 is connected to module 501 by transmission facilities 421 through 424 and to module 502 by transmission facilities 431 through 434 and host switching module 302 is connected to module 503 by transmission facilities 441 through 444 and to module 504 by transmission facilities 451 through 454.

Host switching module 301 includes a time-slot interchange unit 311 and an associated control unit 317 which are substantially identical to time-slot interchange unit 11 and control unit 17, respectively. Time-slot interchange unit 311 transmits and receives information via two 256-channel time-multiplexed lines connected to input/output terminal pairs P59 and P60 of time-multiplexed switch 10. Control channel 59 at input/output terminal pair 59 and control channel 60 at input/output terminal pair P60 are used to convey control messages between control unit 317 and control distribution unit 31. The digital facility interfaces 321 through 328 interfacing time-slot interchange unit 311 and the transmission facilities 421 through 424 and 431 through 434 are substantially identical. Digital facility interface 321 is described in detail in the above-cited Chodrow et al. U.S. Pat. No. 4,550,404.

Host switching module 302, comprising time-slot interchange unit 312, control unit 318 and digital facility interfaces 331 through 338, is substantially identical to module 301. Control unit 318 and control distribution unit 31 exchange control messages using control channel 61 at input/output terminal pair P61 and control channel 62 at input/output terminal pair P62.

The four remote switching modules 501 through 504 are substantially identical. Each remote switching module includes a facilities interface unit which, in the present embodiment, interfaces with the four digital transmission facilities from a host switching module. For example, remote switching module 501 (FIG. 21) includes facilities interface unit 505 which interfaces with facilities 421 through 424 from host switching module 301. Facilities interface unit 505 multiplexes and transmits the information received on the four transmission facilities connected thereto, in predetermined channels on a pair of 256-channel time-multiplexed lines 515 and 516 connected to a time-slot interchange unit 511 and appropriately demultiplexes and transmits information, received from time-slot interchange unit 511 on a pair of 256-channel time-multiplexed lines 513 and 514, in predetermined channels on the four transmission facilities. Facilities interface unit 505 is described in detail in the above-cited Chodrow et al. application Ser. No.

493,683. Remote switching module 501 also includes a control unit 517 associated with time-slot interchange unit 511 and a plurality of peripheral units, e.g., line units 519 and 520 serving subscriber sets such as sets 528 and 529 and trunk units 539 and 540 connected to trunks 543 and 544. The relationship of time-multiplexed lines 513 through 516, time-slot interchange unit 511, control unit 517, line units 519 and 520, subscriber sets 528 and 529, trunk units 539 and 540 and trunks 543 and 544 is substantially the same as that of time-multiplexed lines 13 through 16, time-slot interchange unit 11, control unit 17, line units 19 and 20 subscriber sets 23 and 24, trunk units 39 and 40 and trunks 43 and 44.

In the present embodiment, channel 1 on two of the four transmission facilities interconnecting a given remote switching module, e.g., 501, to host switching module 301 is established as a control channel. Accordingly, there are eight control channels between the four remote switching modules 501 through 504 and control distribution unit 31. The four control channels received by time-slot interchange unit 311 from transmission facilities 421 through 424 and 431 through 434 are conveyed to time-multiplexed switch 10 in channels 63 and 64 at input/output terminal pair P59 and channels 65 and 66 at input/output terminal pair P60. Similarly, the four control channels received by time-slot interchange unit 312 from transmission facilities 441 through 444 and 451 through 454 are conveyed to time-multiplexed switch 10 in channels 67 and 68 at input/output terminal pair P61 and channels 69 and 70 at input/output terminal pair P62. Central control 30 writes the appropriate instructions into control memory 29 such that channels 63 and 64 at input terminal P59, channels 65 and 66 at input terminal P60, channels 67 and 68 at input terminal P61 and channels 69 and 70 at input terminal P61 are always transmitted via output terminal P64 to control distribution unit 31 and such that channels 63 and 64 at input terminal P64 are transmitted to output terminal P59, channels 65 and 66 at input terminal P64 are transmitted to output terminal P60, channels 67 and 68 at input terminal P64 are transmitted to output terminal P61 and channels 69 and 70 at input terminal P64 are transmitted to output terminal P62. In this embodiment, control distribution unit 31 must be able to accommodate 70 of the 256 possible control channels at input/output terminal pair P64 rather than only 58 as in the control distribution unit 31 of System I.

Although the primary mode of control communication between the remote switching modules and the host switching modules is via the above-described control channels of time-multiplexed switch 10 and control distribution unit 31, control communication also occurs, in a manner described in the above-cited Chodrow et al. U.S. Pat. No. 4,550,404, using what is referred to as the derived data link on the transmission facilities, e.g., 421 through 424. The derived data link is described in U.S. Pat. No. 4,245,340, J. E. Landry.

Distributed Routing

In contrast to System I where the routing function is centrally performed by central control 30, in System II the routing function is distributed to the remote switching modules 501 through 504. Recall that in System I only central control 30 has a routing system process, process 2003 (FIG. 7), and its associated data structures, RDBLK 2101, CFBLK 2102, GRPBLK 2103 and TERMBLK 2104 and the centralized database comprising the FIXEDRI relation 2105, the SCRNING relation 2106, the DNTRAN relation 2107, the ROUTING relation 2108, the PORTGROUP relation 2109, the GROUPPORT relation 2110, the MHG relation 2111, the LNSTAT relation 2112, the TRKG relation 2113, the TKOWNER relation 2114, the TKQUE relation 2115 and the TKSTAT relation 2116. In System II, central control 30 similarly has a routing system process, process 3603 (FIG. 23), and the associated data structures, RDBLK 3101, CFBLK 3102, GRPBLK 3103 and TERMBLK 3104 and the database comprising the FIXEDRI relation 3105, the SCRNING relation 3106, the DNTRAN relation 3107, the ROUTING relation 3108, the PORTGROUP relation 3109, the GROUPPORT relation 3110, the MHG relation 3111, the LNSTAT relation 3112, the TRKG relation 3113, the TKOWNER relation 3114, the TKQUE relation 3115 and the TKSTAT relation 3116. In addition however, each remote switching module has a routing system process and the associated data structures and database. For example, remote switching module 501 has routing system process 3602 (FIG. 23), the associated data structures RDBLK 3201, CFBLK 3202, GRPBLK 3203 and TERMBLK 3204 and the database comprising the FIXEDRI relation 3205, the SCRNING relation 3206, the DNTRAN relation 3207, the ROUTING relation 3208, the PORTGROUP relation 3209, the GROUPPORT relation 3210, the MHG relation 3211, the LNSTAT relation 3212, the TRKG relation 3213, the TKOWNER relation 3214, the TKQUE relation 3215 and the TKSTAT relation 3216. The remote switching modules 502, 503 and 504 each similarly has a routing system process and associated data structures and database. In System II, the RDBLK data structure includes a RTSEQ field and a SWREQ field and the MHG and TRKG relations each include a MODULE field as shown in FIG. 32 and described later herein. In the present embodiment, the FIXEDRI, SCRNING, ROUTING, MHG and TRKG relations are redundant between central control 30 and the remote switching modules 501 through 504. For each of those relations, all the pertinent data for the system is stored in central control 30 and in each of the remote switching modules 501 through 504 as well. The DNTRAN relation 3107 in central control 30 stores the directory number translation information for all the lines connected to the system. However the DNTRAN relation in each of the remote switching modules, e.g., DNTRAN relation 3207 in remote switching module 501, stores the directory number translation information for only those lines connected to that remote switching module. Similarly, the PORTGROUP relation 3109 and the GROUPPORT relation 3110 in central control 30 store the group translation information for all of the switching system ports. The corresponding relations in each of the remote switching modules, e.g., PORTGROUP relation 3209 and GROUPPORT relation 3210 in remote switching module 501, store only such information as needed for the ports on that remote switching module. The relations in each remote switching module that are used to store the dynamic busy/idle data for multi-port hunt groups, i.e., in remote switching module 501, the LNSTAT relation 3212 for multi-line hunt groups and the TKOWNER relation 3214, the TKQUE relation 3215 and the TKSTAT relation 3216 for trunk groups, store such data for only those groups that have all of their lines or trunks connected to that remote switching module. The dynamic data for all other multi-port hunt groups in the system is stored in the LNSTAT relation 3112, the TKOWNER relation 3114, the TKQUE relation 3115, and the TKSTAT relation 3116 in central control 30. The MODULE field in the MHG and TRKG relations (FIG. 32) defines for each multi-port hunt group, one of the remote switching modules 501 through 504 or central control 30 as the location of the dynamic data for that group.

Figure 24:
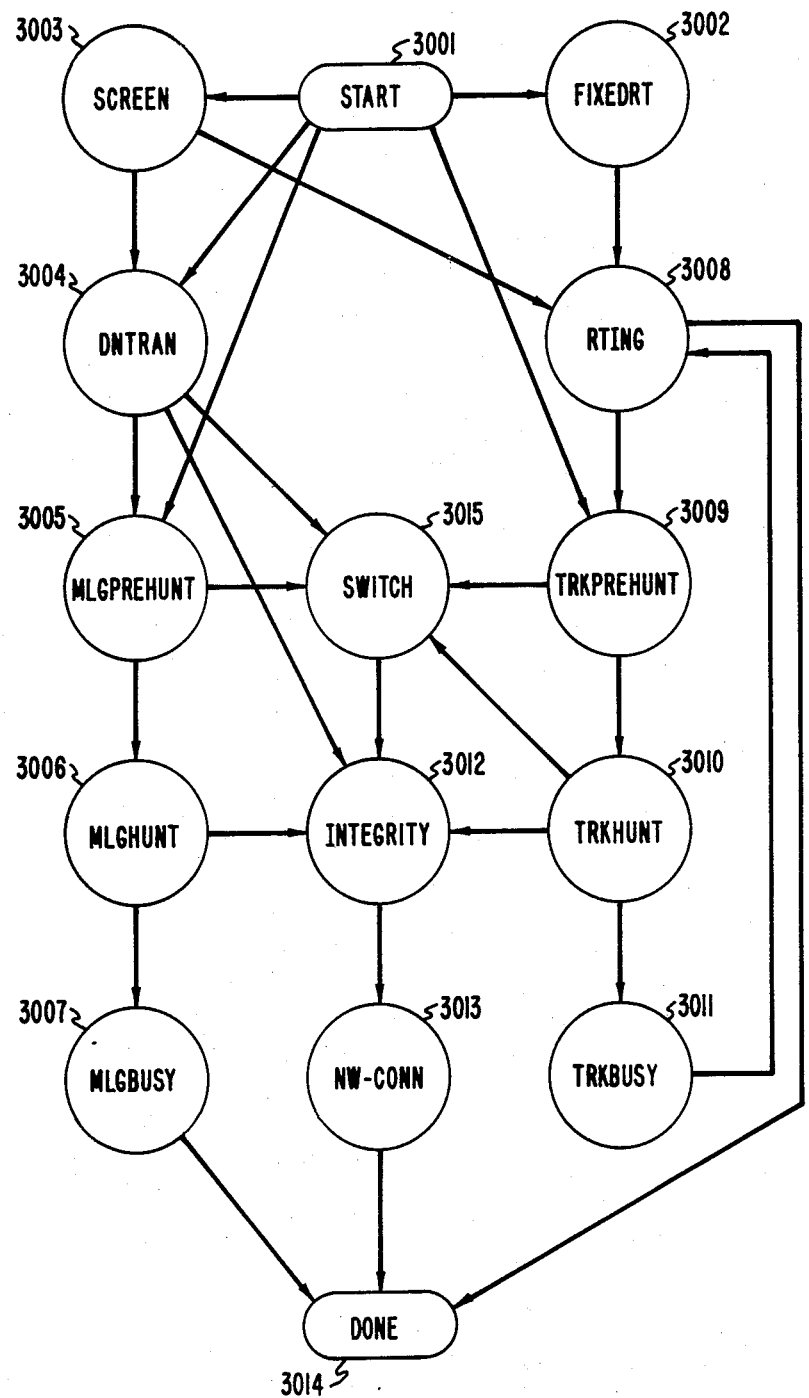
FIG. 24 is a state diagram for a routing program used in System II.
Figure 25:
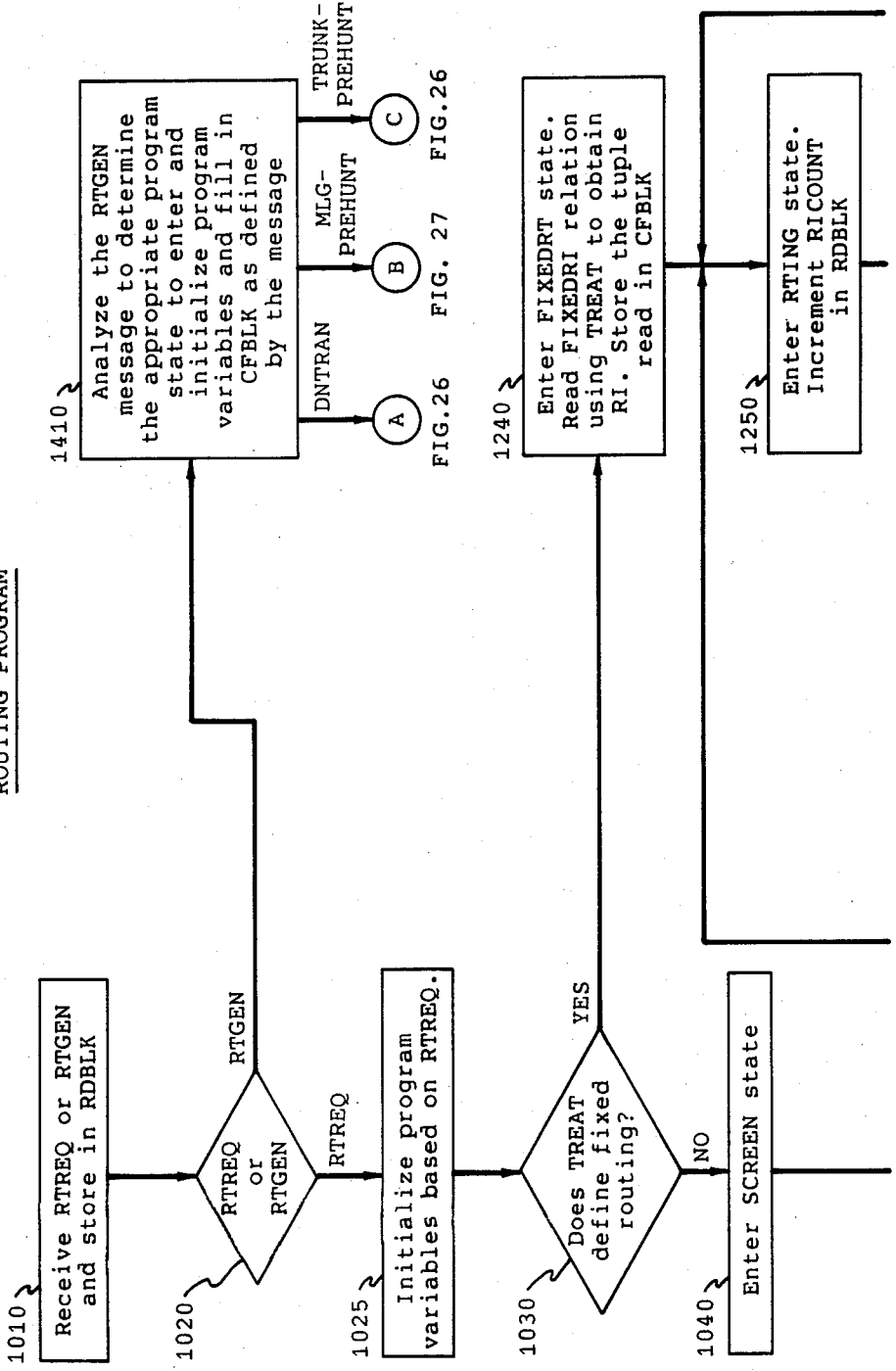
FIGS. 25 through 29, when arranged in accordance with FIG. 58, present a flow chart for the routing program used in System II.
Figure 26:
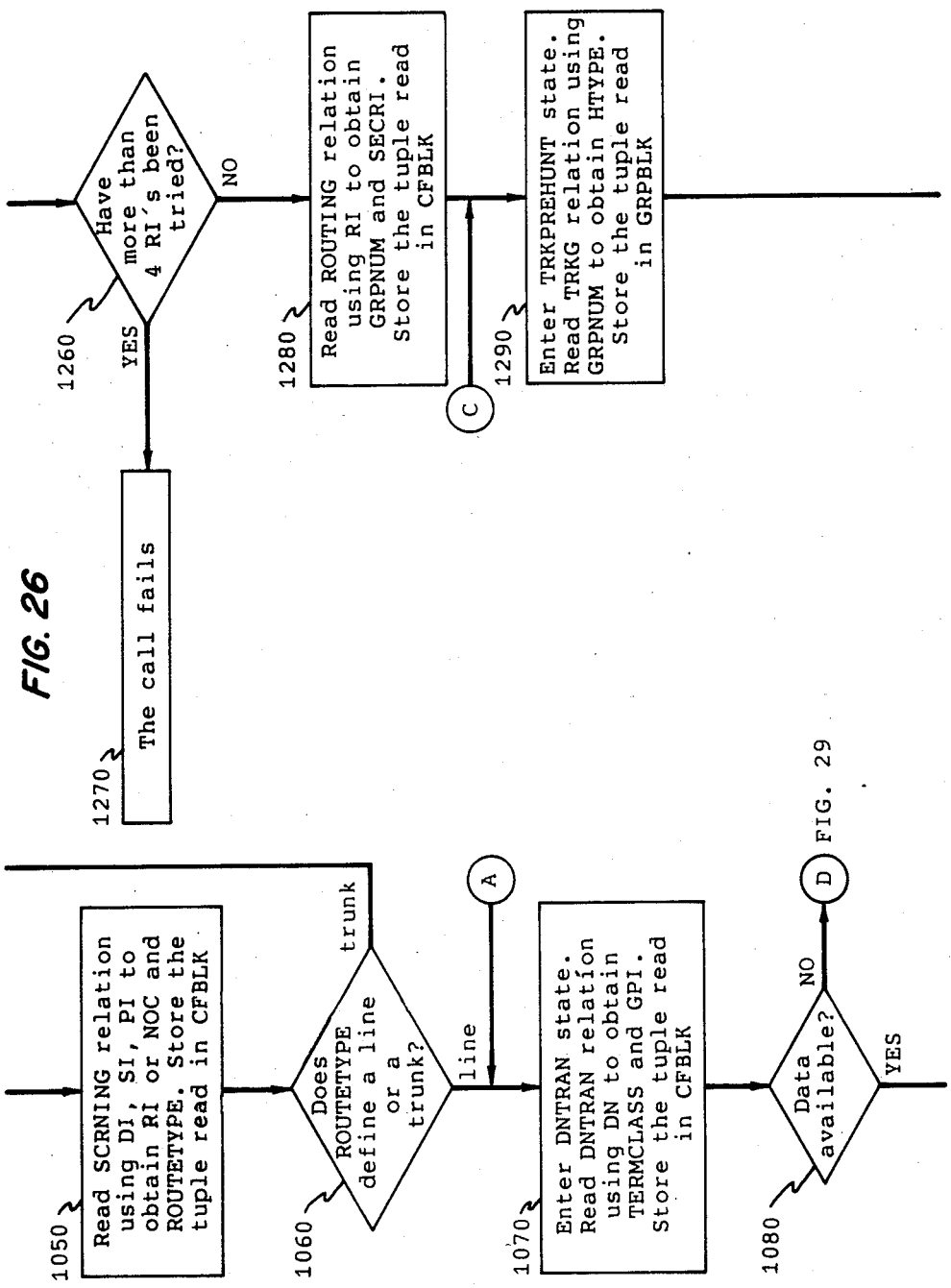
Figure 27:
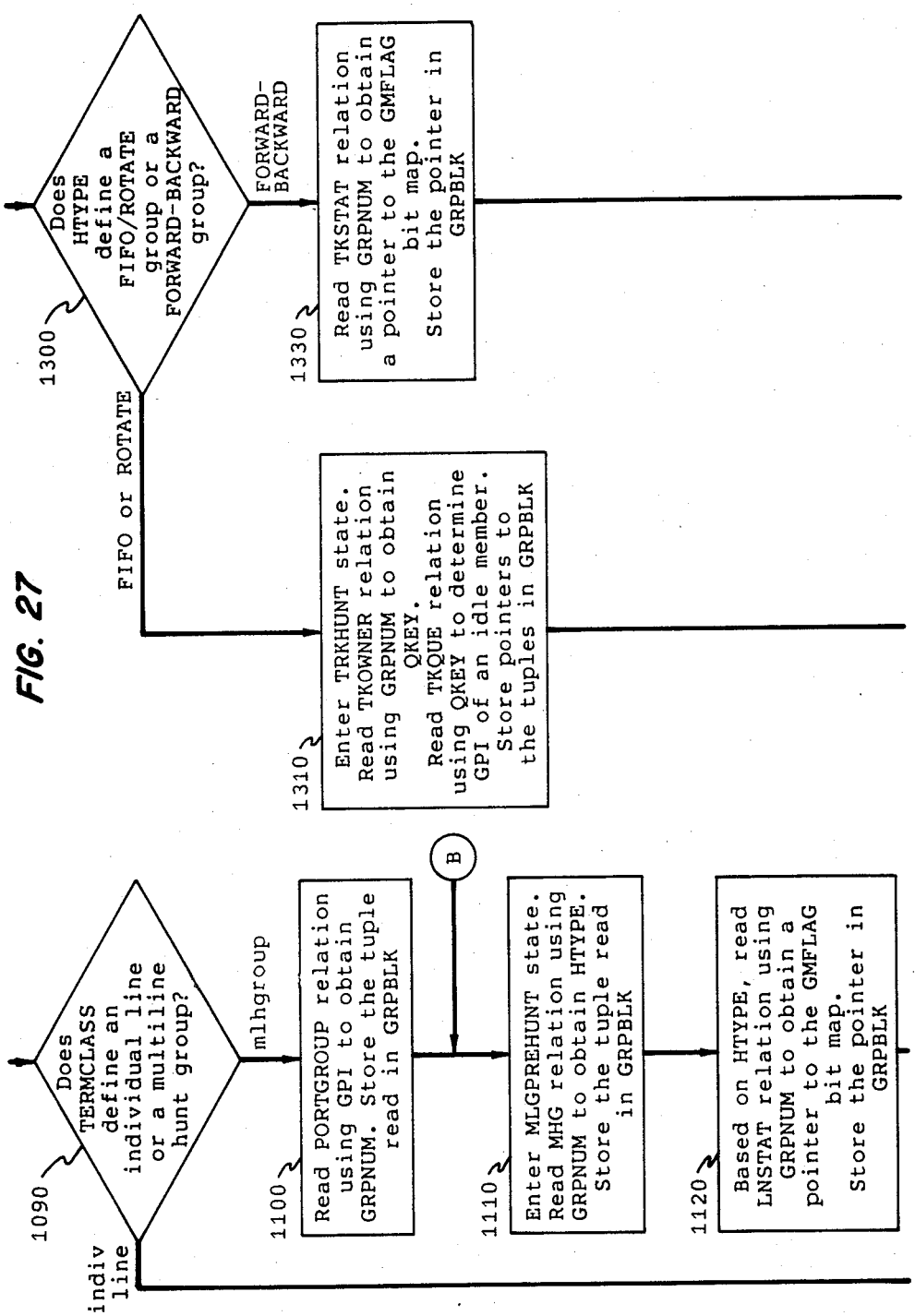
Figure 28:
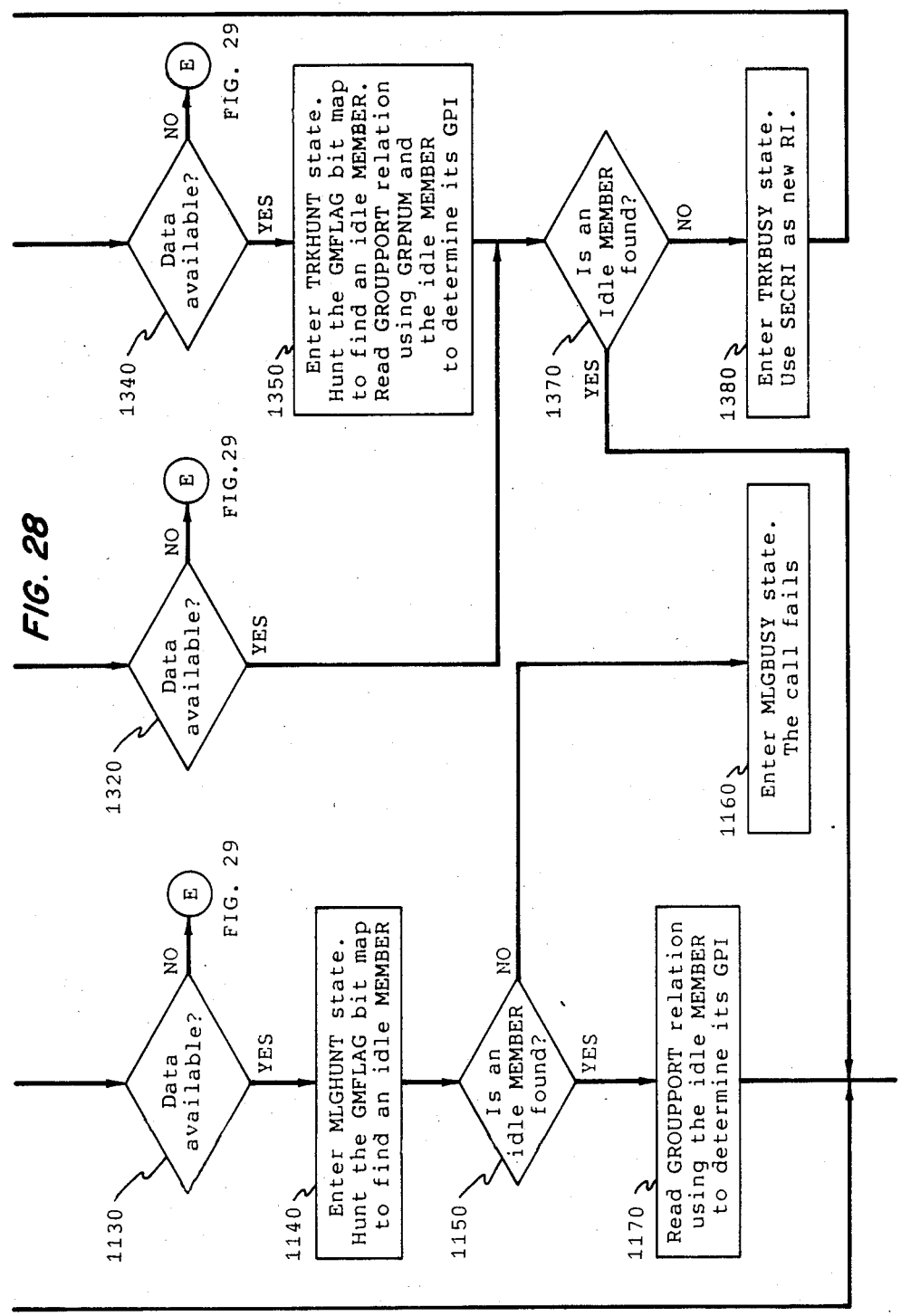
Figure 29:
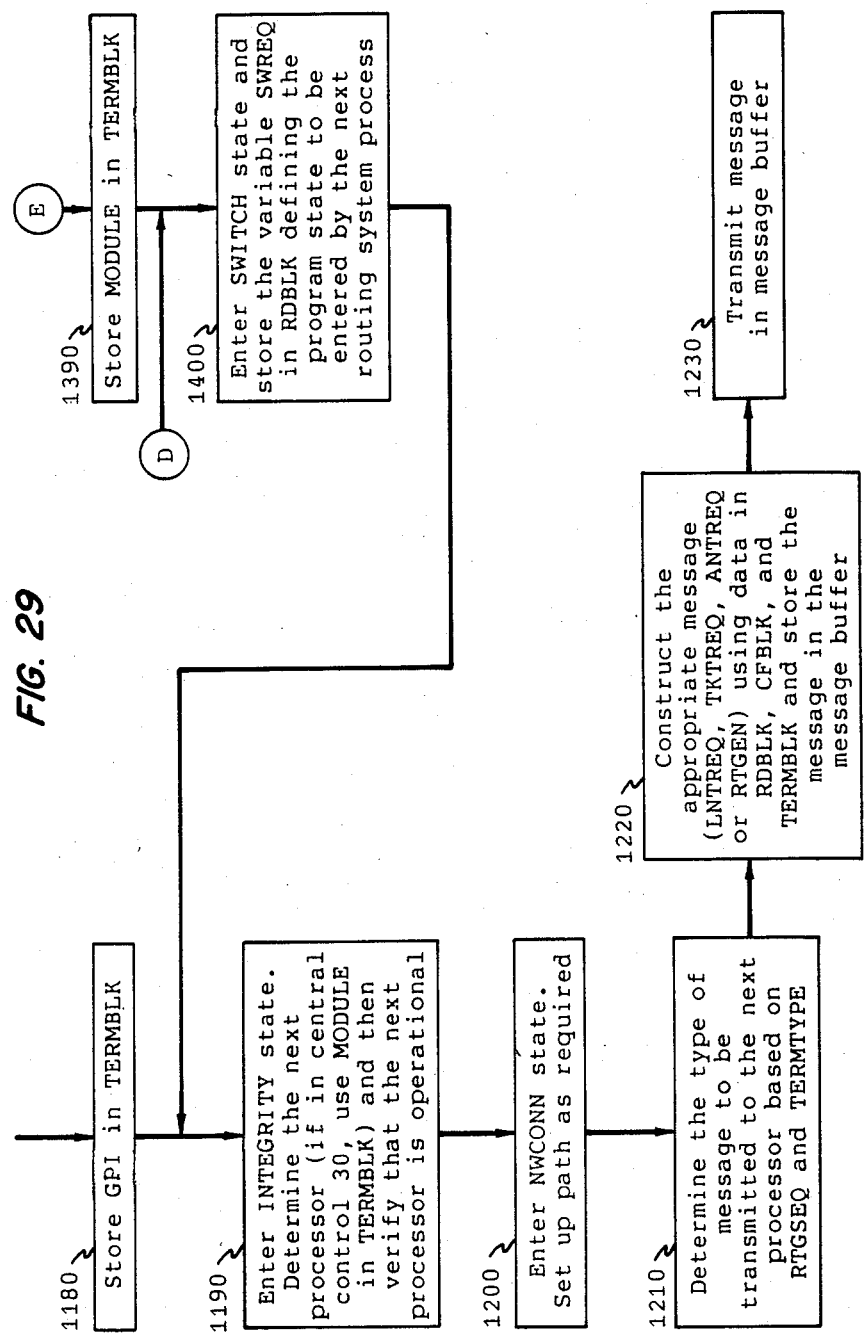

All of the routing system processes, e.g., 3603 and 3602, execute the same routing program, the flow chart for which is shown in FIGS. 25 through 29. The state diagram associated with those routing system processes is shown in FIG. 24.

As a first example, consider that subscriber set 528 has just gone off-hook. The off-hook state is detected by scanning within line unit 519. A call processing control system process 3601 (FIG. 23) within remote switching module 501 is informed of such off-hook detection and, in response, creates an originating terminal process 3604. Originating terminal process 3604 is responsible for controlling the transmission of dial tone to subscriber set 528 and the subsequent reception of digits dialed from subscriber set 528. Originating terminal process 3604 analyzes the dialed digits to obtain values of the prefix index (PI), destination index (DI), digit count (DIGCNT) and treatment (TREAT) variables. Originating terminal process 3604 determines the value of the screen index (SI) based on the characteristics of the originating line. Originating terminal process 3604 then formulates a route request message RTREQ in a message buffer. The RTREQ message (FIG. 14) has been previously described in the description of System I.

Once the RTREQ message has been formulated, it is transmitted by originating terminal process 3604 to routing system process 3602 (FIG. 23) still within remote switching module 501. Routing system process 3602 stores the RTREQ message in RDBLK 3201. Routing system process 3602 uses the information in the RTREQ message to access its associated database. Assume that the digits dialed from subscriber set 528 in this example represent the directory number of subscriber set 529 also connected to remote switching module 501. Accordingly, the DNTRAN relation 3207 contains the necessary directory number translation information since the terminating port is on the same remote switching module as the originating port. In that case, routing system process 3602 is able to complete the determination of the terminating port. Routing system process 3602 also selects a time slot commonly available between the receive time-slot interchanger and the transmit time-slot interchanger in time-slot interchange unit 511 to be used to connect the originating peripheral time slot to the terminating peripheral time slot. Routing system process 3602 then formulates depending on the value of the TERMTYP variable, a line termination request (LNTREQ) message, a trunk termination request (TKTREQ) message or an announcement termination request (ANTREQ) message in a message buffer. Each of those messages is shown in FIG. 14 and has been described herein. In the present example a LNTREQ message is formulated. The PATHDES field of the LNTREQ message includes the definition of the selected call time slot between the receive time-slot interchanger and the transmit time-slot interchanger. The LNTREQ message formulated in the message buffer is transmitted by routing system process 3602 to a termination system process 3606. In response, process 3606 reads the busy/idle map stored in remote switching module 501 to determine whether subscriber set 529 is presently busy or idle. If subscriber set 529 is idle, process 3606 creates a terminating terminal process 3605 and forwards the information received in the LNTREQ message to process 3605 via a line termination (LNTERM) message (or, in a trunk termination (TKTERM) message or an announcement termination (ANTERM) message, if a TKTREQ message or an ANTREQ message had been received). Terminating terminal process 3605 effects the transmission of ringing voltage to subscriber set 529, and the transmission of audible ringing tones back to subscriber set 528. Terminating terminal process 3605 then transmits a SETUPCOMP message to originating terminal process 3604 including the now completed path descriptor PATHDES. Originating terminal process 3604 and terminating terminal process 3605 write information in the control RAM in time-slot interchange unit 511 respectively defining the mapping between the originating peripheral time slot and the commonly available time slot selected by routing system process 3602 and the mapping between the terminating peripheral time slot and the selected commonly available time slot. The communication path between subscriber sets 528 and 529 has now been set up.

Figure 23:
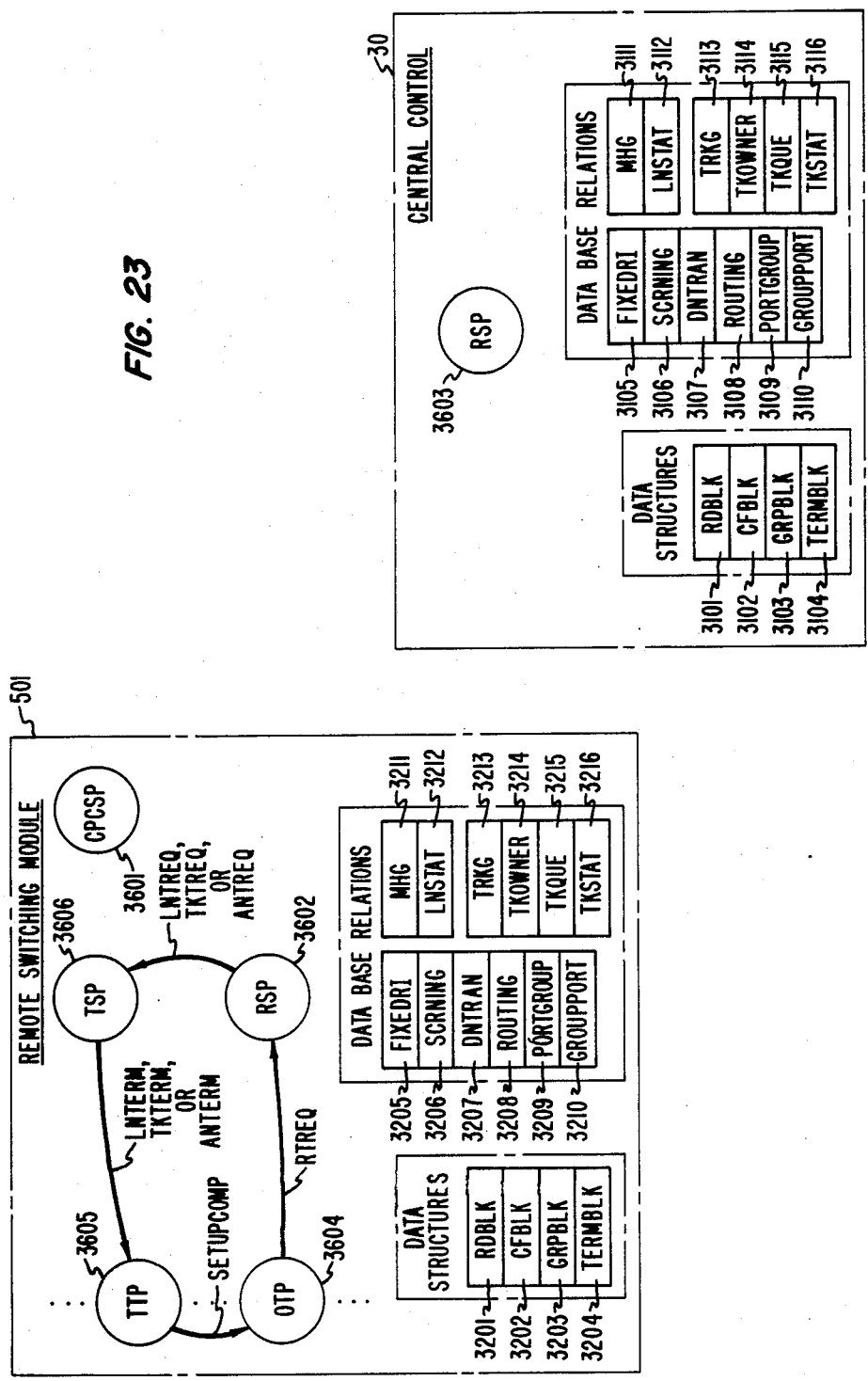
FIG. 23 is a functional diagram illustrating a first exemplary call setup sequence used in System II.

A very similar scenario to that just described with respect to FIG. 23 would also apply for calls to multiport hunt groups controlled within remote switching module 501, i.e., groups of lines or trunks having all members connected to remote switching module 501.

As a second example, assume that the digits dialed by subscriber set 528 represent the directory number of subscriber set 529 as before, but that subscriber set 529 is part of a multi-line hunt group not controlled by remote switching module 501 but instead controlled by central control 30. Call processing control system process 3601 (FIG. 30) is informed of the off hook detection as before and creates an originating terminal process 3611. Originating terminal process 3611 then transmits a RTREQ message to routing system process 3602, which stores the received RTREQ message in RDBLK 3201. Routing system process 3602 then executes its routing program (FIGS. 25 through 29). When program execution reaches the point that the LNSTAT relation 3212 is to be accessed, the dynamic data defining the busy/idle status of the multi-line hunt group including subscriber set 529 is not present. Therefore a generalized routing message RTGEN (FIG. 32) is formulated in the message buffer. The RTGEN message includes the PATHDES, RTGDATA and ORIGTPI fields described before with respect to the RTREQ message. The RTGEN message also includes a REQTERM field that defines the state of the routing program to be entered when routing is continued by the next processor and the value of the key required to read the next relation. The RIGEN message further includes the RTCONTDA field which defines values of a number of variables which have already been determined by routing system process 3602, for example variables stored in CFBLK 3202, in order that unnecessary work is not repeated when routing is continued. In addition, the RTGEN message also includes an ORIGGPI field and a TERMGPI field which store the global port identities of the originating port and the terminating port, respectively. Of course the TERMGPI field cannot be filled in until after the determination of the terminating port is completed. The RTGEN message is transmitted to routing system process 3603 in central control 30 which enters its routing program at the point defined by the REQTERM field. Information from the RTGEN message is stored in the appropriate fields in RDBLK 3101 and CFBLK 3102. Since the dynamic data defining the busy/idle status of the multi-line hunt group including subscriber set 529 is present in the LNSTAT relation 3112, routing system process 3603 is able to complete the determination of the terminating port. Assume that subscriber set 23 connected to switching module 201 is a member of the same multi-line hunt group that subscriber set 529 is in and that subscriber set 23 is assigned to the call as a result of the hunting effected by routing system process 3603. Routing system process 3603 selects an available network time slot to be used for the call and, since the terminating port is connected to a different switching module than the originating port, writes information defining the selected time slot into control memory 29. Routing system process 3603 then transmits an RTGEN message, which includes the selected network time slot in its PATHDES field and which also includes a completed TERMGPI field, to a termination system process 3610 in switching module 201. In response, process 3610 reads a busy/idle map stored in switching module 201 to determine whether subscriber set 23 is presently busy or idle. If subscriber set 23 is presently idle, process 3610 creates a terminating terminal process 3612 and forwards the information in the RTGEN message to process 3612 via a LNTERM message. Terminating terminal process 3612 effects the transmission of ringing voltage to subscriber set 23 and the transmission of an E-bit continuity signal and audible ringing tones to host switching module 301. Terminating terminal process 3612 then transmits a SETUPCOMP message to originating terminal process 3611 in remote switching module 501. In response, originating terminal process 3611 effects the selection of a time slot for the call on one of the transmission facilities 421 through 424 (FIG. 20), e.g., 421, and also effects a control communication with host switching module 301 such that time-slot interchange unit 311 connects the selected call time slot on transmission facility 421 to the selected network time slot of time-multiplexed switch 10. Such control communication with host switching module 301 is described in the above-cited Chodrow et al. U.S. Pat. No. 4,550,404. Once the E-bit continuity signal from switching module 201 is received by remote switching module 501 via host switching module 301, originating terminal process 3611 writes information in the control RAM of time-slot interchange unit 511 defining the mapping between the originating peripheral time slot and the selected call time slot on transmission facility 421. Similarly, once the E-bit continuity signal is received by switching module 201, terminating terminal process 3612 writes information in the control RAM 55 of time-slot interchange unit 11 defining the mapping between the terminating peripheral time slot and the network time slot. The communication path between subscriber sets 528 and 23 has now been set up.

Figure 30:
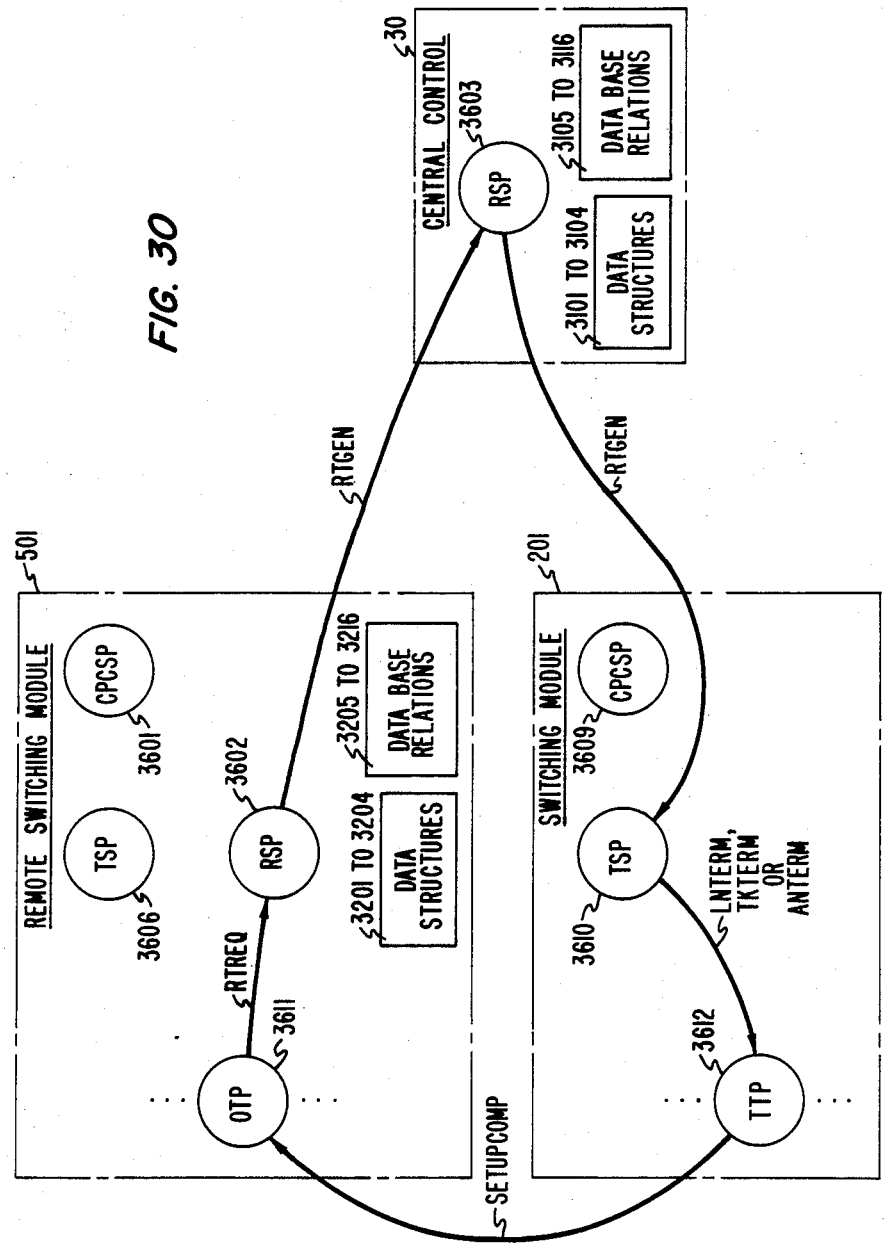
FIGS. 30 and 31 illustrate second and third exemplary call setup sequences used in System II.

A very similar scenario to that just described with respect to FIG. 30 would also apply to calls from remote switching module 501 to individual lines not connected to remote switching module 501 and also to calls to trunk groups not controlled by remote switching module 501.

As a third example, consider that subscriber set 24 connected to switching module 201 has just gone off-hook. Call processing control system process 3609 (FIG. 31) is informed of the off-hook detection and, in response, creates an originating terminal process 3621. Originating terminal process 3621 analyzes the digits dialed by subscriber set 24 to obtain values of PI, DI, DIGCNT and TREAT, and determines SI based on the characteristics of the originating line. Note that switching module 201 does not have a routing system process. Therefore, originating terminal process 3621 transmits a RTREQ message to routing system process 3603 in central control 30. Routing system process 3603 stores the RTREQ message in RDBLK 3101 and begins the execution of its routing program (FIGS. 25 through 29). Assume that the digits dialed by subscriber set 24 require the use of a group of trunks all of which are connected to remote switching module 501, e.g., trunks 543 and 544. Assume further that the trunk group is a first-in-first-out (FIFO) group. Since the group is controlled by remote switching module 501 rather than central control 30, the dynamic data defining the busy/idle status of the trunks in the trunk group is not present in the TKOWNER relation 3114 and the TKQUE relation 3115 in central control 30. Therefore, when the execution of the routing program reaches the point that the TKOWNER relation 3114 and the TKQUE relation 3115 are to be accessed, a RTGEN message is formulated since the required data is not available. The MODULE field of the TRKG relation 3113 defines that the dynamic data for the group is located in remote switching module 501. Routing system process 3603 selects the network time slot through time-multiplexed switch 10 to be used for the call and then transmits the RTGEN message to routing system process 3602 in remote switching module 501. Routing system process 3602 enters its routing program at the point defined by the REQTERM field in the RTGEN message. Information from the RTGEN message is stored in the appropriate fields in RDBLK 3201 and CFBLK 3202. Since the dynamic data defining the busy/idle status of the required trunk group is present in the TKOWNER relation 3214 and the TKQUE relation 3215 in remote switching module 501, routing system process 3602 is able to complete the determination of the terminating port. Assume that trunk 543 is assigned to the call as a result of the hunting effected by routing system process 3602. Routing system process 3602 then transmits a RTGEN message, including a completed TERMGPI field, to termination system process 3606. In response, process 3606 creates a terminating terminal process 3622 and forwards the information in the RTGEN message to process 3622 via a TKTERM message. Terminating terminal process 3622 determines the terminating peripheral time slot to be used for communication with trunk 543. Terminating terminal process 3622 effects a selection of the call time slot on one of the transmission facilities 421 through 424 (FIG. 20), e.g., 422, and also effects a control communication with host switching module 301 such that time-slot interchange unit 311 connects the selected call time slot on transmission facility 422 to the selected network time slot of time-multiplexed switch 10. Terminating terminal process 3622 effects the transmission of an E-bit continuity signal to switching module 201 via host switching module 301 and also transmits a SETUPCOMP message to originating terminal process 3621 in switching module 201. In response to the SETUPCOMP message, originating terminal process 3621 begins the transmission of an E-bit continuity signal back to remote switching module 501 via host switching module 301. In response to the E-bit continuity signals, the originating terminal process 3621 and the terminating terminal process 3622 write information in the respective control RAMs such that the originating peripheral time slot is mapped to the network time slot and the terminating peripheral time slot is mapped to the selected call time slot on transmission facility 422. The communication path between subscriber set 23 and trunk 543 has now been completed.

Figure 31:
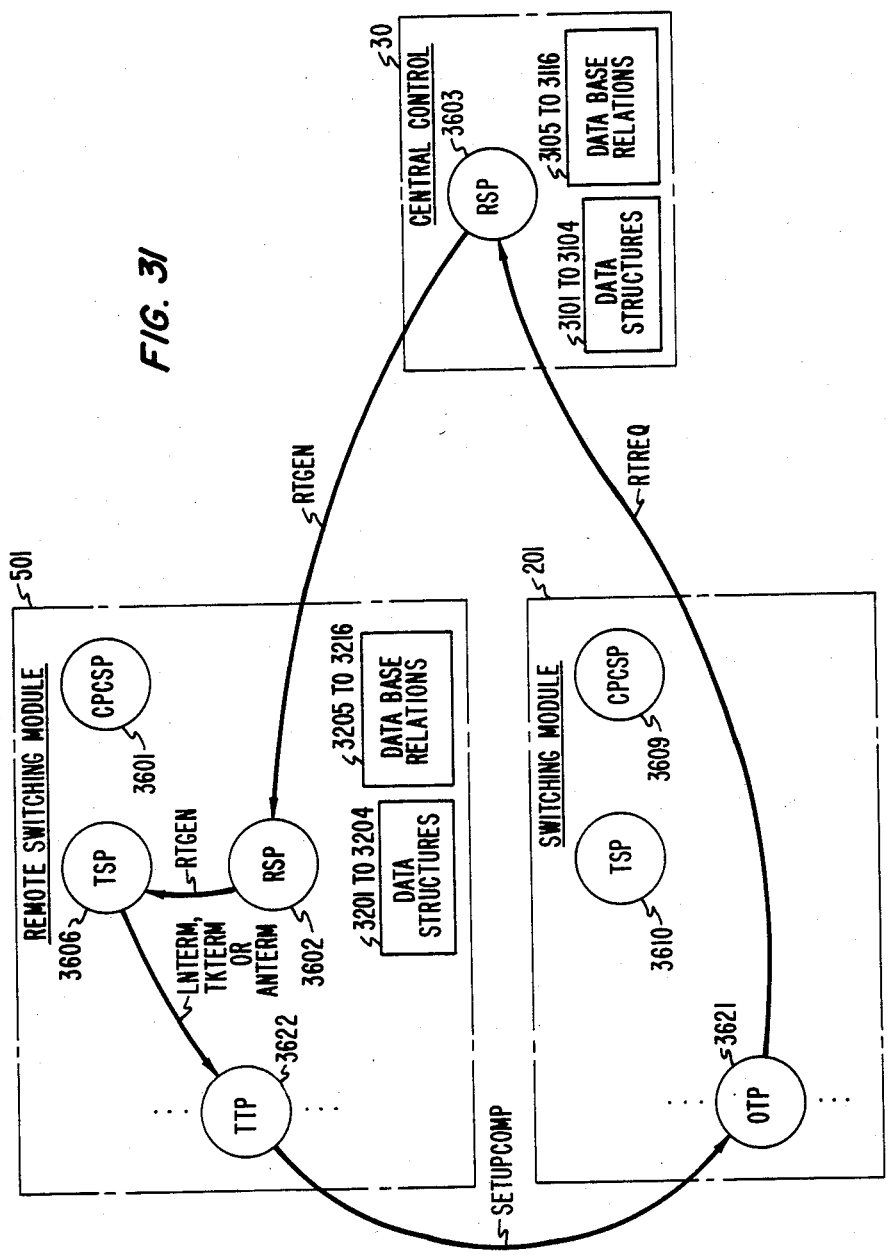

A very similar scenario to that just described with respect to FIG. 31 would also apply to calls from switching module 201 to multi-line hunt groups controlled by remote switching module 501. Since the DNTRAN relation 3107 stored in central control 30 has the directory number translation information for all the lines of the system, the determination of the terminating port can be completed by routing system process 3603 in central control 30 for all calls from switching module 201 to individual lines.

The routing program of FIGS. 25 through 29, which is stored in central control 30 and in each of the remote switching modules 501 through 504 as well, is a modification of the routing program of FIGS. 9 through 13 used for centralized routing in System I. Accordingly blocks of the flow charts where the same or similar functions are performed are identified by the same number in both flow charts. Similarly, the state diagram of FIG. 24, which includes one additional state and number of additional state transitions with respect to the state diagram of FIG. 8, has the corresponding states identified by the same number.

The routing program of FIGS. 25 through 29 is described herein in terms of the required modifications of the routing program of FIGS. 9 through 13. The routing program of FIGS. 25 through 29 is initiated from the START state 3001 (FIG. 24) upon the receipt by a routing system process of either a RTREQ message or a RTGEN message. During block 1010 (FIG. 25), the received message is stored in the RDBLK. The RTGSEQ field (FIG. 32) of the RDBLK is used to define whether the present execution of the routing program was in response to a RTREQ message or a RTGEN message. Execution proceeds to decision block 1020 where a branch occurs depending on the type of received message. If the received message was a RTREQ message, execution proceeds in the same manner as previously described with respect to the routing program of FIGS. 9 through 13, unless one of the accessed relations does not have the requested data present. Recall that the FIXEDRI, SCRNING, ROUTING, MHG and TRKG relations are redundant between central control 30 and the remote switching modules 501 through 504. Therefore, barring errors, attempted accesses of those relations should always be successful. However, the DNTRAN relation in central control 30 stores the directory number translation information for all the lines connected to the system, while the DNTRAN relation in each of the remote switching modules 501 through 504 stores the directory number translation information for only those lines connected to that remote switching module. Therefore attempts to access the DNTRAN relation in a remote switching module will only be successful for the lines connected thereto. This is reflected in the flow chart by the addition of decision block 1080 during which it is determined whether the access of the DNTRAN relation attempted during block 1070 was successful. If the needed data was not available, execution proceeds from decision block 1080 to a block 1400 and the SWITCH state 3015 (FIG. 24) is entered. During block 1400, a SWREQ variable is stored in the RDBLK (FIG. 15) defining the program state of the state diagram of FIG. 24 to be entered by the next routing system process. When block 1400 is reached from decision block 1080, the stored SWREQ variable defines the DNTRAN state 3004 (FIG. 24) as the program state to be entered by the next routing system process. Execution then proceeds to block 1190 and the program moves from the SWITCH state 3015 to the INTEGRITY state 3012 (FIG. 24). During block 1190, the next processor is determined. If the present processor is in a remote switching module, the next processor is always central control 30. If the present processor is central control 30, the MODULE field in the TERMBLK is used to determine the location of the next processor. The status table is checked to verify that the next processor is operational and execution proceeds to block 1200. During block 1200 the NWCONN state 3013 is entered. In a remote switching module, if the terminating port has been determined without communicating with central control 30, the selection of the time slot commonly available between the receive time-slot interchanger and the transmit time-slot interchanger to be used to connect the originating peripheral time slot to the terminating peripheral time slot is made during block 1200. In central control 30, the commonly available network time slot for the call is selected and, if the call is an inter-module call, information is written in control memory 29 to set up the network path during block 1200. Execution proceeds to block 1210 and the type of message to be transmitted to the next processor is determined. The RTGSEQ field in the RDBLK is used to determine whether the present execution of the routing program resulted from the receipt of a RTREQ message or a RTGEN message. If the execution resulted from the receipt of a RTGEN message, then a RTGEN message is constructed. If the execution resulted from the receipt of a RTREQ message but a switch has occurred, again a RTGEN message is constructed. If no switch has occurred, then the TERMTYP variable in the RTGDATA field (stored as part of the TEXT field in the RDBLK) is used to determine whether a LNTREQ, TKTREQ, or ANTREQ message is constructed. Execution proceeds to block 1220 during which the appropriate message type is constructed using data in the RDBLK, CFBLK and TERMBLK and the message is stored in the message buffer. Execution then proceeds to block 1230, the message in the message buffer is transmitted, and execution concludes in the DONE state 3014 (FIG. 24).

Recall that the relations in each remote switching module that are used to store the dynamic busy/idle data for multi-port hunt groups, i.e., multi-line hunt groups or trunk groups, store such data for only those groups that have all of their lines or trunks connected to that remote switching module. Also recall that the dynamic data for all other multi-port hunt groups in the system is stored in central control 30. This means that the dynamic data for any given hunt group is only stored in one location. Therefore, while a failure in accessing the DNTRAN relation should only occur in a remote switching module, failures in accessing the LNSTAT, TKOWNER, TKQUE or TKSTAT relations may occur either in a remote switching module or in central control 30. The possibility of a failure in accessing the LNSTAT relation is reflected in the program flow chart by including the decision block 1130 after block 1120 when access of the LNSTAT relation is attempted. If the requested data from the LNSTAT relation is not available, execution proceeds from block 1130 to block 1390. During block 1390, the MODULE field which was obtained during block 1110 when the MHG relation (FIG. 32) was read, is stored in the TERMBLK and execution proceeds to block 1400. In block 1400, the SWITCH state 3015 (FIG. 24) is entered and the SWREQ variable defining the MLGPREHUNT state 3005 (FIG. 24) as the state to be entered by the next routing system process, is stored in the RDBLK. Execution then proceeds through blocks 1190, 1200, 1210, 1220 and 1230 and a RTGEN message is constructed and transmitted as before.

Similarly, decision block 1320 is inserted after block 1310 where the attempted access of the TKOWNER and TKQUE relations occurs, and decision block 1340 is inserted after block 1330 where the attempted access of the TKSTAT relation occurs. Execution proceeds from either of the decision blocks 1320 or 1340, via blocks 1390, 1400, 1190, 1200, 1210, 1220 and 1230 as before. In both cases, during block 1400, the SWREQ variable stored in the RDBLK defines the TRKPREHUNT state 3009 (FIG. 24) as the program state to be entered by the next routing system process.

What has just been described is the execution of the routing program of FIGS. 25 through 29 in response to the receipt of a RTREQ message. When a RTGEN message is received, execution proceeds from decision block 1020 to block 1410. During block 1410, the REQTERM field in the RTGEN message is used to determine the program state in which execution is to begin. The REQTERM field also stores the value of the key to the first relation to be accessed. The RTCONTDA field in the RTGEN message contains the values of other needed variables such that work already completed in one routing system process need not be repeated in the next routing system process. Such information is subsequently filled into the CFBLK. In the present embodiment, the REQTERM field defines the DNTRAN state 3004, the MLGPREHUNT state 3005 or the TRKPREHUNT state 3009 as the program state to be entered. As shown in the flow chart, execution proceeds from block 1410 to block 1070, block 1110 or block 1290 in accordance with the definition in the REQTERM field.

It is be understood that although in System II, the routing function is distributed to only the remote switching modules, the concept of distributed routing can be extended by distributing the routing function in a similar manner to all of the system switching modules.

System III

Figure 34:
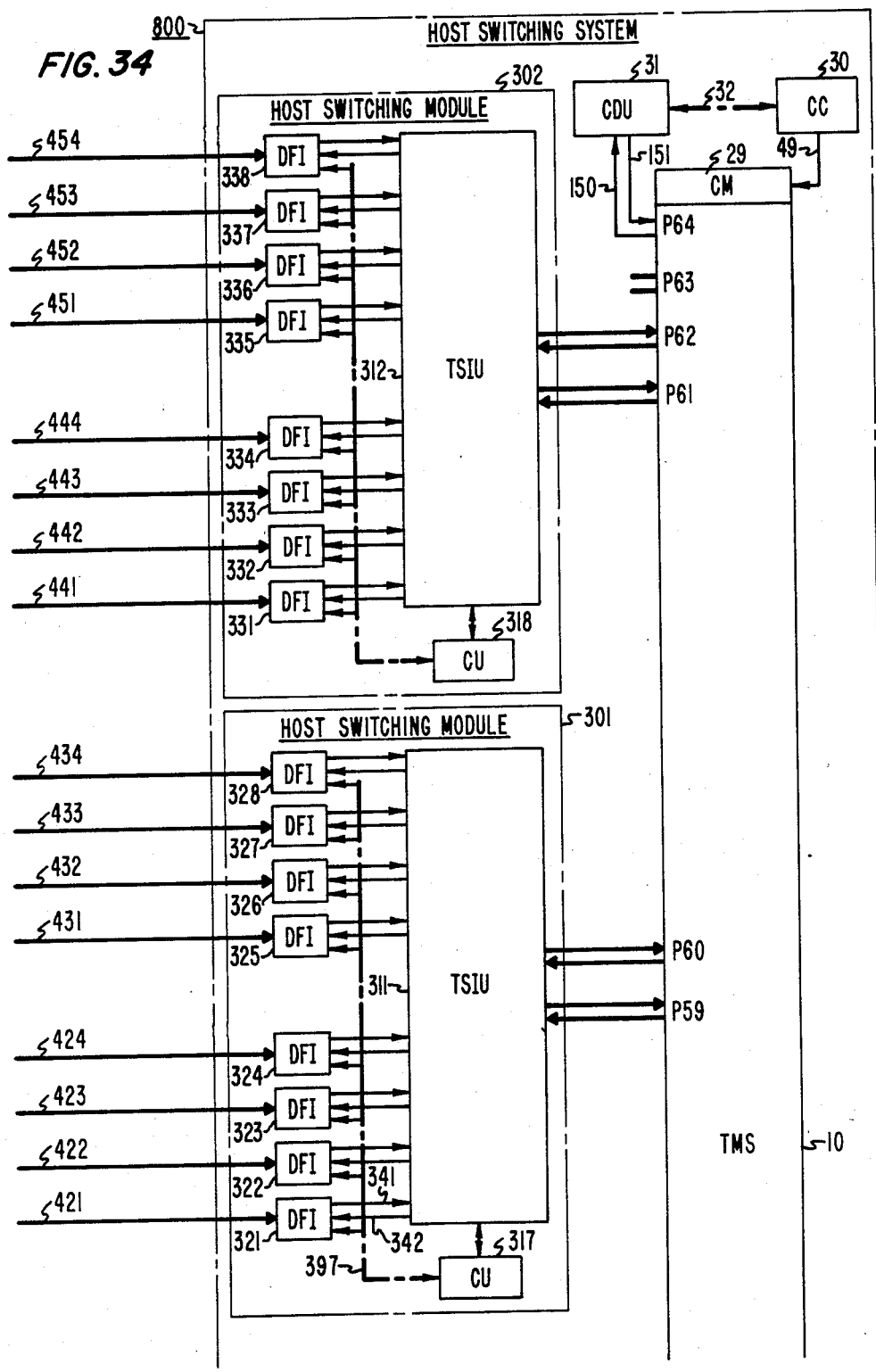
Figure 35:
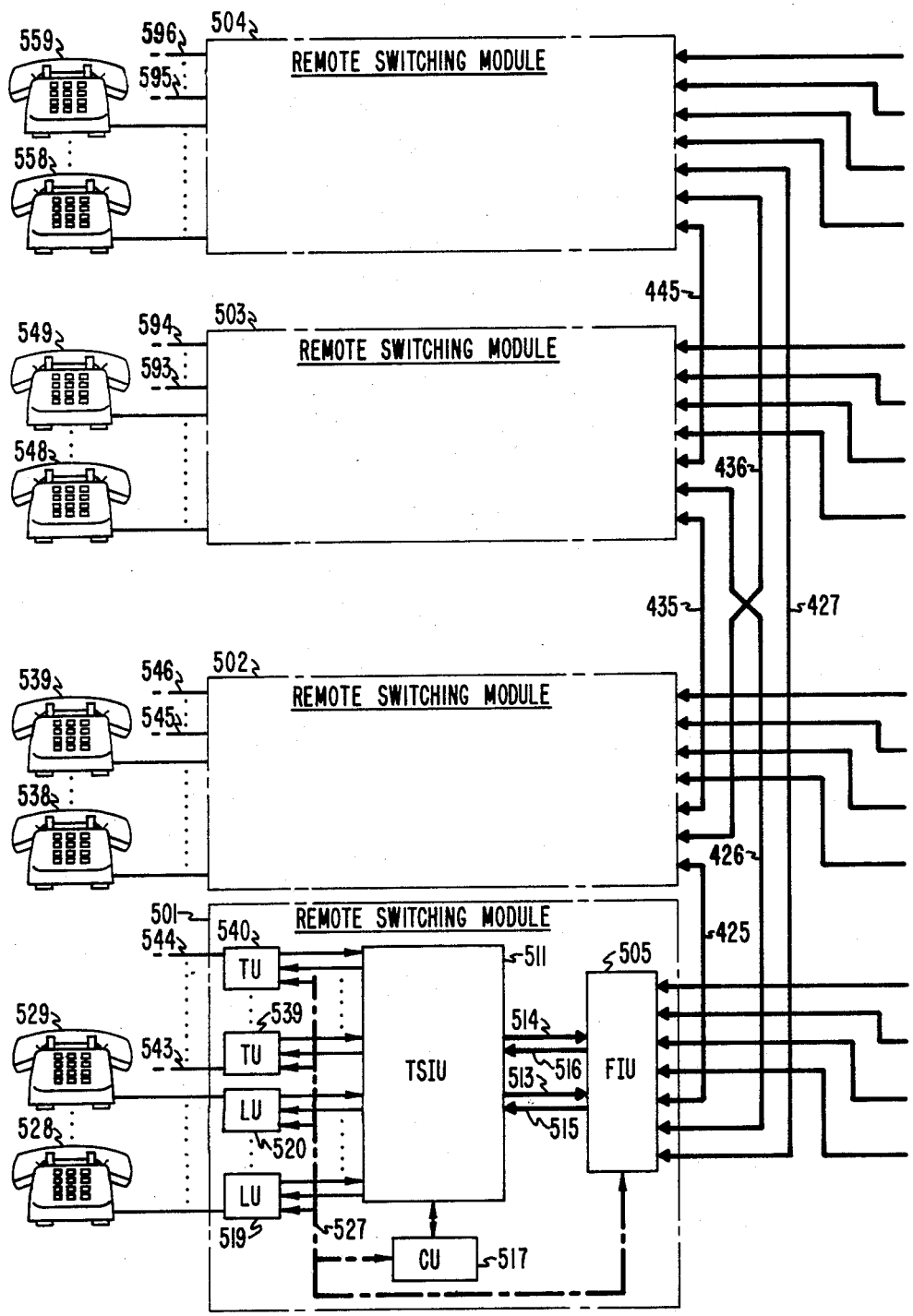

A time division switching system referred to herein as System III, which represents a modification to System II in that the remote switching modules 501, 502, 503 and 504 are interconnected in a grouping known as a cluster, is shown in FIGS. 33 through 35, when arranged in accordance with FIG. 36. In System III, each pair of remote switching modules is interconnected by a digital, bidirectional transmission facility such as the above-mentioned T1 carrier system. Module 501 (FIG. 35) is connected by transmission facilities 425, 426 and 427 to modules 502, 503 and 504, respectively, module 502 is connected by transmission facilities 435 and 436 to modules 503 and 504, respectively, and modules 503 and 504 are interconnected by transmission facility 445. In System III, each facilities interface unit, e.g., 505, interfaces with seven transmission facilities.

As in System II, the primary mode of control communication between two remote switching modules is again via the time-multiplexed switch 10 control channels and control distribution unit 31. However, since the cluster of remote switching modules operates as an integrated entity even in the stand-alone mode, control communication is also possible on the transmission facilities directly interconnecting the remote switching modules. Such control communication is described in detail in the above-cited Chodrow et al. U.S. Pat. No. 4,550,404. As described in that application, the control communication is achieved using one of the 24 channels on the directly interconnecting transmission facility or using the derived data link on that facility.

As was also true in System II, the routing function in System III is distributed to the remote switching modules 501 through 504. Each remote switching module has a routing system process, its associated data structures RDBLK, CFBLK, GRPBLK and TERMBLK and database comprising the FIXEDRI, SCRNING, DNTRAN, ROUTING, PORTGROUP, GROUPPORT, MHG, LNSTAT, TRKG, TKOWNER, TKQUE and TKSTAT relations. All of the routing system processes execute the same routing program as in System II, the flow chart of the program being shown in FIGS. 25 through 29. The state diagram associated with those routing system processes is shown in FIG. 24. As in System II, the FIXEDRI, SCRNING, ROUTING, MHG and TRKG relations are redundant between central control 30 and the remote switching modules 501 through 504. For each of those relations, all the pertinent data for the system is stored in central control 30 and in each of the remote switching modules 501 through 504 as well. Again the DNTRAN relation in central control 30 stores the directory number translation information for all the lines connected to the system. However, in contrast to System II where the DNTRAN relation in each remote switching module stored the directory number translation information for only the lines connected to that remote switching module, in System III, the DNTRAN relation in each remote switching module stores the directory number translation information for all the lines connected to the entire cluster of remote switching modules 501 through 504. Thus for calls originating on a given remote switching module to an individual line connected to any remote switching module in the cluster, the function of determining the terminating port can be completed by the routing system process in the given remote switching module. The PORTGROUP and GROUPPORT relations stored in the remote switching modules also store information for all the ports on the cluster of remote switching modules. As in System II, the relations in each remote switching module that are used to store the dynamic busy/idle data for multi-port hunt groups, i.e., the LNSTAT relation for multi-line hunt groups and the TKOWNER, TKQUE and TKSTAT relations for trunk groups, store such data for only those groups that have all of their lines or trunks connected to one remote switching module. Therefore, for a call originating on a first remote switching module to a multi-port group connected to a second remote switching module, the routing system process in the first remote switching module can execute its routing program up until the point that the dynamic data is accessed. A RTGEN message (FIG. 32) is then transmitted to the routing system process in the second remote switching module which completes the determination of the terminating port.

Twenty-three of the channels or time slots on a given transmission facility between two remote switching modules, are used for calls between those modules. The 24th channel is used to convey the signaling bits for the other 23 channels. (In the present embodiment of System III, the derived data link on the transmission facility, rather than one of the 23 channels, is used for control communication in the stand-alone mode of operation.) Each of the two remote switching modules is the controller of 11 or 12 of the 23 time slots on the transmission facility therebetween. For example, remote switching module 501 is the controller of time slots 1 through 12 on transmission facility 435 and remote switching module 502 is the controller of time slots 13 through 23. Each remote switching module maintains a time slot status map defining the busy/idle status of each time slot on each transmission facility connected thereto. If remote switching module 501 is required to assign a time slot on transmission facility 435 to a call, it first determines whether one of the time slots 1 through 12 is available by reading its time slot status map. If one or more of the time slots 1 through 12 is available, it assigns one to the call. However, if none is available, remote switching module 501 informs remote switching module 502 of the required assignment and module 502 reads its time slot status map to determine whether one of the time slots 13 through 23 is available. If one or more of the time slots 13 through 23 is available, one of the available time slots is selected for the call. If none is available, remote switching modules 501 and 502 communicate with central control 30 to establish the call. The call is completed via one of the transmission facilities 421 through 424, one of the transmission facilities 431 through 434, and host switching module 301. Further if the remote switching modules were connected to different host switching modules as, for example, remote switching module 501 connected to host switching module 301 and remote switching module 503 connected to host switching module 302, the call would be completed using a network time slot of time-multiplexed switch 10.

Sequence calls are calls that are not completed to the original terminating port but instead are completed to another terminating port. In System III, sequence calls are provided in an efficient manner by reducing such calls to simple calls, i.e., calls involving only two ports, before the connection to the final terminating port is completed. This avoids the complexity that would otherwise result if the switching module serving the ultimate terminating port had to process the call differently depending on whether the call is a sequence call or a simple call.

Two examples of sequence calls are forwarded calls, i.e., calls which are to be completed to a customer-provided number regardless of whether the first number is busy or idle, and series completion calls which are to be completed to another number only when the first number is busy. To minimize the number of inter-module control messages, the call setup sequence used in System III defers the assignment of time slots on the transmission facilities interconnecting remote switching modules until the final terminating port is determined. The remote switching module connected to that terminating port completes the call to the terminating port without being aware of whether the call is a simple call or a sequence call. The property which allows sequence calls to be reduced to simple calls is referred to herein as closure.

Figure 37:
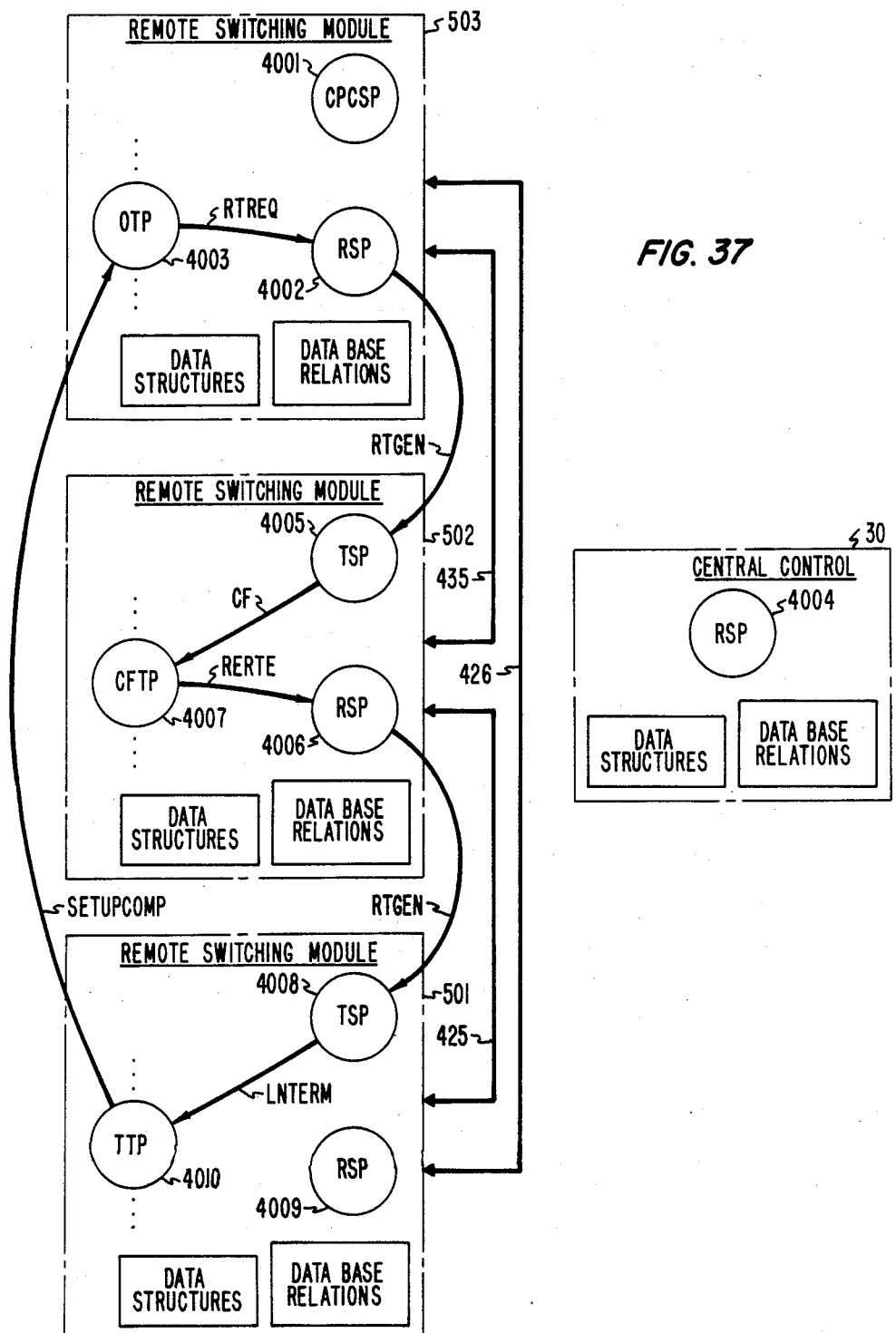
FIGS. 37 through 39 illustrate exemplary call setup sequences involved in processing sequence calls in System III.

As a first example of a sequence call in System III, consider that subscriber set 548 connected to remote switching module 503 dials the directory number of subscriber set 538 connected to remote switching module 502. In remote switching module 503 (FIG. 37), an originating terminal process 4003, which was created by a call processing control system process 4001 in response to the detection of off-hook status, receives the dialed directory number. (For simplicity, remote switching module 504 and the transmission facilities connected to module 504 are omitted in FIG. 37). Originating terminal process 4003 analyzes the dialed digits to obtain values of the prefix index (PI), destination index (DI), digit count (DIGCNT) and treatment (TREAT) variables. Originating terminal process 4003 also determines the value of the screen index (SI), based on the characteristics of the originating line. Originating terminal process 4003 then formulates a route request message RTREQ in a message buffer. The RTREQ message (FIG. 14) has been previously described in the description of System I.

Once the RTREQ message has been formulated, it is transmitted to a routing system process 4002 within remote switching module 503. Routing system process 4002 stores the RTREQ message in its associated RDBLK. (Each routing system process has the associated data structures RDBLK, CFBLK, GRPBLK and TERMBLK and the database comprising the FIXEDRI, SCRNING, DNTRAN, ROUTING, PORTGROUP, GROUPPORT, MHG, LNSTAT, TRKG, TKOWNER, TKQUE and TKSTAT relations). Routing system process 4002 uses the information in the RTREQ message to access its associated database. Since the DNTRAN relation stored in remote switching module 503 includes the directory number translation information for all lines connected to the remote switching modules 501 through 504, routing system process 4002 is able to complete the determination of the global port identity (GPI) of the port connected to subscriber set 538. The MODULE field of the GPI defines that subscriber set 538 is connected to remote switching module 502. However, remote switching module 503 makes no call time slot assignment on transmission facility 435 connecting module 503 to module 502 at this time. Routing system process 4002 transmits a generalized routing request (RTGEN) message, described above and shown in FIG. 32, to a termination system process 4005 in remote switching module 502. Process 4005 responds by accessing a PORTSTATUS relation shown in FIG. 32, using the GPI as a key. The PORTSTATUS relation includes the GPI field, a BUSY/IDLE field defining the busy/idle status of the port defined by the GPI field, a CF field that defines whether call forwarding is in effect for that port and, if so, the directory number to which calls must be forwarded, and a SC field that similarly defines whether calls are to be series-completed and the appropriate directory number. The PORTSTATUS relation in a given remote switching module contains the pertinent data for all ports on that remote switching module. For the present example, assume that the tuple of the PORTSTATUS relation for the line connected to subscriber set 538 defines that call forwarding is in effect and that calls are to be forwarded to a directory number which, as will subsequently be determined, is associated with subscriber set 528 connected to remote switching module 501. In response to reading the PORTSTATUS relation, termination system process 4005 creates a call forwarding terminal process 4007 and transmits a call forwarding (CF) message to process 4007. The CF message includes all the information concerning the origination of the call that was present in the RTGEN message received from routing system process 4002 in remote switching module 503. In response to the CF message, call forwarding terminal process 4007 effects the transmission of a short-duration ringing voltage to subscriber set 538 to produce what is referred to as a ping ring. The ping ring notifies anyone at subscriber set 538 that an incoming call is being forwarded. Call forwarding terminal process 4007 then transmits a reroute (RERTE) message to a routing system process 4006 in remote switching module 502. At this point, the call has been reduced to a simple call. Routing system process 4006 responds to the RERTE message in the same manner that it would to a RTREQ message and, since the terminating port is connected to one of the cluster of remote switching modules 501 through 504, routing system process 4006 completes the determination of the GPI of the terminating port connected to subscriber set 528. The MODULE field of the GPI defines remote switching module 501. Therefore routing system process 4006 transmits a RTGEN message to a termination system process 4008 in remote switching module 501. It is important to note that because of the closure property, the RIGEN message received by process 4008 contains the same information concerning the call origination that was present in the RTGEN message transmitted by routing system process 4002. Therefore, the response of termination system process 4008 is the same whether the call is a simple call or a sequence call. Termination system process 4008 reads the PORTSTATUS relation (FIG. 32) and, in accordance with the present example, determines that subscriber set 528 is presently idle. Process 4008 then creates a terminating terminal process 4010 and forwards the call information thereto in a LNTERM message (FIG. 14) previously described herein. At this point, knowing the final terminating port for the call and also knowing that the originating port is connected to remote switching module 503, process 4010 reads the time slot status map to determine the busy/idle status of time slots 1 through 12 on transmission facility 426 interconnecting remote switching modules 501 and 503. Assuming that one the 12 time slots is available, process 4010 makes the time slot assignment for the call. (The alternatives when none of the 12 time slots are available are discussed above.) The remainder of the call setup sequence is completed in the typical fashion, including the transmission of a SETUPCOMP message to originating terminal process 4003 in remote switching module 503 and the mapping of the originating peripheral time slot and the terminating peripheral time slot to the call time slot on transmission facility 426. Note that only three messages between remote switching modules were required. Four messages would be required if the call setup sequence is returned to remote switching module 503 to deallocate a previously assigned call time slot after learning that call forwarding is in effect.

Figure 38:
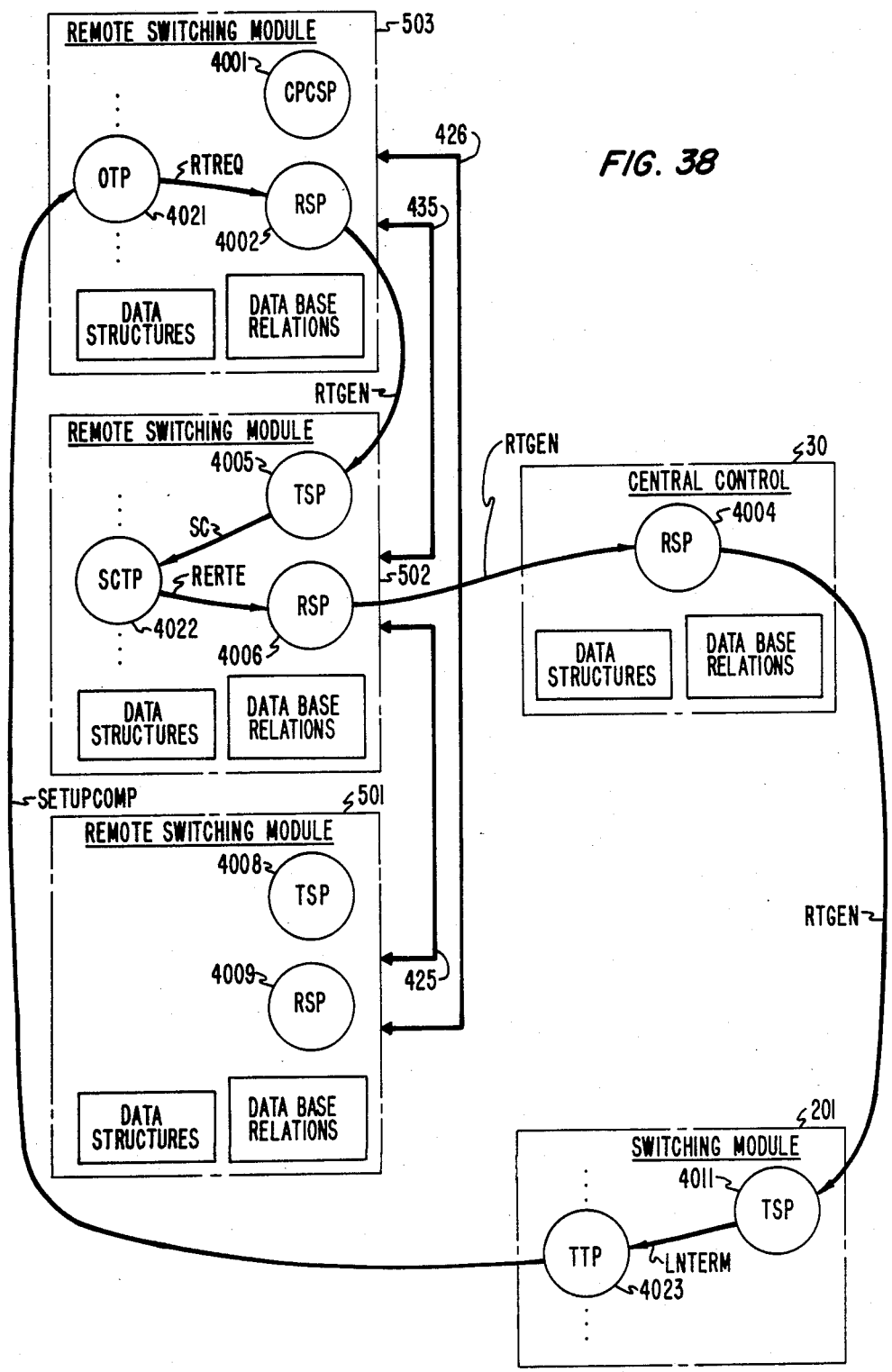

As a second example, assume that subscriber set 548 dials the directory number associated with subscriber set 538 as before, but that the appropriate tuple of the PORTSTATUS relation indicates that calls are to be series-completed to the directory number of subscriber set 23 connected to switching module 201. The example is similar to the previous example including the creation of an originating terminal process 4021 (FIG. 38), the determination of the original terminating port by routing system process 4002 in remote switching module 503 and the transmission of the RTGEN message to the termination system process 4005 in remote switching module 502. However, in this case, process 4005 learns upon reading the PORTSTATUS relation, that subscriber set 538 is presently busy and that calls to subscriber set 538 are to be series-completed to the directory number associated with subscriber set 23. Process 4005 therefore creates a series-completion terminal process 4022 and transmits a series-completion (SC) message including the origination information to process 4022. Process 4022 subsequently forwards the origination information and the series-completion information to routing system process 4006 in a RERTE message. At this point, the call has been reduced to a simple call. Since the directory number translation information pertaining to subscriber set 23 is not present in the DNTRAN relation stored in remote switching module 502, the execution of the routing program (FIGS. 25 through 29) results in the transmission of a RTGEN message because the attempted access of the DNTRAN relation fails. As has been described with respect to System II, the RTGEN message includes the REQTERM field that defines the state of the routing program to be entered when routing is continued by the next processor and the value of the key required to read the next relation. The RTGEN message further includes the RTCONTDA field which defines values of a number of variables which have already have been determined by routing system process 4006 in order that unnecessary work is not repeated when routing is continued. The RTGEN message is transmitted to a routing system process 4004 in central control 30. Since the DNTRAN relation stored in central control 30 has the directory number translation information for all the lines of the system, routing system process 4004 completes the determination of the terminating port. Since routing system process 4004 knows that the originating port is on remote switching module 503 connected to host switching module 302, and that the terminating port is on switching module 201, routing system process 4004 assigns the network time slot (through time-multiplexed switch 10 connecting switching module 201 and host switching module 302) to be used for the call and sets up the path accordingly. Routing system process 4004 then transmits a RTGEN message including the updated PATHDES field and the completed TERMGPI field, to a termination system process 4011 in switching module 201. Assuming that subscriber set 23 is presently idle, process 4011 creates a terminating terminal process 4023 and transmits a LNTERM message thereto. The balance of the call setup sequence includes the transmission of a SETUPCOMP message to originating terminal process 4021 in remote switching module 503, the mapping of the terminating peripheral time slot to the assigned network time slot of time-multiplexed switch 10, the assignment of a time slot for the call on one of the transmission facilities 441 through 444 interconnecting remote switching module 503 and host switching module 302, e.g., transmission facility 441, the mapping of the originating peripheral time slot to the call time slot on transmission facility 441 and the mapping of the call time slot on transmission facility 441 to the assigned network time slot of time-multiplexed switch 10.

Figure 39:
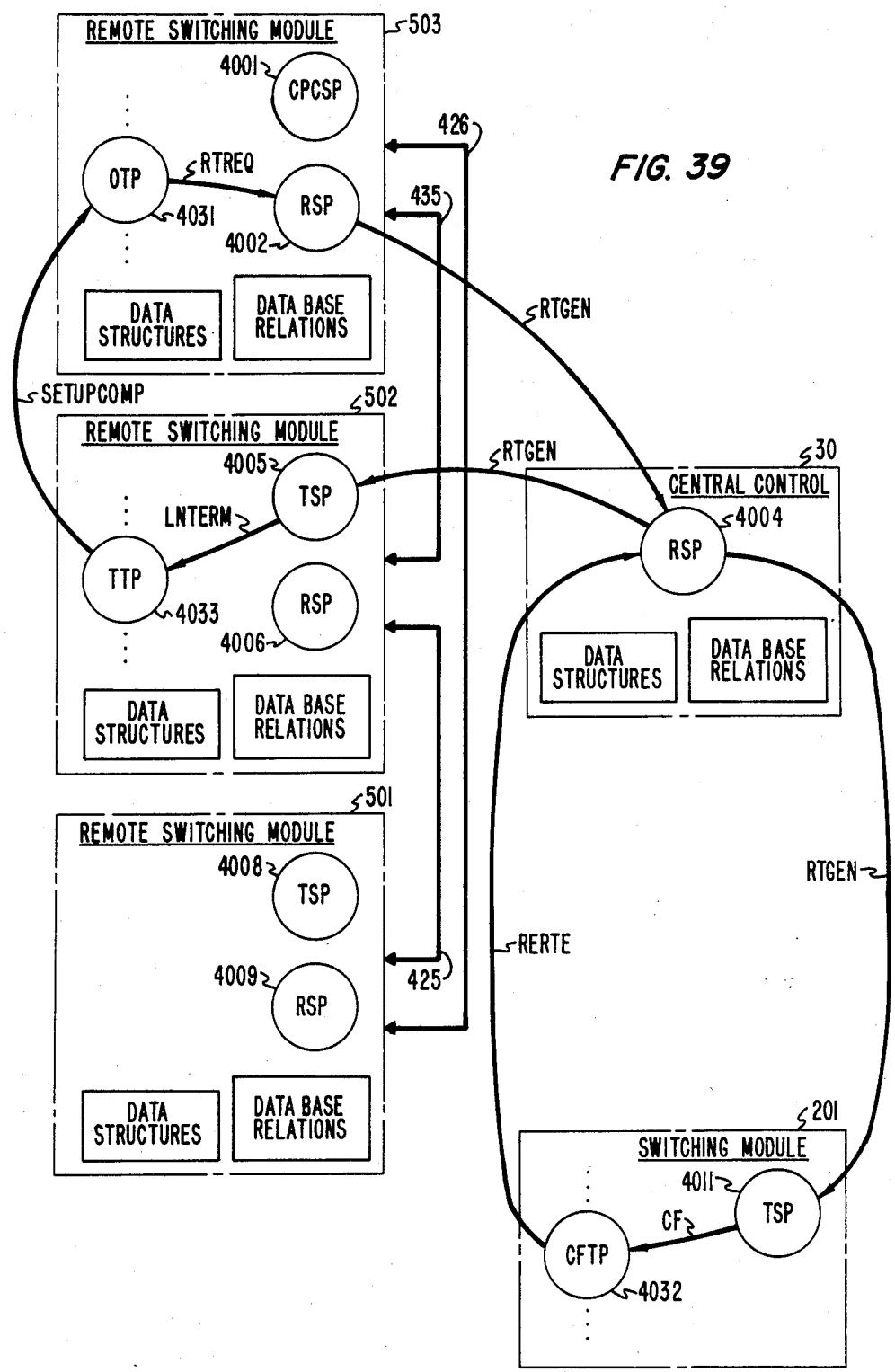

As a third example, consider that subscriber set 548 connected to remote switching module 503 dials the directory number associated with subscriber set 23 connected to switching module 201. Further assume that the appropriate tuple of the PORTSTATUS relation stored in switching module 201 defines that call forwarding is in effect for subscriber set 23 and that calls are to be forwarded to the directory number associated with subscriber set 538 connected to remote switching module 502. An originating terminal process 4031 (FIG. 39) is created and a RTREQ message is transmitted thereby to routing system process 4002 in the above-described manner. Since the DNTRAN relation stored by remote switching module 503 does not include the directory number translation information for subscriber set 23, the attempted access of the DNTRAN relation when the routing program is executed by routing system process 4002 fails, and a RTGEN message is transmitted to routing system process 4004 in central control 30. Routing system process 4004 completes the determination of the GPI of the terminating port connected to subscriber set 23. Routing system process 4004 also assigns a network time slot of time-multiplexed switch 10 between switching module 201 and host switching module 302 for the call and establishes the path. Routing system process 4004 then transmits a RTGEN message including the updated PATHDES field and the completed TERMGPI field to termination system process 4011 in switching module 201. In response, process 4011 reads the PORTSTATUS relation and determines that calls to subscriber set 23 are to be forwarded to the directory number associated with subscriber set 538. Process 4011 then creates a call forwarding terminal process 4032 and transmits a CF message thereto. Call forwarding terminal process 4032 effects the transmission of the short duration ringing voltage to subscriber set 23 and then transmits a RERTE message back to routing system process 4004 in central control 30. In response to the RERTE message, routing system process 4004 deallocates the previously assigned network time slot, and completes the determination of the GPI of the terminating port connected to subscriber set 538. At this point, the call has been reduced to a simple call. The MODULE field of the GPI defines that the terminating port is on remote switching module 502. Knowing that the originating port is on remote switching module 501, routing system process 4004 does not assign a new network time slot for the call but transmits a RTGEN message including the completed TERMGPI field to termination process 4005 in remote switching module 502. Process 4005 reads the PORTSTATUS relation to determine that subscriber set 538 is presently idle and then selects an available time slot of the time slots 1 through 12 on the transmission facility 435 interconnecting remote switching modules 502 and 503, as the call time slot. Process 4005 creates a terminating terminal process 4033 and transmits a LNTERM message thereto. The balance of the call setup sequence proceeds in the normal manner including the transmission of a SETUPCOMP message to originating terminal process 4031 in remote switching module 503, and the mapping of the originating peripheral time slot and the terminating peripheral time slot to the call time slot on transmission facility 435.

Since each remote switching module is able to complete the terminating port determination function for calls to all individual lines connected to the cluster of modules 501 through 504, an originating remote switching module could, after determining a terminating remote switching module, immediately select and allocate the call channel on the interconnecting transmission facility. This is done in an alternative embodiment of System III. Once the terminating remote switching module determines that the call is a sequence call, however, the setup sequence is returned to the originating remote switching module so that the previously allocated call channel can be deallocated in order to reduce the call to a simple call.

Figure 40:
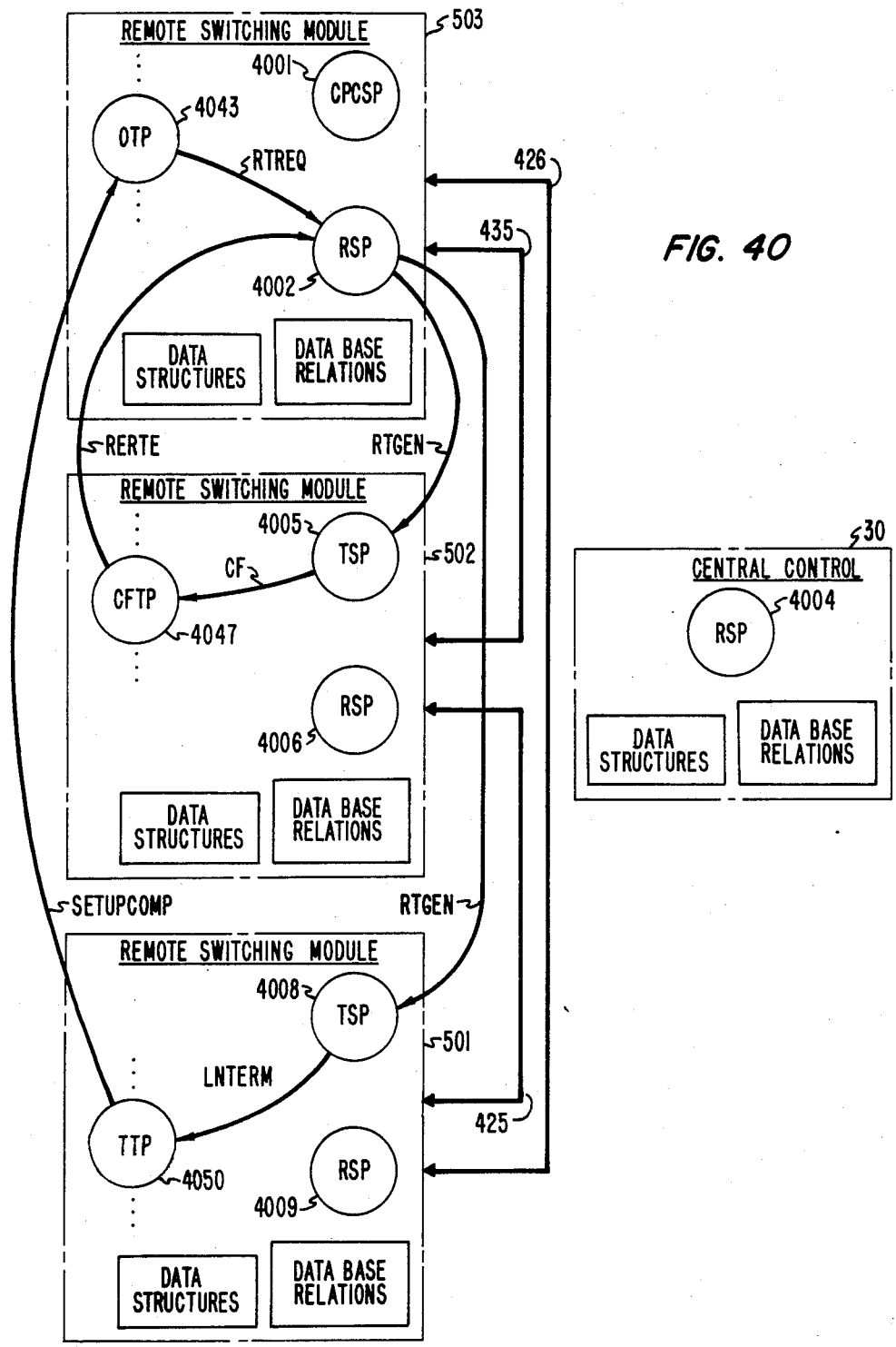
FIG. 40 illustrates an exemplary call setup sequence in an alternative embodiment of System III.

As an example of a sequence call in the alternative embodiment of System III, consider that subscriber set 548 connected to remote switching module 503 dials the directory number of subscriber set 538 connected to remote switching module 502. In remote switching module 503 (FIG. 40), an originating terminal process 4043, which was created by a call processing control system process 4001 in response to the detection of off-hook status, receives the dialed directory number. Originating terminal process 4043 analyzes the dialed digits to obtain values of PI, DI, DIGCNT and TREAT. Originating terminal process 4043 also determines the value of SI based on the characteristics of the originating line. Originating terminal process 4043 then transmits a RTREQ message to routing system process 4002.

Routing system process 4002 uses the information in the RTREQ message to access its associated database. Since the DNTRAN relation stored in remote switching module 503 includes the directory number translation information for all lines connected to the remote switching modules 501 through 504, routing system process 4002 is able to complete the determination of the GPI of the port connected to subscriber set 538. The MODULE field of the GPI defines that subscriber set 538 is connected to remote switching module 502. Routing system process 4002 then determines whether one of the channels 13 through 23 on transmission facility 435 interconnecting modules 503 and 502 is available. For the present example, assume that channel 13 is available and is selected by process 4002. Routing system process 4002 transmits a RTGEN message (including the selected channel 13) to a termination system process 4005 is remote switching module 502. Process 4005 responds by accessing the PORTSTATUS relation using the GPI as a key. Assume that the tuple of the PORTSTATUS relation for the line connected to subscriber set 538 defines that call forwarding is in effect and that calls are to be forwarded to a directory number which, as will subsequently be determined, is associated with subscriber set 528 connected to remote switching module 501. In response to reading the PORTSTATUS relation, termination system process 4005 creates a call forwarding terminal process 4047 and transmits a call forwarding (CF) message to process 4047. In response to the CF message, call forwarding terminal process 4047 effects the transmission of a short-duration ringing voltage to subscriber set 538 to produce the ping ring. Call forwarding terminal process 4047 then transmits a RERTE message to routing system process 4002 in remote switching module 503. Routing system process 4002 completes the determination of the GPI of the terminating port connected to subscriber set 528. The MODULE field of the GPI defines remote switching module 501. Routing system process 4002 then deallocates the previously allocated call channel 13 of transmission facility 435. At this point the call has been reduced to a simple call. Routing system process 4002 next determines whether one of the channels 13 through 23 is available on transmission facility 426 interconnecting modules 503 and 501. Assume that channel 18 is available and is selected and allocated to the call by routing system process 4002. Routing system process 4002 transmits a RTGEN message (including the selected call channel 18) to termination system process 4008 in remote switching module 501. It is important to note that the RTGEN message received by process 4008 contains the same information concerning the call origination that was present in the RTGEN message received by termination system process 4005. The balance of the call setup sequence proceeds in the same manner as in the previous example described with reference to FIG. 37.

System IV

System IV (FIG. 41) uses substantially the same hardware architecture as System I (FIG. 2) previously described herein. However, in System IV all of the call processing functions except selecting the network time slot and setting up the time-multiplexed switch 10 path for inter-module calls are distributed to the switching modules rather than involving the system central control. In particular, the function of determining the terminating port can be done for all calls by the cooperative processing of only the switching modules. Therefore central control 30' in System IV can be implemented as a relatively inexpensive processor because of the substantial reduction in the processing load that it must handle when compared with the central control 30 of System I even though both systems comprise 29 switching modules. Alternatively, the same processor could be used in a system including many more switching modules.

Figure 42:
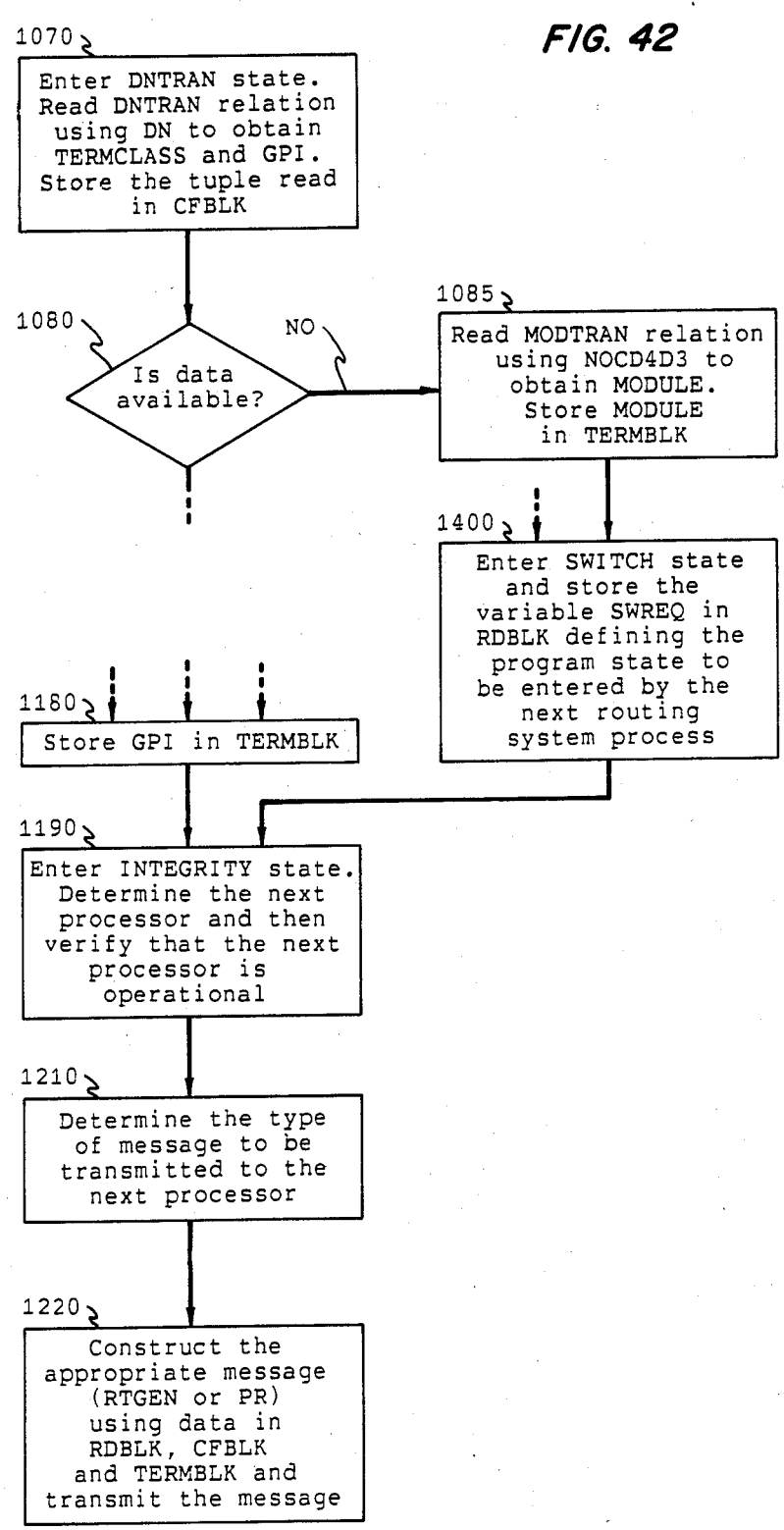
FIG. 42 is a diagram of certain modifications made to the flow chart of FIGS. 25-29, to define the operation of the routing program used in System IV.

In System IV, each of the switching modules 201 through 229 has a routing system process, its associated data structures RDBLK, CFBLK, GRPBLK and TERMBLK and database comprising the FIXEDRI, SCRNING, DNTRAN, ROUTING, PORTGROUP, GROUPPORT, MHG, LNSTAT, TRKG, TKOWNER, TKQUE and TKSTAT relations. Each switching module also has a MODTRAN relation (FIG. 32). All of the routing system processes execute the same routing program, which program is modified with respect to the program of Systems II and III (the flow chart of which is shown in FIG. 25 through 29). The modifications are shown in FIG. 42 and are described later herein. The state diagram associated with those routing system processes is the same as the state diagram of FIG. 24 except that the NWCONN state 3013 is not needed. Central control 30' does not have a routing system process but rather a path hunt system process responsible only for the selection of the network time slot and the establishment of the time-multiplexed switch 10 path for inter-module calls.

Directory Number Translation

The FIXEDRI, SCRNING, ROUTING, PORTGROUP, GROUPPORT, MHG and TRKG relations are redundant in each of the switching modules 201 through 229. Each of those relations stores the pertinent data for the entire system. The DNTRAN relation varies among the switching modules. For example, the DNTRAN relation in switching module 201 stores the directory number translation information for all lines connected to switching module 201 and in addition for a set of 1800 DNs from 10000 through 11799. (Recall that the first digit of the DN is the NOC and the last four digits of the DN are the last four dialed digits.) The DNTRAN relation in switching module 202 stores the directory number translation information for all lines connected to switching module 202 and for a set of 1800 DNs from 11800 through 13599. Similarly, the DNTRAN relation in each of the other switching modules stores the directory number translation information for all lines connected to that switching module and in addition for a set of 1800 DNs as defined in Table 2.

TABLE 2

| SWITCHING MODULE | nxx | DN |
|---|---|---|
| 201 | 355 | 10000–11799 |
| 202 | 355 | 11800–13599 |
| 203 | 355 | 13600–15399 |
| 204 | 355 | 15400–17199 |
| 205 | 355 | 17200–18999 |
| 206 | 357 | 20000–21799 |
| 207 | 357 | 21800–23599 |
| 208 | 357 | 23600–25399 |
| 209 | 357 | 25400–27199 |
| 210 | 357 | 27200–28999 |
| . | . | . |
| 221 | 491 | 50000–51799 |
| 222 | 491 | 51800–53599 |
| 223 | 491 | 53600–55399 |
| 224 | 491 | 55400–57199 |
| 225 | 491 | 57200–58999 |
| 226 | 493 | 60000–61799 |
| 227 | 493 | 61800–63599 |
| 228 | 493 | 63600–65399 |
| 229 | 493 | 65400–67199 |

Of course, there is no requirement that an equal number of DNs be associated with each switching module. The assignment of 1800 DNs per switching module in the present system is only for purposes of illustration. Furthermore, although in general subscriber sets connected to a given switching module need not be restricted to a particular set of 1800 DNs, maximizing the intersection between the set of 1800 DNs and the set of DNs assigned to the subscriber sets connected to that switching module is desirable. The MODTRAN relation (FIG. 32), which is redundant in each switching module and which includes the NOCD4D3 attribute and the MODULE attribute, is used to locate the switching module storing the directory number translation information for originations where the needed information is not present in the originating switching module. The contents of the MODTRAN relation for the present example are summarized in Table 3.

TABLE 3

| MODTRAN | |
|---|---|
| NOCD4D3 | MODULE |
| 100–117 | 201 |
| 118–135 | 202 |
| 136–153 | 203 |
| 154–171 | 204 |
| 172–189 | 205 |
| 200–217 | 206 |
| 218–235 | 207 |
| 236–253 | 208 |
| 254–271 | 209 |
| 272–289 | 210 |
| . | . |
| 500–517 | 221 |

TABLE 3-continued

| MODTRAN | |
|---|---|
| NOCD4D3 | MODULE |
| 518-535 | 222 |
| 536-553 | 223 |
| 554-571 | 224 |
| 572-589 | 225 |
| 600-617 | 226 |
| 618-635 | 227 |
| 636-653 | 228 |
| 654-671 | 229 |

The NOCD4D3 attribute represents the combination of a NOC, and the thousands digit D4 and the hundreds digits D3 of the dialed number. For example, since switching module 201 stores the directory number translation information for DNs 10000 through 11799, the MODTRAN relation defines that for originations where the NOCD4D3 value is from 100 through 117, the necessary directory number translation information is in switching module 201. (Note that if the association of DNs to switching modules were done by thousands groups, the NOC plus only the thousands digit D4 would be sufficient to define the location of the information.) The distribution of the dynamic data for multiport hunt groups, i.e., the LNSTAT, TKOWNER, TKQUE and TKSTAT relations, is described later herein.

The modifications to the flow chart of FIGS. 25 through 29 that are required for System IV are shown in FIG. 42. A block 1085 is inserted between decision block 1080 and block 1400. Recall that in block 1070, the DNTRAN relation is read using the DN as the key and then in decision block 1080 a determination is made of whether the requested data is available in the DNTRAN relation. As shown in FIG. 42, if the requested data is not available as determined in block 1080, execution proceeds to block 1085. During block 1085, the MODTRAN relation (FIG. 32) is read using the NOCD4D3 attribute as the key to obtain the MODULE field which defines the switching module where the necessary data is stored. The MODULE field is stored in the TERMBLK and execution proceeds to block 1400. In block 1400, the SWITCH state 3014 (FIG. 24) is entered and the variable SWREQ is stored in the RDBLK defining the DNTRAN state 3004 as the program state to be entered by the next routing system process. Execution proceeds to block 1190 during which the next processor is determined. If the function of determining the terminating port has been completed, the next processor is always central control 30'. However, if the terminating port has not been determined yet, the next processor is in the switching module defined by the MODULE field in the TERMBLK. The operational status of the next processor is then verified and execution proceeds to block 1210 during which the type of message to be transmitted is determined. If the next processor is in one of the switching modules, a RTGEN message (FIG. 32), previously described herein, is constructed. If the next processor is central control 30', a path request (PR) message (FIG. 32) is constructed. The PR message is used to request central control 30' to select a network time slot for the call and, if the call is an inter-module call, to set up the time-multiplexed switch 10 path. The PR message includes the same fields as the RTGEN message except the REQTERM and RTCONTDA fields are not required in the PR message. Execution then proceeds to block 1220, the appropriate message is constructed using data in RDBLK, CFBLK and TERMBLK, and the message is transmitted.

As a first example of call setup in System IV, consider that subscriber set 25 connected to switching module 229 has just gone off-hook. The off-hook state is detected by scanning within line unit 21. A call processing control system process 5001 (FIG. 43) within switching module 229 is informed of the off-hook detection and, in response, creates an originating terminal process 5008. Originating terminal process 5008 is responsible for controlling the transmission of dial tone to subscriber set 25 and the subsequent reception of digits dialed from subscriber set 25. Assume for the present example that the number 355-2289 is dialed. Originating terminal process 5008 analyzes the dialed digits to obtain values of the prefix index (PI), destination index (DI), digit count (DIGCNT) and treatment (TREAT) variables. Originating terminal process 5008 determines the value of the screen index (SI) based on the characteristics of the originating line. Originating terminal process 5008 then formulates a route request message RTREQ (FIG. 14) in a message buffer.

Once the RTREQ message has been formulated, it is transmitted by originating terminal process 5008 to routing system process 5002 (FIG. 42) still within switching module 229. Routing system process 5002 stores the RTREQ message in its associated RDBLK. Routing system process 5002 then sequentially accesses its associated database in accordance with the routing program (FIGS. 25 through 29 modified as in FIG. 42). Since the nxx digits 355 are encoded as a NOC of 1 in the present example, the dialed number 355-2289 is represented as the DN 12289. The directory number translation information for the DN 12289 is not present in the DNTRAN relation in switching module 229. Therefore when the DNTRAN relation is accessed during the execution of the routing program using the DN 12289 as the key, the access fails. The MODTRAN relation (FIG. 32) is read using the NOCD4D3 of 122 as the key to obtain the identity of the switching module that does store the necessary directory number translation information. In accordance with the present example, it is determined that the information is stored in switching module 202 (see Table 3). Routing system process 5002 formulates a generalized routing (RTGEN) message (FIG. 32) including a REQTERM field that defines the DNTRAN state 3004 (FIG. 24) as the program state to be entered by the next routing system process and the DN 12289 to be used as the key to access the DNTRAN relation. Routing system process 5002 then transmits the RIGEN message to routing system process 5004 in switching module 202.

In response to the REQTERM field of the RTGEN message, routing system process 5004 begins the execution of its routing program in the DNTRAN state 3004 (FIG. 24). The DNTRAN relation is accessed using the DN 12289 as the key. This time the necessary information is present, as was indicated by the MODTRAN relation read in switching module 229. Assume for the present example that the DN 12289 is translated to the global port identity of the port of switching module 201 that is connected to subscriber set 23. Since routing system process 5004 has completed the determination of the terminating port for the call, process 5004 formulates a path request (PR) message (FIG. 32) including an ORIGGPI field defining the switching module 229 port connected to subscriber set 25 and a TERMGPI field defining the switching module 201 port connect to subscriber set 23. Process 5004 transmits the PR message to a path hunt system process 5007 in central control 30'.

Central control 30' stores a network map defining the busy/idle status of all the time-slots of all the time-multiplexed lines between the switching modules 201 through 229 and time-multiplexed switch 10. Recall that there are two, 256-time-slot time-multiplexed line pairs between each switching module and time-multiplexed switch 10. Accordingly there are 512 time slots available between a given switching module and time-multiplexed switch 10. Path hunt system process 5007 in central control 30' responds to the PR message by select a commonly available time slot between switching module 229 and switching module 201. Path hunt system process 5007 also writes information defining the selected network time slot into control memory 29. Process 5007 then transmits a LNTREQ message (FIG. 14) including the defined network time slot in its PATHDES field, to termination system process 5005 in switching module 201.

In response to the LNTREQ message, termination system process 5005 reads the PORTSTATUS relation (FIG. 32) stored in switching module 201 to determine whether subscriber set 23 is presently busy or idle. If subscriber set 23 is idle, process 5005 creates a terminating terminal process 5009 and forwards the information received in the LNTREQ message to process 5009 via a LNTERM message. Terminating terminal process 5009 effects the transmission of ringing voltage to subscriber set 23, and the transmission of an E-bit continuity signal and audible ringing tones to switching module 229. Terminating terminal process 5009 then transmits a setup complete (SETUPCOMP) message to originating terminal process 5008 in switching module 229 including the completed path descriptor PATHDES. In response, originating terminal process 5008 effects the transmission of the E-bit continuity signal to switching module 201. When switching module 201 receives the E-bit continuity signal from switching module 229, terminating terminal process 5009 determines the terminating peripheral time slot to be used to communicate with subscriber set 23 and writes information in the control RAM 55 of switching module 201 defining the mapping between the terminating peripheral time slot and the network time slot. Similarly, when switching module 229 receives the E-bit continuity signal from switching module 201, originating terminal process 5008 determines the originating peripheral time slot to be used to communicate with subscriber set 25 and writes information in the control RAM 55 of switching module 229 defining the mapping between the originating peripheral time slot and the network time slot. The communication path between subscriber sets 25 and 23 has now been set up.

Figure 44:
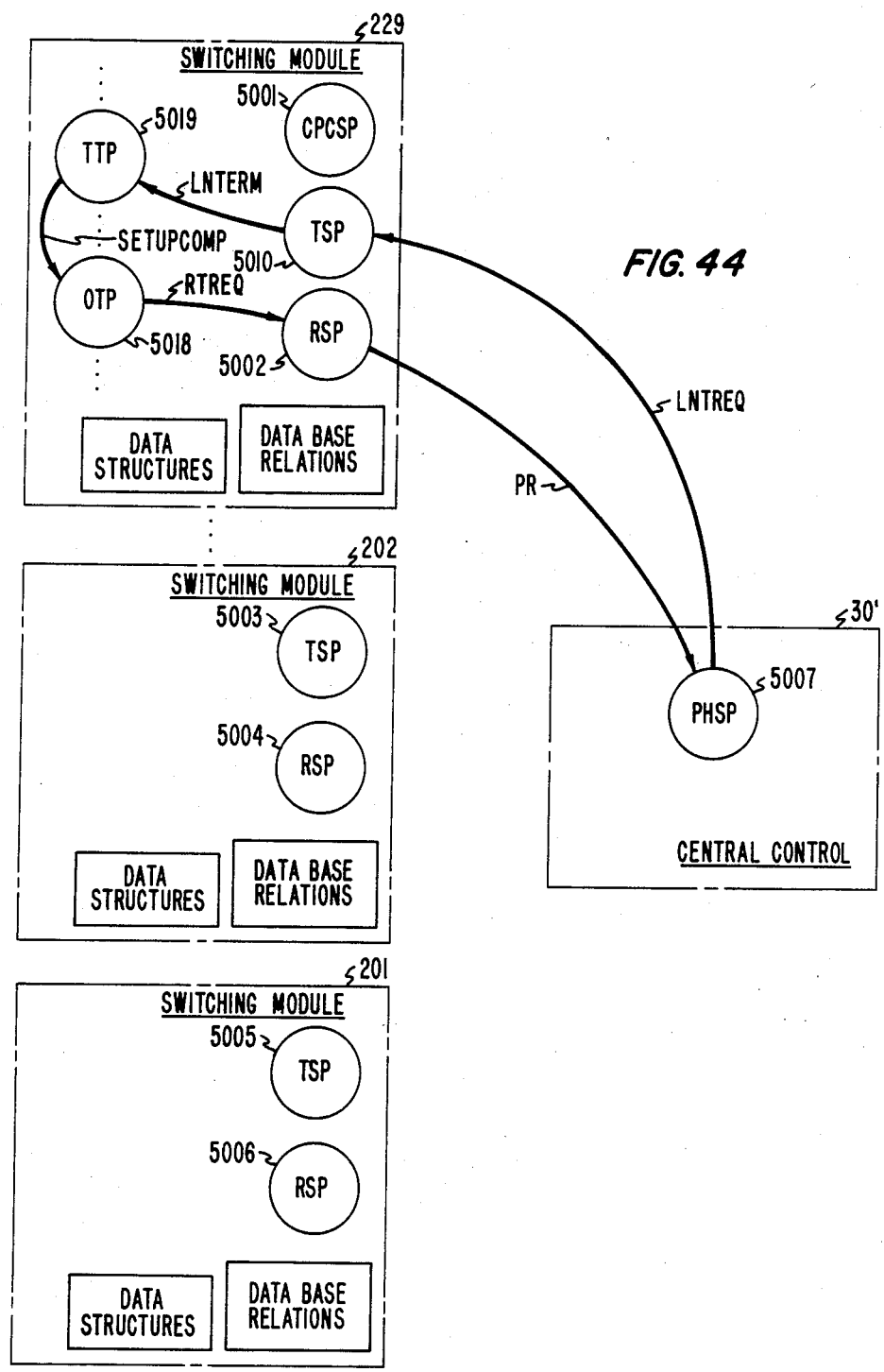

As a second example, consider that the number 493-5433 is dialed from subscriber set 25 connected to switching module 229. Originating terminal process 5018 (FIG. 44), which was created by call processing control system process 5001 after being informed of the detection of the off-hook state, receives the dialed digits and then transmits a RTREQ message to routing system process 5002. In response, routing system process 5002 executes its routing program. In this case, as is desirable, the DN 65433 is assigned to a terminating subscriber set, e.g., subscriber set 26, connected to the same switching module, module 229, in which the directory number translation information for that DN 65433 is stored (see Table 2). Therefore the access of the DNTRAN relation during the execution of the routing program is successful and the determination of the terminating port is completed by routing system process 5002. Routing system process 5002 then transmits a PR message (FIG. 32) to path hunt system process 5007 in central control 30'. Since both the ORIGGPI field and the TERMGPI field of the PR message define switching module 229, path hunt system process 5007 selects two available network time slots to be used to connect the receive time-slot interchanger 50 to the transmit time-slot interchanger 53 within switching module 229. One network time slot is used for each transmission direction. Since the call is an intra-module call, no time-multiplexed switch 10 path is needed. Therefore, process 5007 does not write information into control memory 29. Process 5007 transmits a LNTREQ message including the selected network time slot in the PATHDES field, to termination system process 5010. The balance of the call setup sequence including the creation of a terminating terminal process 5019, the transmission of a LNTERM message from process 5001 to process 5019, the transmission of a SETUPCOMP message from process 5019 to originating terminal process 5018, and the writing of the control RAM 55 in switching module 229 to define the mapping of originating and terminating peripheral time slots to the network time slot proceeds in the above-described manner.

Figure 45:
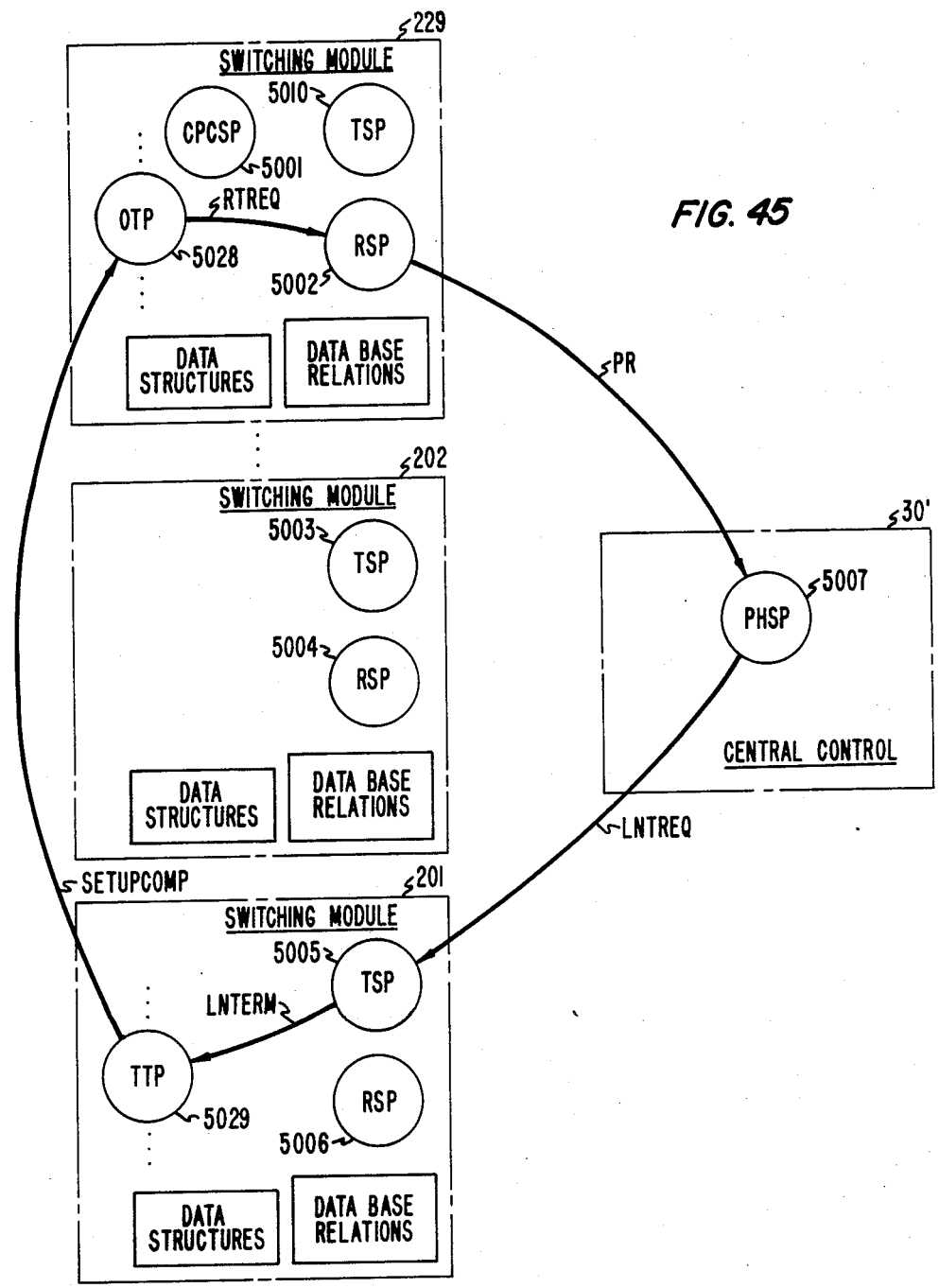

As a third example, consider that the number 493-5552 is dialed from subscriber set 25 connected to switching module 229. Since the directory number translation information for the DN 65552 is stored in the DNTRAN relation of switching module 229 (see Table 2), routing system process 5002 (FIG. 45) is able to complete the determination of the terminating port. Assume for this example, that the DN 65552 is assigned to subscriber set 23 connected to switching module 201. Routing system process 5002 transmits a PR message including the completed TERMGPI field to path hunt system process 5007 in central control 30'. In response, process 5007 selects a commonly available network time slot between switching modules 229 and 201 and establishes the path by writing in control memory 29. The balance of the call setup sequence to connect subscriber sets 25 and 23 is completed in the above-described manner.

Figure 46:
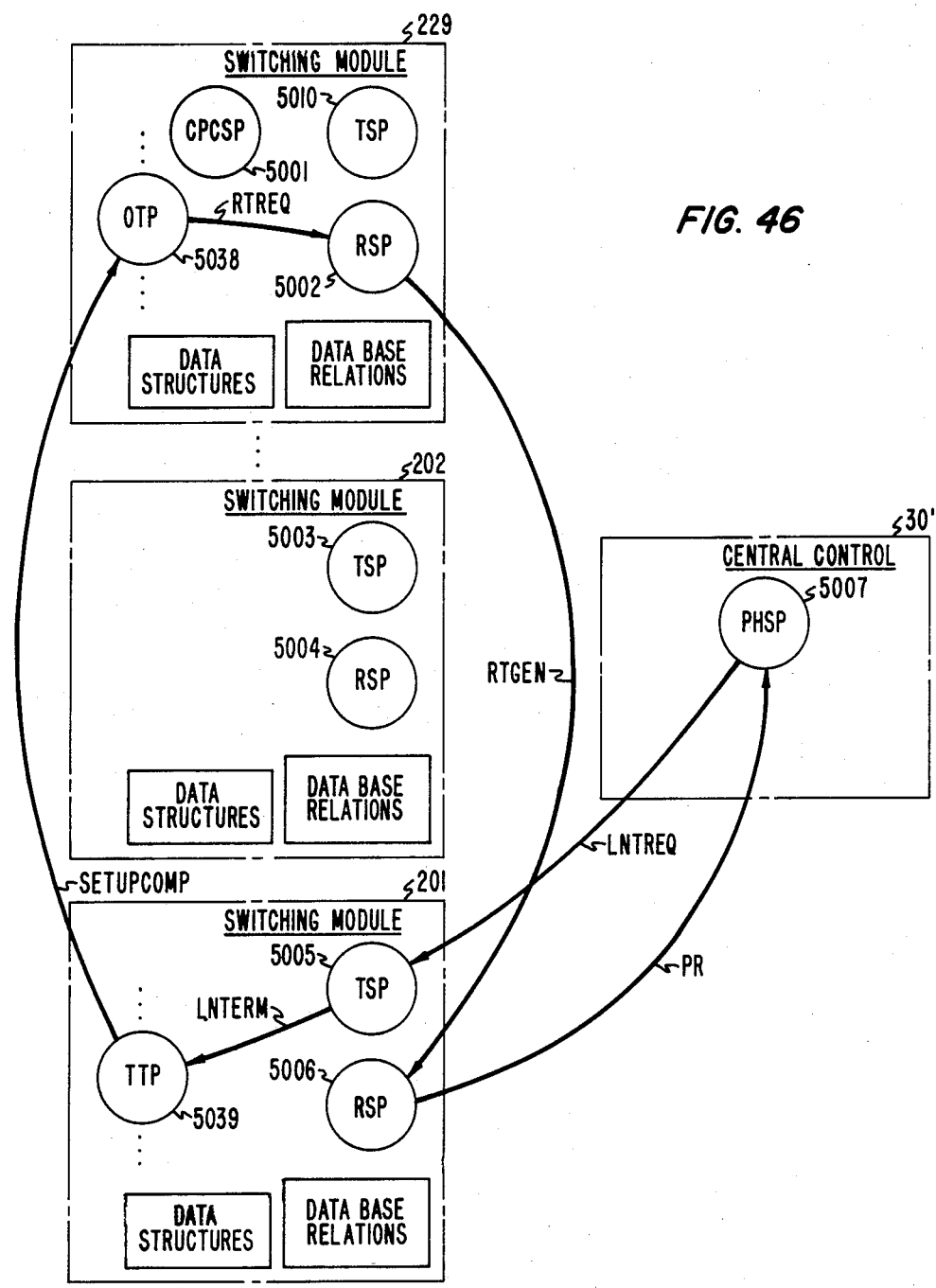

As a fourth example, consider that the number 355-1566 is dialed from subscriber set 25 connected to switching module 229. Since the directory number translation information for the DN 11566 is not stored in the DNTRAN relation of switching module 229 (see Table 2), routing system process 5002 (FIG. 46) is unable to complete the determination of the terminating port. When, during the execution of the routing program, the access of the DNTRAN relation fails, the MODTRAN relation is read to determine the location of the needed directory number translation information using a NOCD4D3 of 115 as the key. In accordance with this example, it is determined that the needed information is stored in switching module 201 (see Table 3). Accordingly a RTGEN message including the REQTERM field defining the DNTRAN state 3004 (FIG. 24) and the DN 11566 as the key to the DNTRAN relation is formulated. Routing system process 5002 transmits the RIGEN message to routing system process 5006 in switching module 201.

Routing system process 5006 enters its routing program in the DNTRAN state 3004. The access of the DNTRAN relation using the DN 11566 is successful as expected based on the reading of the MODTRAN relation in switching module 229. Assume for this example that the DN 11566 is assigned to subscriber set 23 connected to switching module 201. Again, this example represents a desirable assignment since the directory number translation information for the DN 11566 is stored in the same switching module, module 201, that the subscriber set assigned the DN 11566 is connected to. Since routing system process 5006 is able to complete the determination of the terminating port, process 5006 transmits a PR message to path hunt system process 5007 in central control 30'. In response, process 5007 selects a commonly available network time slot between switching modules 201 and 229 and sets up the time-multiplexed switch 10 path. Process 5007 then transmits a LNTREQ message to termination system process 5005 in switching module 201 and the balance of the call setup sequence proceeds in the above-described manner to connect subscriber sets 23 and 25.

Although not indicated in FIG. 32, the MODTRAN relation includes as attributes two secondary locations of the directory number translation information, which secondary locations are to be used in the event that the switching module defined by the MODULE attribute is not operational. The directory number translation information for a given group of 1800 DNs is stored in the DNTRAN relations of three switching modules, one designated as primary and two designated as secondary. When the INTEGRITY state 3012 (FIG. 24) is entered during block 1190 (FIG. 42) and it is determined that the processor in the switching module designated as primary is not operational, the RTGEN message is instead transmitted to an operational processor in one of the switching modules designated as secondary.

In the embodiment of System IV being described, the DNTRAN relation in each of the switching modules stores the directory number translation information for all lines connected to that switching module and in addition for a set of 1800 DNs as defined in Table 2. In an alternative embodiment, the DNTRAN relation in each of the switching modules stores the directory number translation information for only the set of 1800 DNs but not for any lines of that switching module that are assigned directory numbers outside the predetermined set of 1800 DNs. Rather than reading the MODTRAN relation only after a failure in reading the DNTRAN relation, rather the MODTRAN relation is read and no attempt is made to read the DNTRAN relation unless the MODTRAN relation indicates that the directory number translation is present. Otherwise routing is continued in the switching module defined by the MODTRAN relation.

Controlling Multi-Port Hunt Groups

Recall that in System I, the control of all multi-port hunt groups, i.e., multi-line hunt groups and trunk groups, was located exclusively in central control 30. Also recall that in Systems II and III, the control function for certain multi-port hunt groups was distributed to the remote switching modules 501 through 504. However such control function was distributed only for those multi-port hunt groups having all members connected to one remote switching module. The control of multi-port hunt groups having members spanning two or more modules still resided in central control 30. In system IV presently being described, the control of all multi-port hunt groups is distributed to the switching modules 201 through 229. Each multi-port hunt group is assigned one of the switching modules 201 through 229 as its group controller. In the present embodiment, certain rules are followed in making the assignments. For multi-port hunt groups having all members connected to one switching module, the assignment of the group controller is made to that switching module. For multi-port hunt groups having members spanning two or more modules, the module having the most group members connected thereto is assigned as the group controller. If all modules connected to the members of a group are connected to the same number of members, then one of the modules is arbitrarily selected as the group controller. In addition, the pilot DN, i.e., the DN used by subscribers to call a multi-line hunt group, is assigned to a group member connected to the group controller. Although the use of these assignment rules results in certain efficiencies concerning the number of inter-module control messages in System IV, other rules could clearly be used including a purely arbitrary assignment. The important criterion is that each group is assigned a controller.

The dynamic data defining the busy/idle status of multi-port hunt groups, i.e., the LNSTAT relation for multi-line hunt groups and the TKOWNER, TKQUE and TKSTAT relations for trunk groups, is stored by the group controllers. Consider the exemplary groups shown in Table 4.

TABLE 4

| Table of Multi-port Hunt Groups | |
|---|---|
| GROUP | GROUP CONTROLLER |
| Multi-line Hunt Group A (all members on SM 201) | SM 201 |
| Multi-line Hunt Group B (2 members on SM 201 12 members on SM 202) (2 members on SM 229) | SM 202 |
| Multi-line Hunt Group C (1 member on each SM 201-229) | SM 208 |
| . | |
| . | |
| Trunk Group A (all members on SM 201) | SM 201 |
| Trunk Group B (16 members on SM 201 32 members on SM 202) | SM 202 |
| . | |

Multi-line hunt group A has all members connected to switching module 201. Therefore switching module 201 is designated as the group controller of group A and the LNSTAT relation for group A is stored in switching module 201. Multi-line hunt group B has two members connected to switching module 201, 12 members connected to switching module 202 and two members connected to switching module 229. Switching module 202 is designated as the group controller of group B and the LNSTAT relation for group B is stored in switching module 202. Multi-line hunt group C has one member connected to each of the switching modules 201 through 229. Switching module 208 is arbitrarily designated as the group controller of group C and the LNSTAT relation for group C is stored in switching module 208. Trunk group A is a first-in-first-out (FIFO) group having all members connected to switching module 201. Switching module 201 is designated as the group controller and the TKOWNER and TKQUE relations for trunk group A are stored in switching module 201. Trunk group B is a forward/backward group having 16 members connected to switching module 201 and 32 members connected to switching module 202. Switching module 202 is designated as the group controller and the TKSTAT relation for trunk group B is stored in switching module 202.

All calls to multi-port hunt groups that originate from a switching module other than the group controller require the transmission of a control message to the group controller. The group controller performs the specified hunt algorithm using the dynamic busy/idle data for the group and assigns an idle group member to the call if one is available. The group controller immediately marks the assigned member busy. The group controller then transmits a control message to the switching module connected to the assigned member to complete the setup to that member. When the assigned member again becomes available, a control message is transmitted back to the group controller so that the assigned member can be marked idle.

As a first example of call setup involving such multi-port hunt groups, consider that the number 355-1922 is dialed at subscriber set 25 connected to switching module 229 and that 355-1922 is the pilot directory number of multi-line hunt group B having two members connected to switching module 201, 12 members connected to switching module 202 and two members connected to switching module 229 (see Tables 2 and 4). The attempted access of the DNTRAN relation by routing system process 5002 (FIG. 43) in switching module 229 using the DN 11922 fails. The MODTRAN relation (FIG. 32) is read using the NOCD4D3 of 119 as the key to determine that the needed directory number translation information is stored in switching module 202 (see Table 3). Routing system process 5002 formulates a RTGEN message including the REQTERM field defining the DNTRAN state 3004 (FIG. 24) as the program state to be entered by the next routing system process and the DN 11922 as the key to be used in accessing the DNTRAN relation. Routing system process 5002 then transmits the RTGEN message to routing system process 5004 in switching module 202.

In response to the RTGEN message, routing system process 5004 enters its routing program in the DNTRAN state 3004 and reads the DNTRAN relation with the DN 11922 as the key. In accordance with the above-mentioned assignment rules, the directory number translation information for the pilot DN 11922 is stored in switching module 202 and defines the global port identity of a switching module 202 port connected to one of the Group B members. Accordingly, the access of the DNTRAN relation in switching module 202 is successful. The TERMCLASS attribute of the retrieved DNTRAN tuple defines that the DNTRAN 11922 is assigned to a multi-line hunt group rather than to an individual line. The PORTGROUP and MHG relations are subsequently read by routing system process 5004 in accordance with its routing program. The MODULE attribute of the MHG tuple defines that switching module 202 is the designated group controller. Then the dynamic data defining the busy/idle status of all the members of multi-line hunt group B, which dynamic data is stored in the LNSTAT relation, is read. Since switching module 202 is the controller of the group, the access of the LNSTAT relation is successful and an idle group member is assigned to the call in accordance with the predefined hunt algorithm. The member is immediately marked as busy. In accordance with the present example, assume that subscriber set 23 connected to switching module 201 is a member of multi-line hunt group B and that subscriber set 23 is assigned to the call. Since routing system process 5004 has completed the determination of the terminating port, process 5004 transmits a PR message to path hunt system process 5007 in central control 30'.

Based on the ORIGGPI and TERMGPI fields of the PR message, path hunt system process 5007 selects a commonly available network time slot between switching modules 229 and 201 for the call and writes the information defining the selected network time slot in control memory 29 to set up the time-multiplexed switch 10 path. Path hunt system process 5007 then transmits a LNTREQ message including the defined network time slot in the PATHDES field, to termination system process 5005 in switching module 201 and the remainder of the call setup sequence proceeds in the above-described manner. When subscriber set 23 returns to on-hook, terminating terminal process 5009 is informed and transmits a control message to a call processing control system process (not shown) in group controller switching module 202 so that the dynamic data for the group can be updated.

Figure 47:
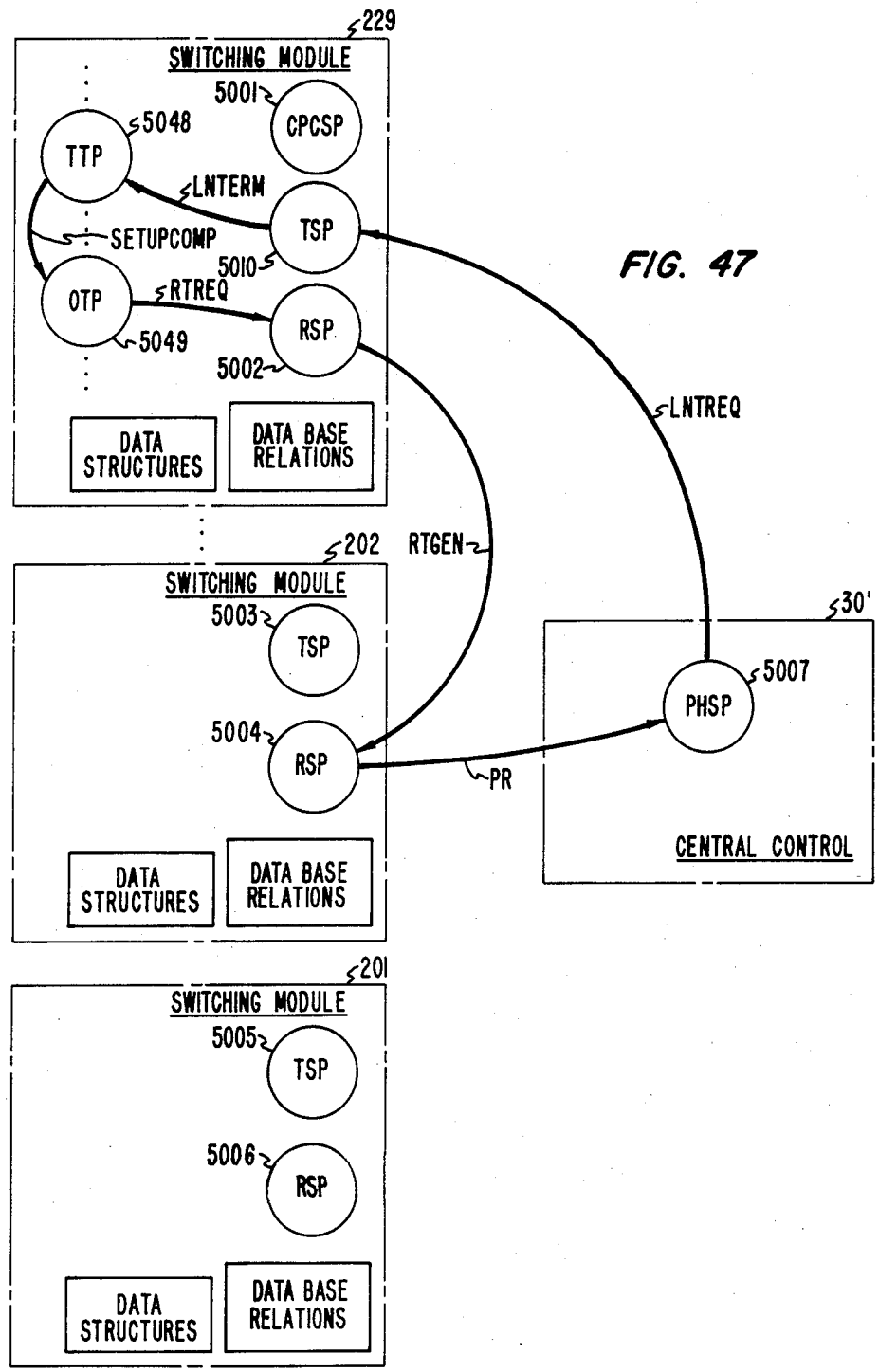

As a second example of call setup involving multiport hunt groups, assume that the pilot directory number 355-1922 of multi-line hunt group B is again dialed from subscriber set 25 connected to switching module 229. The directory number translation information for the DN 11922 is not present in the DNTRAN relation of switching module 229 (see Table 2). Therefore, when routing system process 5002 (FIG. 47) executes its routing program, the access of the DNTRAN relation with the DN 11922 fails. The MODTRAN relation is then read with a NOCD4D3 of 119 as a key. It is thereby determined that switching module 202 stores the needed directory number translation information (see Table 3). Routing system process 5002 formulates a RTGEN message including a REQTERM field defining the DNTRAN state 3004 as the program state to be entered by the next routing system process and the DN 11922 as the key to be used to read the DNTRAN relation. Routing system process 5002 transmits the RTGEN message to routing system process 5004 in switching module 202.

In response to the RTGEN message, routing system process 5004 begins the execution of its routing program in the DNTRAN state 3004. The access of the DNTRAN relation using the DN 11922 as the key is successful as expected based on the reading of the MODTRAN relation in switching module 229. The TERMCLASS attribute of the retrieved DNTRAN tuple defines that the DNTRAN 11922 is assigned to a multi-line hunt group rather than to an individual line. The PORGROUP and MHG relations are subsequently read by routing system process 5004 in accordance with its routing program. The MODULE attribute of the MHG tuple defines that switching module 202 is the designated group controller. Then the dynamic data defining the busy/idle status of all the members of multi-line hunt group B, which dynamic data is stored in the LNSTAT relation, is read. Since switching module 202 is the controller of the group, the access of the LNSTAT relation is successful and an idle group member is assigned to the call in accordance with the predefined hunt algorithm. The member is immediately marked as busy. In accordance with this second example, assume that subscriber set 26 connected to switching module 229 is a member of multi-line hunt group B and that subscriber set 26 is assigned to the call. Since routing system process 5004 was able to complete the determination of the terminating port, process 5004 transmits a PR message to path hunt system process 5007. Since both the ORIGGPI field and the TERMGPI field of the PR message define switching module 229, no time-multiplexed switch 10 path is required. Path hunt system process 5007 selects an available network time slot to be used to connect receive time-slot interchanger 50 to transmit time-slot interchanger 53 within switching module 229 and transmits a LNTREQ message including the network time slot in its PATHDES field, to termination system process 5010. The balance of the call setup sequence proceeds in the above-described manner.

Although not shown in FIG. 32, the MHG and TRKG relations also define one of the switching modules as a "shadow" group controller for each multi-port hunt group. The shadow group controller also maintains the dynamic data for the hunt group, i.e., it is informed via messages from the group controller of all busy/idle status changes. In the event that the group controller is not operational, hunting for the group is effected by the shadow group controller.

System V

Figure 48:
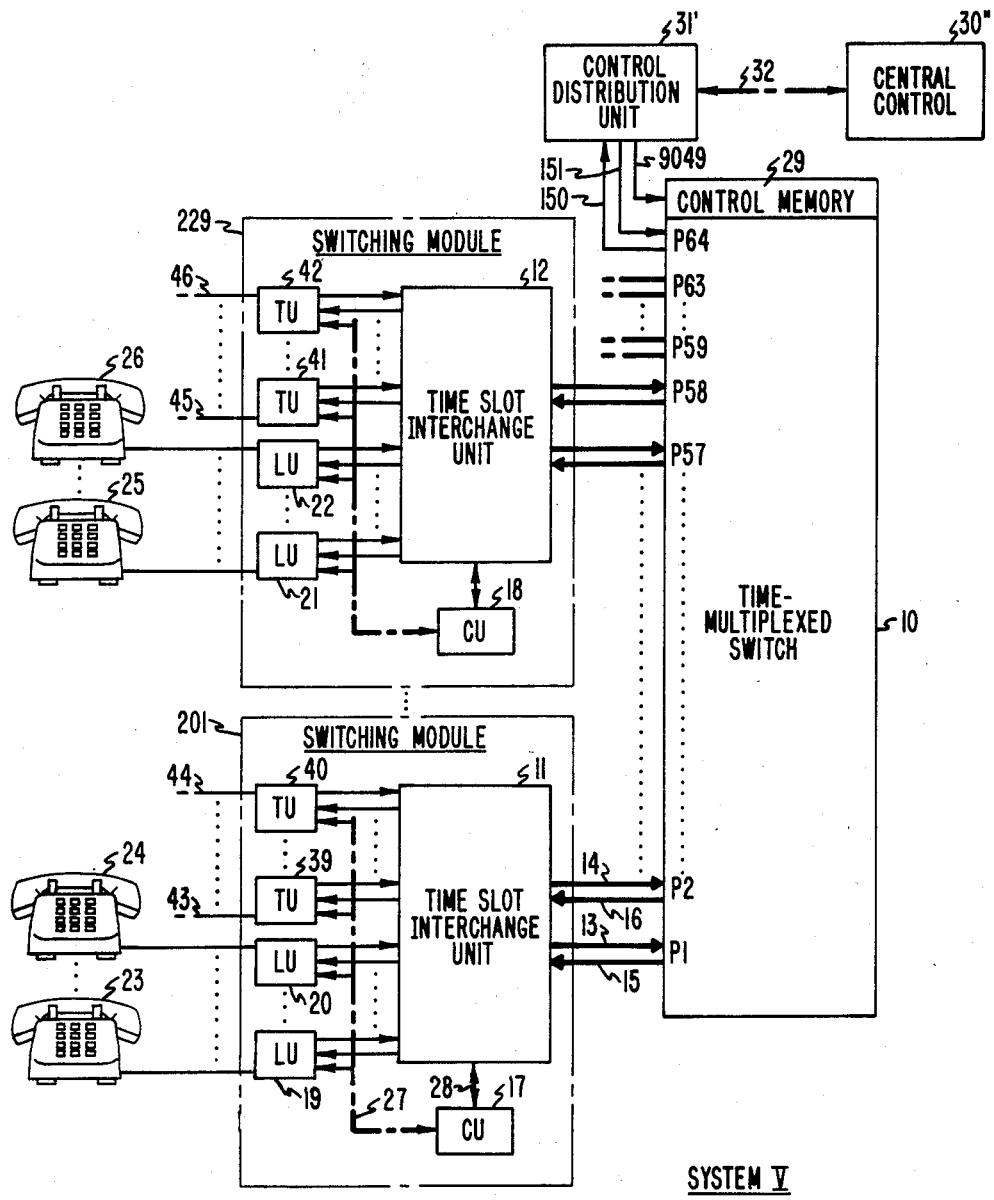
FIG. 48 is a diagram of a switching system, referred to herein as System V, where the system central control is completely relieved of the call processing function.

System V (FIG. 48) uses substantially the same hardware architecture as System I (FIG. 2) described previously herein. However, System V includes an alternative control distribution unit 31'. Recall that central control 30 controlled time multiplexed switch 10 in System I by writing instructions in control memory 29 via a communication path 49. In System V (FIG. 48), central control 30" as well as each of the switching modules 201 through 229 can controll times-multiplexed switch 10 by transmitting a control message to control distribution unit 31', and control distribution unit 31' responding by writing instructions via a control and diagnostic access link 9049 into control memory 29. Since the time-multiplexed switch 10 path hunt and setup functions are moved in System V from central control 30" to the switching modules 201 through 229, it is desirable that the switching modules 201 through 229 are able to control time-multiplexed switch 10 without involving central control 30".

Figure 41:
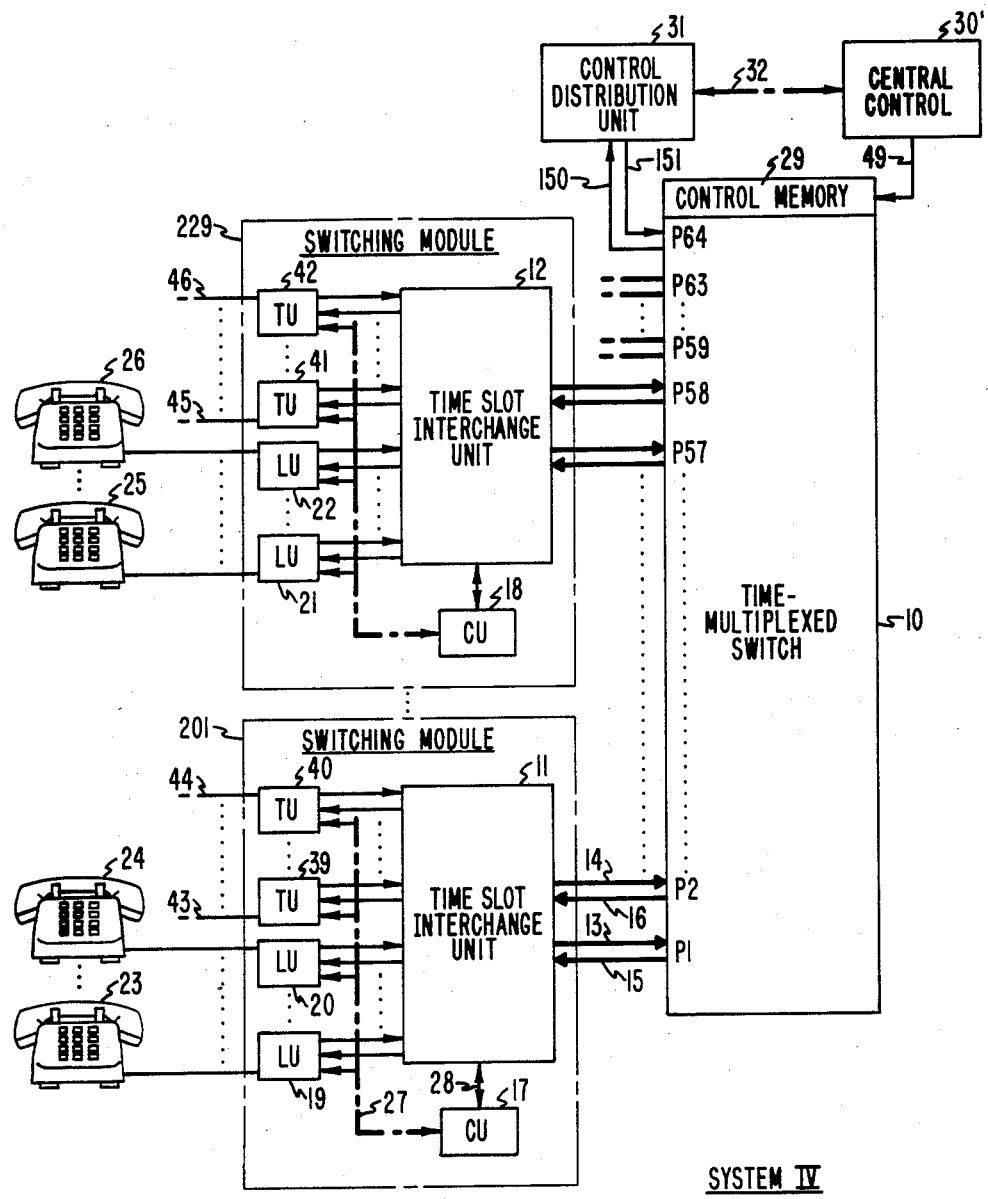
FIG. 41 is a diagram of a switching system, referred to herein as System IV, that uses substantially the same hardware architecture as System I, but where the terminating port determination function is done for all calls by the cooperative processing of only the switching modules.

The processor used to implement central control 30" in System V represents a further cost reduction over the processor of central control 30' in System IV (FIG. 41). Since central control 30" in System V is completely relieved of the per-call processing tasks involved in setting up calls, the reliability requirements imposed on that processor are significantly reduced because the system can continue to operate to switch telephone calls even during a complete failure of central control 30".

Control Distribution Unit 31'

Figure 49:
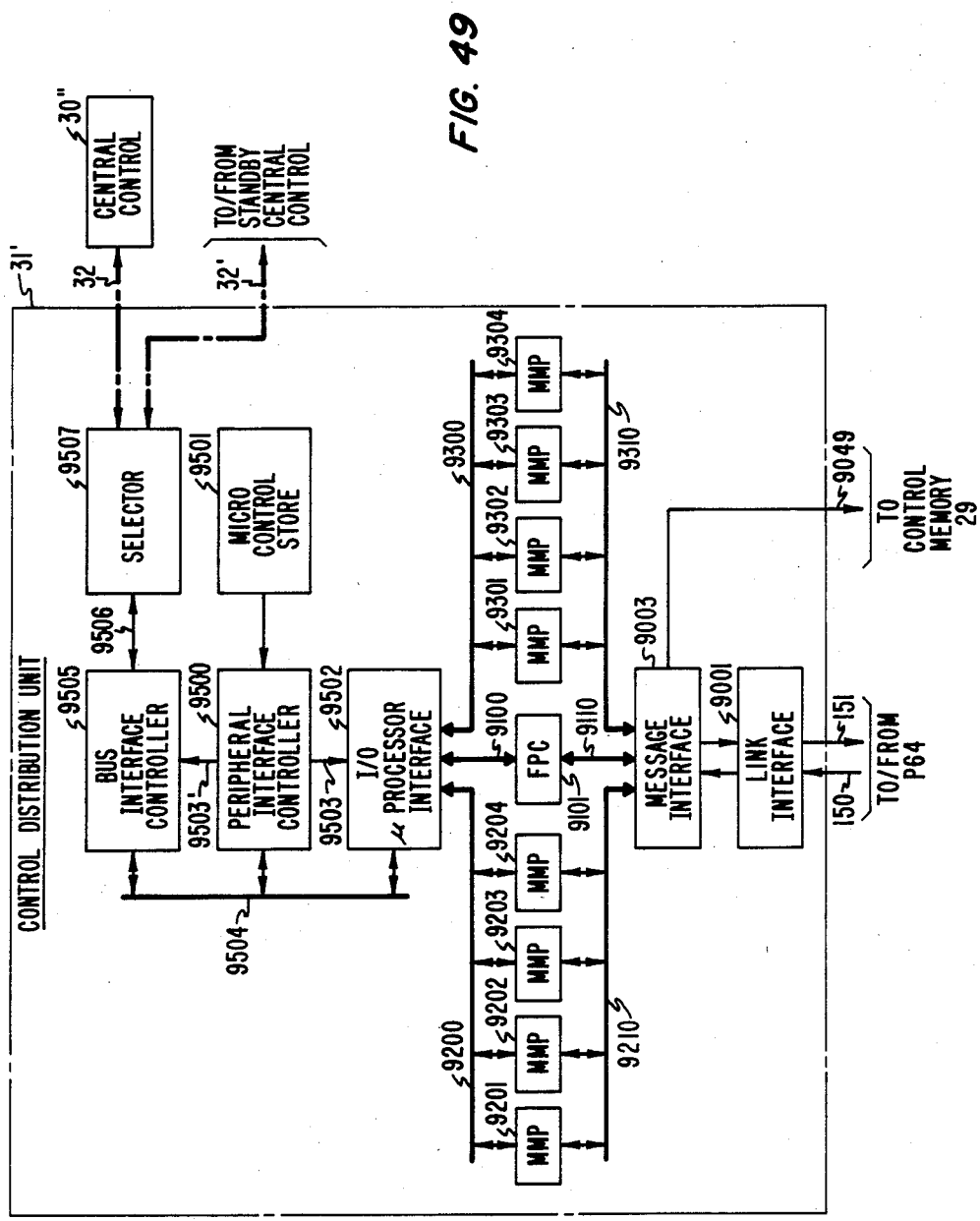
FIG. 49 is a diagram of an alternative control distribution unit used in System V.

Control distribution unit 31' receives control information from the switching modules 201 through 229, via a time-multiplexed line 150 connected to output terminal P64 of time-multiplexed switch 10. Control distribution unit 31' transmits control information to the switching modules 201 through 229, on a time-multiplexed line 151 connected to input terminal P64 of time-multiplexed switch 10. Within control distribution unit 31', the time-multiplexed lines 150 and 151 are coupled to a link interface 9001 (FIG. 49) which is substantially identical to link interface 78 (FIG. 4) described above with respect to System I, except that the circuits used to extract and insert control words in link interface 78 are not required in link interface 9001. Time-multiplexed lines 150 and 151 each have 256 channels or time slots. However, in the present embodiment, only 58 control channels are required, two control channels to each of the switching modules 201 through 229. Link interface 9001 performs a signal conversion function and transmits the information received on time-multiplexed line 150 from time-multiplexed switch 10, to a message interface 9003. Link interface 9001 also receives information from message interface 9003 for transmission on time-multiplexed line 151 to time-multiplexed switch 10. Message interface 9003 distributes the control information received by control distribution unit 31' from time-multiplexed switch 10, to three communities of peripheral processors, one community comprising four module message processors 9201 through 9204, a second community comprising four module message processors 9301 through 9304, and a third community comprising a foundation peripheral controller 9101. Message interface 9003 also multiplexes control information from the communities, for transmission to time-multiplexed switch 10. The communities communicate with message interface 9003 via 32-channel serial message interfaces buses 9110, 9210 and 9310. Each module message processor is associated with up to eight of the switching modules 201 through 229 and communicates with its associated switching modules via a predetermined link-level protocol, e.g., the HDLC protocol. Foundation peripheral controller 9101 is used to control the operation of a number of the elements of control distribution unit 31' but in particular is used to write information via a control and diagnostic access link 9110, to be stored by control memory 29 to define time-multiplexed switch 10 paths. The control instructions transmitted by foundation peripheral controller 9110 to message interface 9003, are written into control memory 29 via control and diagnostic access link 9049.

A peripheral interface controller 9500 effects a packet switching function by controlling the transfer of information among the communities of peripheral processors and central control 30". Peripheral interface controller 9500, which operates in accordance with instructions stored in a microcontrol store 9501, communicates with the communities of peripheral processors via an I/O microprocessor interface 9502. Interface 9502 is coupled to the communities via community data/address buses 9100, 9200 and 9300. By writing source and destination addresses on an address bus 9503 to I/O microprocessor interface 9502, peripheral interface controller 9500 can effect the transfer of control information from one of the module message processors, e.g., 9301, to another module message processor or to foundation peripheral controller 9101. Such transfer of control information can be done without involving central control 30". Peripheral interface controller 9500 can similarly effect the transfer of control information from module message processor 9301 to a 16-bit data bus 9504, which information is subsequently conveyed to central control 30". By writing source and destination addresses on an address bus 9503' to a bus interface controller 9505, peripheral interface controller 9500 can effect the transfer of control information received by bus interface controller 9505 from central control 30", to the communities of peripheral processors via data bus 9504 and I/O microprocessor interface 9502. Central control 30" communicates with control distribution unit 31' via a dual serial channel 32. A selector 9507 receives the information from central control 30" via channel 32 and also receives information from a standby central control (not shown) via a second dual serial channel 32'. Selector 9507 selects channel 32 or channel 32' depending on whether central control 30" or the standby central control is presently controlling system operation. Selector 9507 converts the information received from central control 30" or the standby central control from serial to parallel format and transmits the converted information on a 32-bit parallel bus 9506 to bus interface controller 9505. Bus interface controller 9505 acts as buffer between the 32-bit selector 9507 and the 16-bit peripheral interface controller 9500. Bus interface controller 9505 includes a 16-word by 32-bit FIFO (not shown) which is segmented into two 16-bit fields for access by peripheral interface controller 9500.

Distributed Path Hunt

Recall that there are 512 time slots or channels between a given switching module, e.g., module 201 (FIG. 48), and time-multiplexed switch 10. Each of the two pairs of time-multiplexed lines between switching module 201 and time-multiplexed switch 10, i.e., lines 13 and 15 connected to input/output port pair P1 and lines 14 and 16 connected to input/output port pair P2, has 256 channels thereon. For the purposes of the discussion which follows the 512 channels between a given switching module and time-multiplexed switch 10 are referred to as channels TS1 through TS512. Time-multiplexed switch 10 can connect each of the channels from a given switching module to the corresponding channels on any of the other switching modules. For example, time-multiplexed switch 10 can connect TS1 from switching module 201 to TS1 of any of the switching modules 202 through 229, TS2 from switching module 201 to TS2 of any of the switching modules 202 through 229, etc. Rather than central control 30" maintaining a global view of all the channels to and from time-multiplexed switch 10 and selecting the network time slots used for calls as in Systems I through IV, in System V no such global view is maintained. Rather, each switching module stores a TIMESLOT relation defining the status of each of the channels TS1 through TS512 from that switching module to time-multiplexed switch 10, and the two switching modules involved in each inter-module call negotiate to select the network time slot to be used for that call. Once the network time slot is selected, one of the switching modules transmits a CONNECT order via control distribution unit 31' to control memory 29 without involving central control 30".

Figure 50:
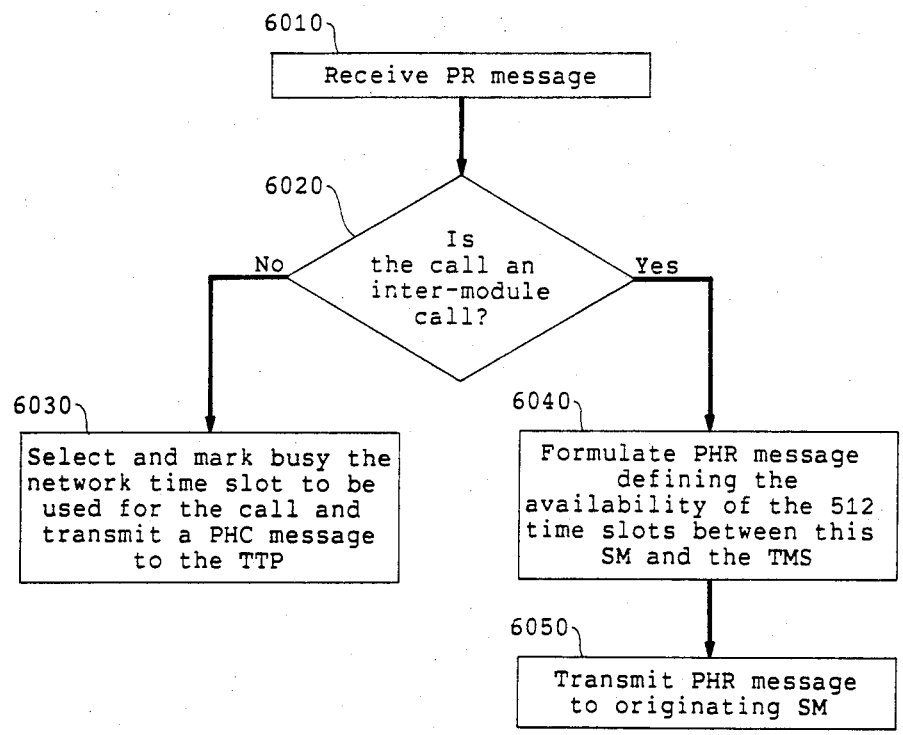
FIG. 50, FIG. 51, and FIGS. 52 through 54 arranged in accordance with FIG. 55, present flow charts of programs used to effect path hunting in System V.

The terminating port determination function is performed in System V in the same manner as in System IV previously described. Once the terminating terminal process is created in the terminating switching module, that terminal process transmits a path request (PR) message to a path hunt system process now located in the switching module. A flow chart of the program executed by the path hunt system process in response to the PR message is shown in FIG. 50. The PR message is received during block 6010. Execution proceeds to decision block 6020 during which a determination is made of whether or not the call is an inter-module call based on whether the terminating and originating switching modules defined in the PR message are the same or different switching modules. If the call is not an inter-module call, execution proceeds to block 6030. The TIMESLOT relation stored by the switching module is accessed and an available one of the channels TS1 through TS512 is selected and marked busy as the network time slot for the call. Even though no path is required through time-multiplexed switch 10, the selected network time slot is used to connect the receive time slot interchanger to the transmit time-slot interchanger within the switching module. If, on the other hand, the call is an inter-module call, execution proceeds from decision block 6020 to block 6040. In block 6040, a path hunt request (PHR) message is formulated which defines by means of a field comprising 64 octets, the availability of the 512 channels TS1 through TS512 between that switching module and time-multiplexed switch 10. (The PHR message defines as unavailable both busy channels, i.e., channels being used for established calls, as well as any channels that are reserved as part of candidate sets for unresolved calls. Such reservation of channels is discussed later herein.) Execution proceeds from block 6040 to block 6050 and the formulated PHR message is transmitted to the path hunt system process in the originating switching module.

Figure 51:
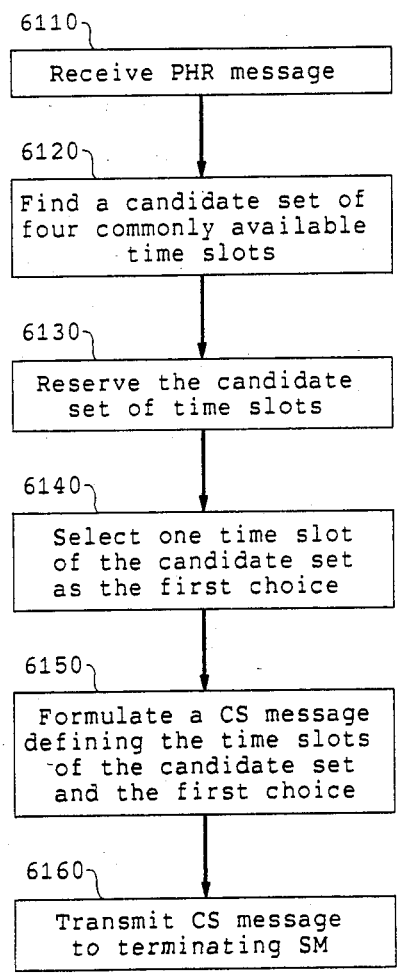
Figure 55:
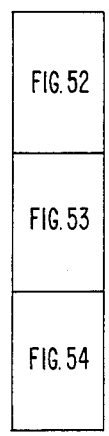

A flow chart of the program executed by a path hunt system process in a given switching module in response to a PHR message is shown in FIG. 51. The PHR message is received during block 6110 and execution proceeds to block 6120. The TIMESLOT relation is accessed and a candidate set of time slots is selected for the call. Each time slot in the candidate set must meet the following criteria: (1) the time slot is defined as available in the TIMESLOT relation of the given switching module, and (2) the time slot is defined as available in the PHR message from the other switching module involved in the inter-module call. In the embodiment being described, the size of the candidate set is predetermined and comprises, for example, four time slots. In block 6130 the candidate set of time slots is reserved so that the time slots will not by selected by the given switching module as part of any other candidate set until this particular call is resolved or at least until freed from the candidate set. It is important to note that the time slots reserved in block 6130 can be selected as the network time slots for other calls between other switching modules and the given switching module. The reservation in block 6130 only means that the reserved time slots will not be selected by the given switching module as part of another candidate set until they are freed from this candidate set. Execution proceeds from block 6130 to block 6140 during which one of the four time slots of the candidate set is selected as the first choice (FC) time slot. Then in block 6150, a candidate set (CS) message is formulated defining the four time slots of the candidate set as well as which of the four time slots is the FC time slot. The formulated CS message is transmitted during block 6160 to the path hunt system process in the other switching module.

Figure 52:
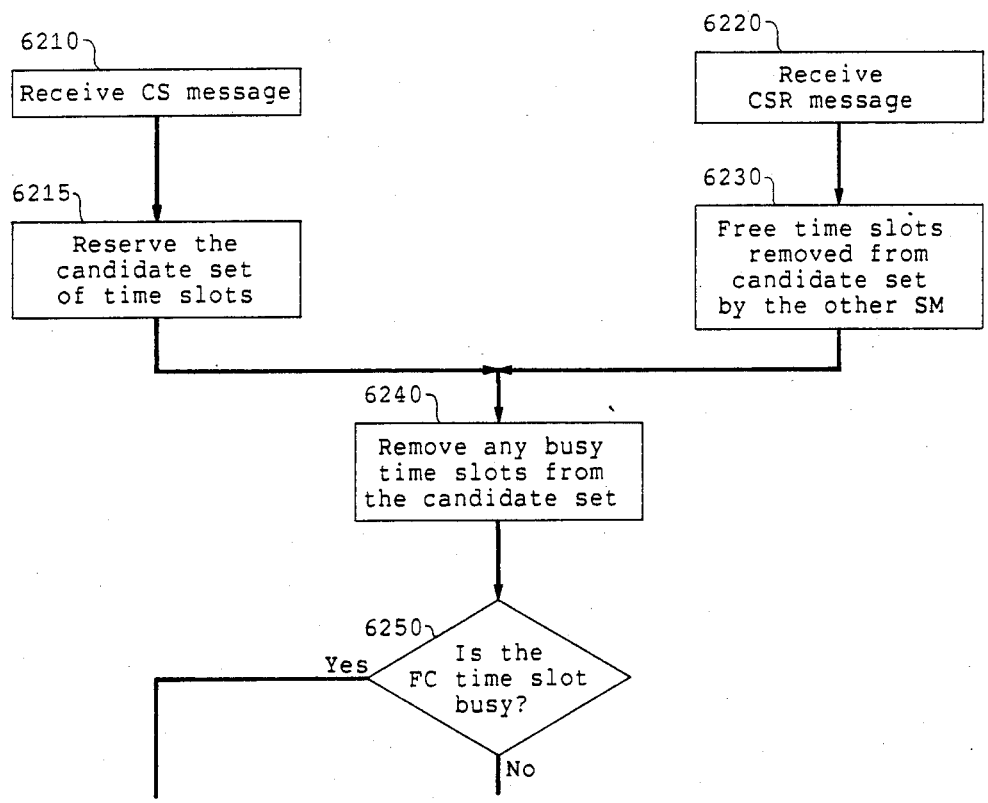
Figure 53:
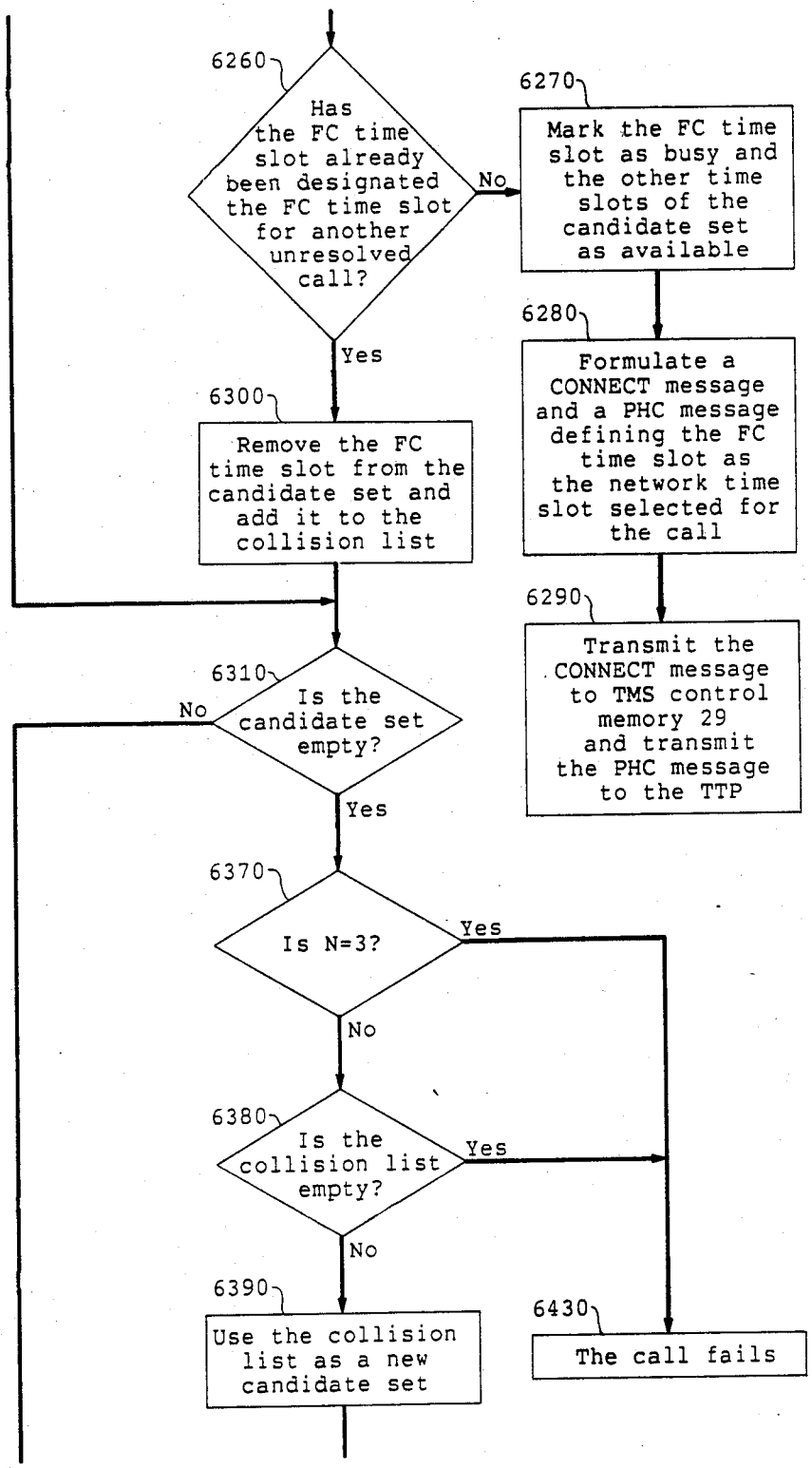
Figure 54:
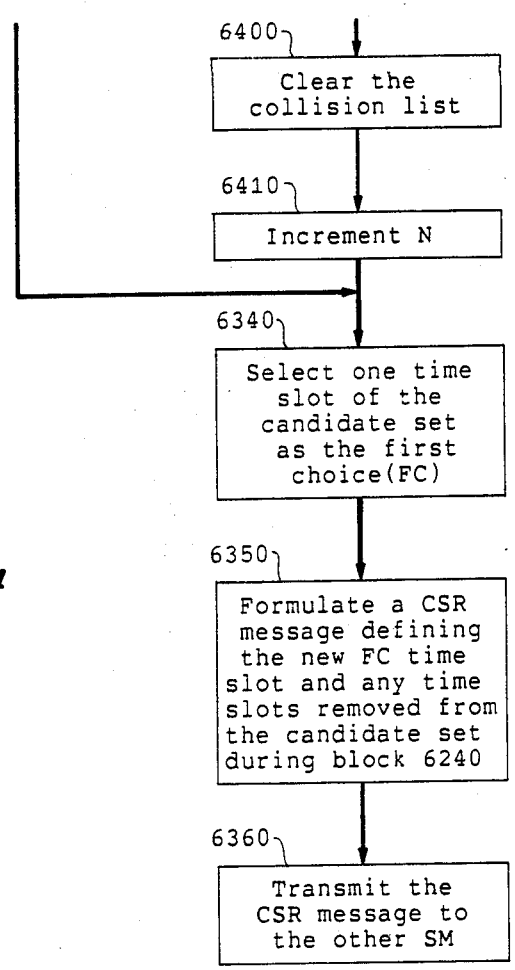

The flow chart of the program executed by the path hunt system process of a given switching module in response to a CS message is shown in FIGS. 52 through 54. The CS message is received during block 6210 and execution proceeds to block 6215 during which the candidate set of time slots is reserved so that the time slots are not selected by the given switching module as part of candidate sets for other calls. Execution proceeds from block 6215 to block 6240 and the TIMESLOT relation in the given switching module is accessed to determine whether any of the four time slots of the candidate set are busy, i.e., whether any of the four time slots has already been selected as the network time slot for another call. Any such busy time slots are removed from consideration in the candidate set and execution proceeds to decision block 6250. During block 6250 a determination is made of whether the FC time slot defined by the received CS message is marked busy in the TIMESLOT relation of the given switching module. If the FC time slot is busy, of course, it cannot be selected as the network time slot for this call and execution proceeds to block 6310. If the FC time slot is not busy, execution proceeds to decision block 6260 and a determination is made of whether the FC time slot has already been designated as the FC time slot for another unresolved call between the given switching module and another switching module. If it has not, execution proceeds to block 6270 and the FC time slot is marked as busy and the other time slots of the candidate set are marked as available in the TIMESLOT relation. Then in block 6280 a CONNECT message and a path hunt completion (PHC) message are formulated defining the FC time slot as the network time slot selected for the call. During block 6280 the CONNECT message is transmitted to control memory 29 which defines in response to the CONNECT message that time-multiplexed switch 10 will provide a communication path between the two switching modules during the selected network time slot. Also during block 6280, the PHC message is transmitted to the terminating terminal process, which upon learning the network time slot selected for the call, can complete the call setup in the same manner as described above with respect to System IV.

If, on the other hand, the determination is made in decision block 6260 that the FC time slot has already been designated as the FC time slot for another unresolved call, execution instead proceeds to block 6300 and the FC time slot is removed from the candidate set and is added to a list stored in the memory of the given switching module and referred to as a collision list. The collision list comprises a list of time slots of the candidate set that were designated as the FC time slot but were not selected as the network time slot because they had been designated as the FC time slot for other unresolved calls at nearly the same time. Whether the FC time slot was determined to be busy in block 6250 or was found to have been designated as the FC time slot for another unresolved call in block 6260, the same result obtains--namely, the FC time slot is not selected as the network time slot for this call and execution proceeds to decision block 6310. In decision block 6310, a determination is made of whether the candidate set has now become empty. If the candidate set is not empty, execution proceeds to block 6340 and one of the remaining time slots of the candidate set is selected as the new FC time slot. In block 6350, a candidate set reduction (CSR) message is formulated defining the new FC time slot and any time slots removed from the candidate set during block 6240 of this execution of the program. The formulated CSR message is transmitted to the path hunt system process in the other switching module during block 6360.

However, if it is determined during decision block 6310 that the candidate set has become empty, execution instead proceeds to decision block 6370. N is a stored variable that indicates the number of times that the candidate set has become empty for a given call. In decision block 6370 it is determined whether the candidate set has become empty a predetermined number of times, e.g., three times. If so, execution proceeds to block 6430 and the call fails. However, if the candidate set has become empty less than three times, execution proceeds to decision block 6380 during which it is determined whether the collision list is also empty. If the collision list is empty, execution again proceeds to block 6430 and the call fails. However, if the collision list is not empty, execution proceeds to block 6390 during which the collision list becomes the new candidate set for the call. During block 6400 the collision list is then cleared and during block 6410 the variable N is incremented. Blocks 6340, 6350 and 6360 are then executed as described above and a CSR message is transmitted to the path hunt system process in the other switching module.

The path hunt system process in a given switching module responds to a CSR message by executing the same program shown in FIGS. 52 through 54. The CSR message is received in block 6220 and then during block 6230, the time slots removed as busy by the other switching module, which time slots are defined in the CSR message, are freed for subsequent inclusion in candidate sets selected by the given switching module. Execution then proceeds to block 6240 and continues in the same manner described above with respect to the CS message.

It should be noted that the network time slot selection for any given call may be made either by the terminating switching module or by the originating switching module. If the selection is made in the terminating switching module, the CONNECT message is transmitted by the path hunt system process in that module to control memory 29 and the path hunt completion (PHC) message is transmitted by the path hunt system process to the terminating terminal process. In the present embodiment, if the selection is made in the originating switching module the path hunt system process in the originating switching module transmits a PHC message to the path hunt system process in the terminating switching module. The path hunt system process in the terminating switching module then proceeds in the same manner as if it has made the network time slot selection. When the originating switching module learns that a network time slot has been selected for the call, the other members of the candidate set are then marked as available to be included in another candidate set selected by that originating switching module.

Figure 43:
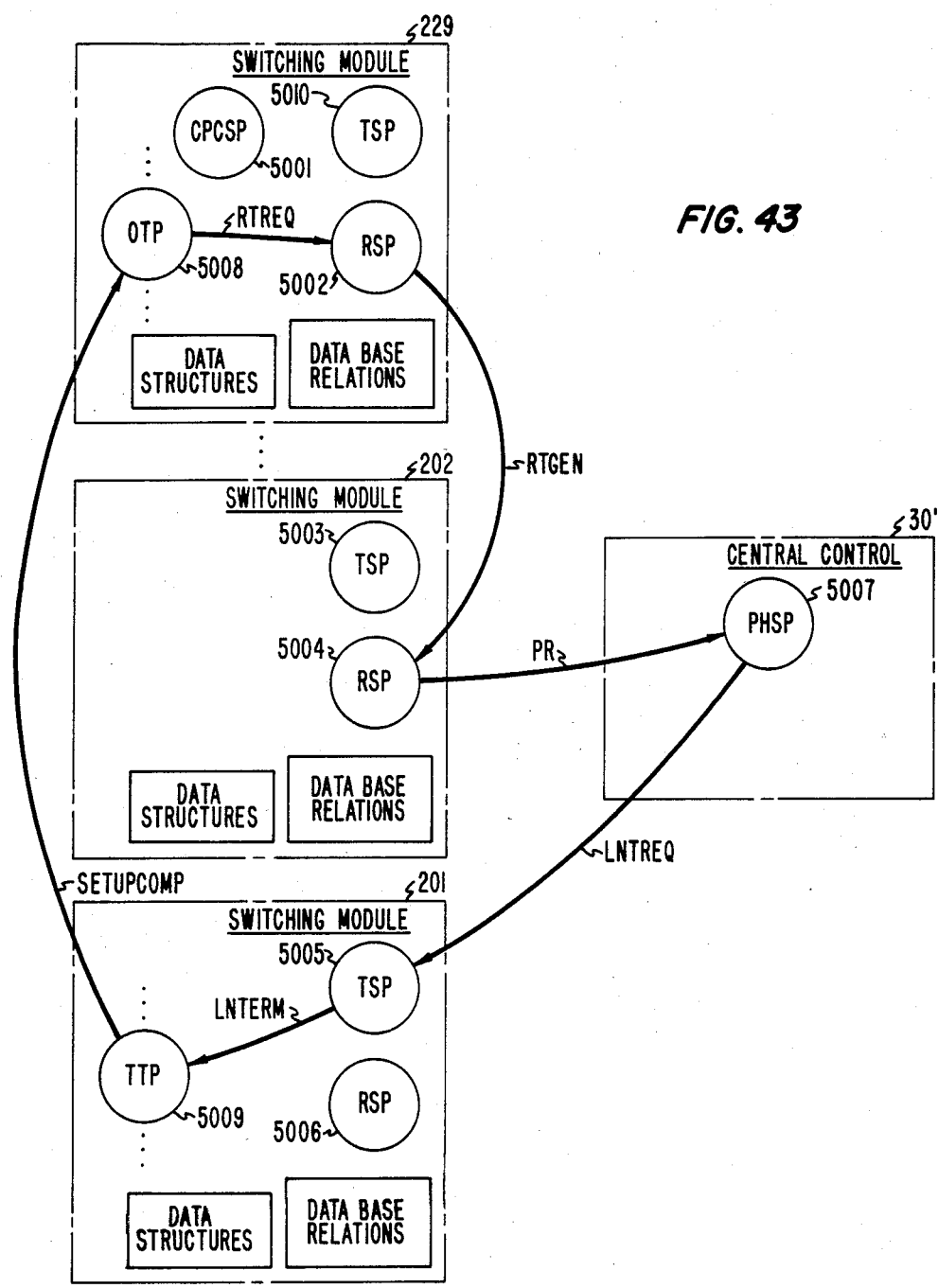
FIGS. 43 through 47 are functional diagrams of exemplary call setup sequences used in System IV.
Figure 56:
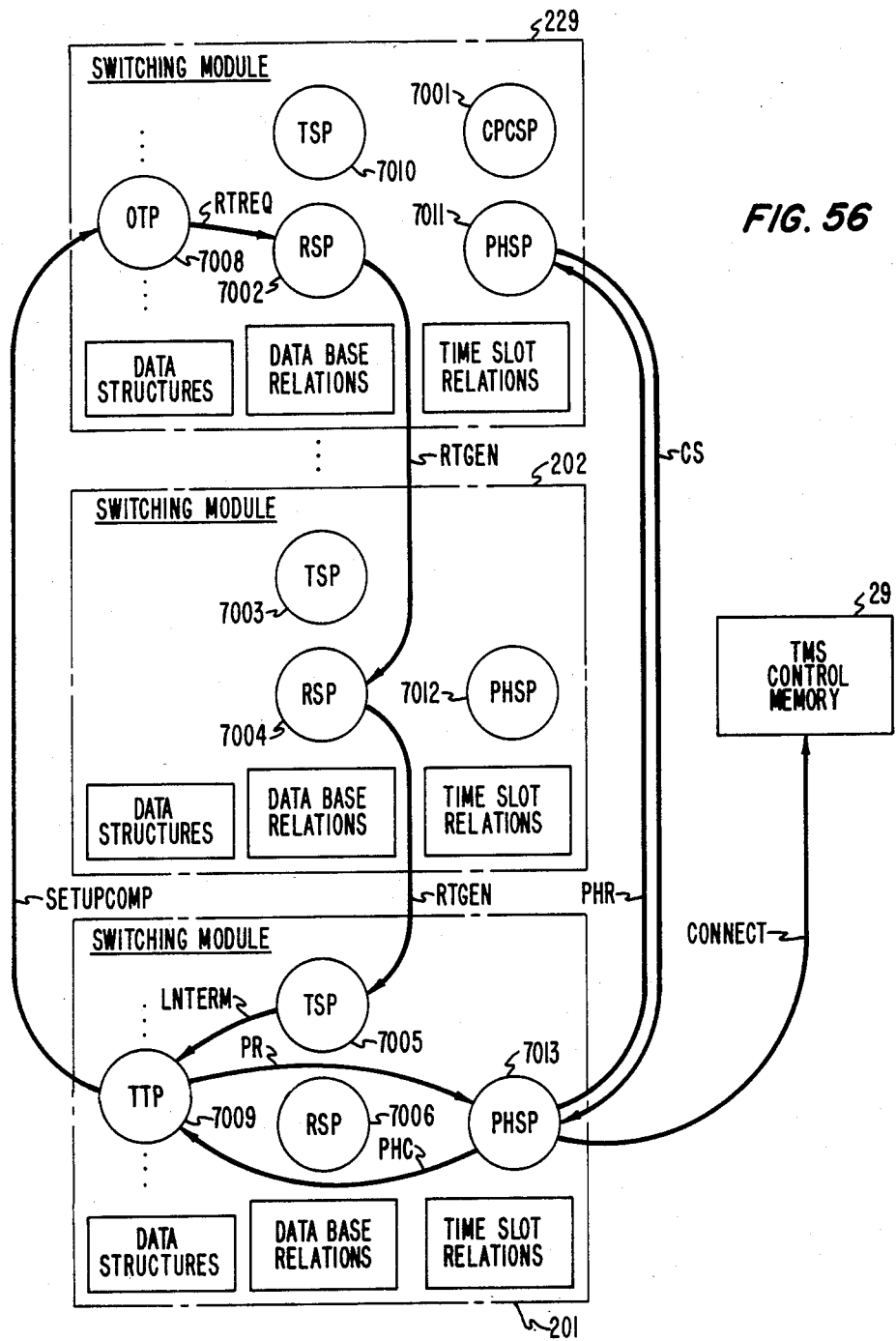
FIG. 56 is a functional diagram of an exemplary call setup sequence used in System V.
Figure 57:
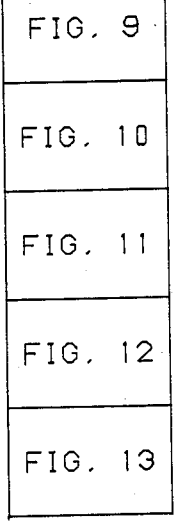
Figure 58:
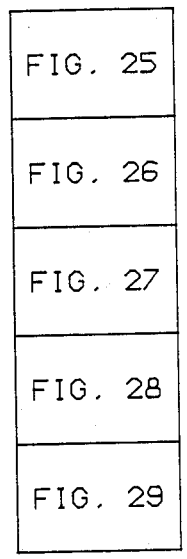

As a first example of call setup in System V, the example illustrated in FIG. 43 with respect to System IV is revisited. Assume that the number 355-2289 is dialed at subscriber set 25 connected to switching module 229. The initial steps leading up to the determination of the terminating port are the same as in the System IV example. An originating terminal process 7008 (FIG. 56) is created which transmits a RTREQ message to routing system process 7002. Process 7002 is unable to complete the determination of the terminating port but by reading the MODTRAN relation (FIG. 32) determines that the needed directory number translation information is stored in switching module 202. Process 7002 then transmits a RTGEN message to routing system process 7004 in switching module 202, which determines that the terminating port is connected to subscriber set 23 of switching module 201. Process 7004, instead of transmitting a message to central control 30 as in System IV, transmits a RIGEN message to termination system process 7005 in switching module 201. Process 7005 determines that subscriber set 23 is idle, creates a terminating terminal process 7009 and transmits a LNTERM message to process 7009. In response, process 7009 transmits a path request (PR) message to a path hunt system process 7013 within switching module 201. Path hunt system process 7013 determines based on ORIGGPI and TERMGPI fields in the PR message that the call is an inter-module call. Therefore process 7013 accesses its TIMESLOT relation and formulates a path hunt request (PHR) message defining the availability of the 512 channels TS1 through TS512 between switching module 201 and time-multiplexed switch 10. Assume for the present example that 78 of those channels are available, i.e., not busy or reserved. Process 7013 then transmits the PHR message to a path hunt system process 7011 in originating switching module 229. Process 7011 accesses its TIMESLOT relation to determine which of the 78 available channels defined by the PHR message, have corresponding channels between switching module 229 and time-multiplexed switch 10 that are also available. Assume for this example that there are 49 such channels. Path hunt system process 7011 selects and reserves four of the 49 channels as the candidate set for the call, for example channels TS14, TS99, TS349 and TS410. Path hunt system process 7011 also selects one of the four channels, for example channel TS99, as the first choice (FC) time slot. Path hunt system process 7011 then formulates a candidate set (CS) message defining the candidate set and the FC time slot and transmits the CS message to path hunt system process 7013 in terminating switching module 201. Process 7013 accesses its TIMESLOT relation to determine whether TS99 is busy and if not, whether it has been designated as the FC time slot for another unresolved call. Assume for this example, that TS99 is not busy and has not been designated as the FC time slot for any other call. Process 7013 marks TS99 as busy and TS14, TS349 and TS410 as available in its TIMESLOT relation and formulates a CONNECT message for control memory 29 which defines that time-multiplexed switch 10 is to connect switching module 201 and switching module 229 during a particular time slot associated with TS99. (Recall that time-multiplexed switch 10 operates on the basis of 256 time slots but is connected to a given switching module by two time-multiplexed line pairs. Therefore each time slot of time-multiplexed switch 10 is associated with two of the channels TS1 through TS512.) Process 7013 also formulates a path hunt completion (PHC) message defining the selected channel TS99. Process 7013 then transmits the CONNECT message (not shown in FIG. 56) to control memory 29 and transmits the PHC message to terminating terminal process 7009. Process 7009 responds by transmitting a SETUPCOMP message to originating terminal process 7008 defining the selected network time slot. Process 7008 accesses the TIMESLOT relation to mark TS99 as busy and to free the remaining time slots of the candidate set, i.e., TS14, TS349 and TS410, such that those time slot are again eligible for selection by path hunt system process 7011 as part of a candidate set. The balance of the call setup sequence proceeds in the same manner as in System IV such that communication between subscriber sets 25 and 23 is established.

As a second example, consider the following variation on the previous example. When the CS message defining the candidate set comprising TS14, TS99, TS349 and TS410, and defining TS99 as the FC time slot, is received by path hunt system process 7013 in switching module 201, it is determined that TS99 between switching module 201 and time-multiplexed switch 10 has become busy. In other words TS99 has been selected for another call after the PHR message was transmitted to switching module 229. Process 7013 removes TS99 from the candidate set and selects TS14 as the new FC time slot. Process 7013 then transmits a candidate set reduction (CSR) message (not shown in FIG. 56) to path hunt system process 7011 defining that TS99 should be freed in switching module 201 for selection in a candidate set for another call and defining that TS14 is the new FC time slot. Assume however that although TS14 is not yet busy, switching module 229 has just received a CS message from some other switching module, for example, switching module 208, and in response has chosen TS14 as a new FC time slot. This event is termed a collision. For the purposes of the call being described between modules 229 and 201, TS14 is put on what is referred to as a collision list. Path hunt system process 7011 selects a new FC time slot, for example TS410 and transmits to path hunt system process 7013, a CSR message (not shown) defining FC time slot TS410 and defining that TS14 should be removed from the candidate set and added to the collision list. Suppose, for example, that both TS410 and TS349 have just become busy in switching module 201. Since the candidate set has become empty, process 7013 uses the collision list, which in this example comprises only TS14, as the new candidate set. The collision list is then cleared. Process 7013 transmits a CSR message (not shown) including the defined FC time slot TS14 to process 7011 in switching module 229. Assume that TS14 has just become available in switching module 229. Process 7011 then selects TS14 as the network time slot for the call and transmits a path hunt completion (PHC) message (not shown) to process 7013 including the selected network time slot. The balance of the call setup proceeds as before.

Sequence calls are processed in System V in the same manner described above with respect to System III. Path hunting is not initiated until the final terminating port has been determined and the call has been reduced to a simple call.

The directory number translation function and the multi-port hunt group control function are both performed in System V in the same manner described above with respect to System IV.

First Alternative Embodiment of System V

In the embodiment of System V just described, each switching module can be contemporaneously negotiating with a number of other switching modules for paths for multiple calls. In a first alternative embodiment of System V, each switching module is involved in hunting for a path for only one call at a time. In the first alternative embodiment, once the terminating switching module transmits a path hunt request for a given call defining the idle channels between that switching module and time-multiplexed switch 10, it transmits no more path hunt requests until the network time slot for the given call has been selected. The terminating switching module also defers responding to any incoming path hunt requests until the network time slot for the given call has been selected. The originating switching module can therefore select any of the idle channels defined by the path hunt request for the given call and be assured that the selected channel is still idle from the terminating switching module. Once the channel is selected for the call, the originating switching module informs the terminating switching module of the selected channel and the terminating switching module is then free to respond to incoming path hunt requests and to transmit a path hunt request for the next call. If the terminating switching module is not informed of a selected channel for a call within a predetermined time after transmitting a path hunt request, it first responds to any incoming path hunt requests that have been received from other switching modules and then retransmits the previous path hunt request, modified of course to reflect any change in the status of the channels.

Second Alternative Embodiment of System V

In a second alternative embodiment of System V, the 512 channels TS1 through TS512 are divided into four groups: Group 1 comprising channels TS1 through TS128, Group 2 comprising channels TS129 through TS256, Group 3 comprising channels TS257 through TS384 and Group 4 comprising channels TS385 through TS512. The second alternative embodiment is similar to the first alternative embodiment except that a given switching module can be hunting for paths for four calls contemporaneously—one for each group of channels. In this second alternative embodiment, each path hunt request only defines idle channels from one of the groups. Once a terminating switching module has transmitted a path hunt request for a given call defining for example, the idle Group 1 channels between the terminating switching module and time-multiplexed 10, it transmits no more path hunt requests defining Group 1 channels until the network time slot for the given call has been selected. The terminating switching module also defers responding to incoming path hunt requests defining Group 1 channels until the network time slot for the given call has been selected. Thus the originating switching module can select any of the idle Group 1 channels defined by the path hunt request for the given call and be assured that the selected channel is still idle from the terminating switching module. The hunting for paths is effected independently within each of the other groups in a similar manner.

It is to be understood that the above-described switching systems are merely illustrative of the principles of the present invention and that other embodiments may be devised by those skilled in the art without departing from the spirit and scope of the invention.

What is claimed is:

1. In a switching system having a plurality of ports, said switching system controlled by at least first and second control means wherein said first control means stores a plurality of first database relations and a first program having a plurality of program states and defining the reading of said first database relations to determine terminating ones of said ports for calls, and said second control means stores a plurality of second database relations and a second program having a plurality of program states corresponding to said plurality of program states of said first program and defining the reading of said second database relations to determine terminating ones of said ports for calls, a method of reading ones of said first and second database relations to determine the terminating one of said ports for a call from an originating one of said ports, said method comprising initiating the execution of said first program by said first control means in response to said call, reading ones of said first database relations, by said first control means, as defined during the execution of said first program, terminating the execution of said first program by said first control means upon determining that the data necessary to continue the execution of said first program is not present in a given first database relation, transmitting, by said first control means to said second control means, a control message defining one of said program states of said first program before the defined reading of said given first database relation, initiating, by said second control means, the execution of said second program in the program state corresponding to said program state of said first program defined by said control message and reading ones of said second database relations, by said second control means, as defined during the execution of said second programs.

2. In a switching system having a plurality of ports, a control arrangement comprising a plurality of switching modules each associated with a corresponding subset of said ports, each of said switching modules comprising means for storing a plurality of database relations and a routing program defining the sequential access of said database relations to determine terminating one of said plurality of ports, means responsive to address signals each received at one port of the associated subset of said ports, for executing said routing program and means for transmitting a routing continuation request to one of the other ones of said switching modules when the data necessary to continue the execution of said routing program stored by said each switching module is not present in a given one of said database relations, said routing continuation request defining a point in said routing program prior to the access of said given database relation and also defining data necessary to initiate execution of said routing program at said defined point; and wherein said each switching module further comprises means responsive to a routing continuation request received from one other ones of said switching modules, for initiating execution of said routing program at the point defined by that routing continuation request.

3. A control arrangement in accordance with claim 2 wherein a first one of said database relations defines, for a particular subset of said address signals, terminating ones of said plurality of ports defined by those address signals, wherein a second one of said database relations defines, for address signals other than said particular subset, other ones of said switching modules and wherein said transmitting means transmits a routing continuation request to the one of said switching modules defined by said second database relation, when during the execution of said routing program in response to one of said address signals other than said particular subset, the attempted access of said first database relation fails.

4. A control arrangement in accordance with claim 3 wherein each port of the subset of said ports associated with said each switching module is defined by one of said particular subset of said address signals.

5. A control arrangement in accordance with claim 2 wherein a first one of said database relations defines, for each of a plurality of multi-port hunt groups of said ports, one of said switching modules that stores hunt data for that group and wherein said transmitting means transmits a routing continuation request to the one of said switching modules defined by said first database relation, when an execution of said routing program in response to a given one of said address signals determines that said given address signal defines a port of one of said multi-port hunt groups that has its hunt data stored in one of the other ones of said switching modules.

6. A control arrangement in accordance with claim 5 wherein the ports of certain ones of said multi-port hunt groups are connected to lines and the ports of other ones of said multi-port hunt groups are connected to trunks.

7. A switching system comprising a plurality of ports, a plurality of switching modules each associated with a corresponding subset of said ports, and inter-module connection means, each of said switching modules comprising switching means for providing communication channels among its associated subset of said ports and between its associated subset of said ports and said inter-module connection means, said inter-module connection means comprising means for providing communication channels among the switching means of said switching modules for inter-module communication, said each switching module further comprising means for storing a plurality of database relations and a routing program defining the sequential access of said database relations to determine terminating ones of said plurality of ports, means responsive to address signals, received at the subset of said ports associated with said each switching module and defining requested calls, for executing said routing program, means for transmitting a routing continuation request to one of the other ones of said switching modules when the data necessary to continue the execution of said routing program is not present in a given one of said database relations, said routing continuation request defining a point in said routing program prior to the access of said given database relation and also defining data necessary to initiate execution of said routing program at said defined point and means responsive to each routing continuation request received from the other ones of said switching modules, for initiating execution of said routing program at the point defined by said each routing continuation request.

8. A switching system in accordance with claim 7 further comprising means responsive to a given execution of said routing program that determines the terminating one of said ports for a given call from an originating one of said ports, for selecting and controlling the establishment of a given one of said communication channels of said inter-module connection means, between the switching means of a first switching module with which said originating port is associated and the switching means of a second switching module with which said terminating port is associated.

9. A switching system in accordance with claim 8 wherein said first switching module further comprises means for controlling the establishment of one of said communication channels of said switching means of said first switching module, between said originating port and said given communication channel of said inter-module connection means and wherein said second switching module further comprises means for controlling the establishment of one of said communication channels of said switching means of said second switching module, between said terminating port and said given communication channel of said inter-module connection means.

10. In a switching system having a plurality of ports, a control arrangement comprising a central control comprising means for storing a plurality of central database relations and a central routing program defining the sequential access of said central database relations to determine terminating ones of said plurality of ports and at least one switching module comprising means for storing a plurality of local database relations corresponding to said plurality of central database relations, and a local routing program defining the sequential access of said local database relations to determine terminating ones of said plurality of ports, means responsive to address signals received at a subset of said ports defining requested calls, for executing said local routing program and means for transmitting a routing continuation request to said central control when the data necessary to continue the execution of said local routing program is not present in a given one of said local database relations, said routing continuation request defining a point in said central routing program prior to the access of the central database relation corresponding to said given local database relation and also defining data necessary to initiate execution of said central routing program at said defined point; and wherein said central control further comprises means responsive to said routing continuation request, for initiating execution of said central routing program at said defined point.

11. A control arrangement in accordance with claim 10 wherein a first one of said central database relations defines, for each of said plurality of ports, the one of said address signals that defines that port and wherein the one of said local database relations corresponding to said first central database relation defines, for each of said subset of said ports, the one of said address signals that defines that port.

12. In a switching system having a plurality of ports, a control arrangement comprising a central control and at least a first switching module comprising means responsive to address signals received at a first subset of said plurality of ports defining requested calls, for transmitting routing requests to said central control, wherein said central control comprises means for storing a plurality of central database relations and a central routing program defining the sequential access of said central database relations to determine terminating ones of said plurality of ports and means responsive to said routing requests for executing said central routing program; and wherein said control arrangement further comprises at least a second switching module comprising means for storing a plurality of local database relations corresponding to said plurality of central database relations, and a local routing program defining the sequential access of said local database relations to determine terminating ones of said plurality of ports, means responsive to address signals received at a second subset of said plurality of ports defining requested calls, for executing said local routing program and means for transmitting a routing continuation request to said central control when the data necessary to continue the execution of said local routing program is not present in a given one of said local database relations, said routing continuation request defining a point in said central routing program prior to the access of the central database relation corresponding to said given local database relation and also defining data necessary to initiate execution of said central routing program at said defined point; and wherein said central control further comprises means responsive to said routing continuation request, for initiating execution of said central routing program at said defined point.

13. A switching system comprising a plurality of ports, a plurality of switching modules each associated with a corresponding subset of said ports, inter-module connection means, and central control means, each of said switching modules comprising switching means for providing communication channels among its associated subset of said ports and between its associated subset of said ports and said inter-module connection means, and control means for controlling the establishment of communication channels by said switching means, said inter-module connection means comprising means for providing communication channels among the switching means of said switching modules for inter-module communication, said central control means comprising means for controlling the establishment of communication channels by said inter-module connection means and means for storing a plurality of central database relations and a central routing program defining the sequential access of said central database relations to determine terminating ones of said plurality of ports, said control means of said each switching module further comprising means for storing a plurality of local database relations corresponding to said plurality of central database relations, and a local routing program defining the sequential access of said local database relations to determine terminating ones of said plurality of ports, means responsive to address signals, received at the subset of said ports associated with said each switching module and defining requested calls, for executing said local routing program and means for transmitting a routing continuation request to said central control means when the data necessary to continue the execution of said local routing program is not present in a given one of said local database relations, said routing continuation request defining a point in said central routing program prior to the access of the central database relation corresponding to said given local database relation and also defining data necessary to initiate execution of said central routing program at said defined point; and wherein said central control means further comprises means responsive to said routing continuation request, for initiating execution of said central routing program at the point defined by said routing continuation request.

14. A switching system in accordance with claim 13 wherein said central control means further comprises means responsive to a given execution of said central routing program that determines the terminating one of said plurality of ports for a given call from an originating one of said plurality of ports, for selecting and controlling the establishment of a given one of said communication channels of said inter-module connection means, between the switching means of the switching module with which said originating port is associated and the switching means of the switching module with which said terminating port is associated.

15. A switching system in accordance with claim 13 wherein said control means of said each switching module further comprises means responsive to a given execution of said local routing program that determines the terminating one of said plurality of ports for a given call from an originating one of said plurality of ports, for transmitting a control message to said central control means defining said terminating and originating ports for said given call and wherein said central control means further comprises means responsive to said control message for selecting and controlling the establishment of a given one of said communication channels of said inter-module connection means, between the switching means of the switching module with which said originating port is associated and the switching means of the switching module with which said terminating port is associated.

16. A switching system in accordance with claim 13 wherein said central control means further comprises means for transmitting a second routing continuation request to a given one of said switching modules when the data necessary to continue the execution of said central routing program is not present in a given one of said central database relations, said second routing continuation request defining a point in said local routing program prior to the access of the local database relation corresponding to said given central database relation and also defining data necessary to initiate execution of said local routing program at said defined point and wherein the control means of said given switching module further comprises means responsive to said second routing continuation request for initiating execution of said local routing program at the point defined by said second routing continuation request.

17. In a switching system having a plurality of ports, a central control means and a plurality of distributed control means each associated with a subset of said plurality of ports, wherein said central control means stores a central database defining the translation of dialed information to determine terminating ones of said plurality of ports and each of said distributed control means stores a distributed database that is a subset of said central database and that defines the translation of dialed information to determine terminating ones of the subset of ports associated with that distributed control means, a method of determining the terminating one of said plurality of ports defined by dialed information received at an originating one of said ports, said method comprising processing, by the distributed control means associated with said originating port, said received dialed information to obtain database access information, accessing, by the distributed control means associated with said originating port, the distributed database stored by that distributed control means using said database access information, transmitting, by the distributed control means associated with said originating port upon being unable to determine the terminating one of said plurality of ports defined by said received dialed information, said database access information to said central control means and accessing, by said central control means, said central database using said database access information, to determine the terminating one of said plurality of ports defined by said received dialed information.

18. In a telecommunication switching system having a plurality of ports, a control arrangement for controlling the establishment of an interconnecting path to a terminating port in response to a call connection request originating from one of said ports and comprising a plurality of switching modules each comprising:

means for storing a plurality of database relations and a multistate routing program terminatable at a defined state;

means for executing the multistate routing program stored in the associated switching module for sequentially accessing database relations stored in said associated module to generate a data structure defining the identity of the terminating port for a call connection request;

means responsive to a call connection request for initiating execution of said associated routing program;

means for transmitting to another of said switching modules a routing continuation request defining a terminating state of said associated program; and means responsive to a routing continuation request received from another of said switching modules for initiating execution of said associated routing program at the state defined by said received continuation request.

19. A control arrangement in accordance with claim 18 wherein said means for transmitting transmits a routing continuation request defining a partially generated data structure and data defining a terminating state of said associated program and wherein said means responsive to a received routing continuation request is responsive to a received request for initiating execution of said associated routing program at the state defined by a received request to generate a data structure defining the identity of a port based on a received partially generated data structure.

20. In a communication switching system having a plurality of ports and first and second control means for controlling the interconnection of said ports in response to call connection requests occurring on said ports, each of said control means having database relations containing data items, the method of determining a terminating port in response to a call connection request originating on one of said ports comprising the steps of:

reading said database relations in said first control means by execution of a program in said first control means having a plurality of predetermined states;

terminating execution of said program in said first control means when a desired data item is not found in said database relations of said first control means;

transmitting a message from said first control means to said second control means defining the state of said program in said first control means prior to termination;

reading said database relations in said second control means by execution of a program in said second control means having predetermined states corresponding to the states of said program in said first control means starting with said state defined by said transmitted message.

* * * * *